US006556586B1

(12) United States Patent
Sipilä

(10) Patent No.: US 6,556,586 B1
(45) Date of Patent: Apr. 29, 2003

(54) MESSAGING SYSTEM

(75) Inventor: Tuomo Sipilä , Helsinki (FI)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/029,815

(22) PCT Filed: Sep. 11, 1996

(86) PCT No.: PCT/GB96/02243

§ 371 (c)(1),
(2), (4) Date: Jun. 2, 1998

(87) PCT Pub. No.: WO97/10684

PCT Pub. Date: Mar. 20, 1997

(30) Foreign Application Priority Data

Sep. 11, 1995 (GB) ............................................ 9518540

(51) Int. Cl.[7] ............................. H04J 3/16; H04J 3/22; H04M 11/00; H04Q 7/20

(52) U.S. Cl. ....................... 370/469; 370/467; 370/473; 455/403; 455/462; 455/557

(58) Field of Search ................................ 370/469, 473, 370/474; 364/514; 455/466, 412, 414, 418, 419, 517; 379/88.15, 88.01, 67.1, 76

(56) References Cited

U.S. PATENT DOCUMENTS 5,007,051 A * 4/1991 Dolkas et al. .............. 370/235
5,105,197 A * 4/1992 Clagett ....................... 342/419
5,235,597 A * 8/1993 Himwich et al. ........... 370/469
5,444,849 A * 8/1995 Farrand et al. ............. 709/237
5,457,732 A * 10/1995 Goldberg ................... 340/7.23
5,497,373 A * 3/1996 Hulen et al. ................ 370/259
5,635,918 A * 6/1997 Tett ........................... 340/7.29
5,684,862 A * 11/1997 Finnigan .................. 379/88.22
5,689,550 A * 11/1997 Garson et al. ........... 379/88.18
5,706,211 A * 1/1998 Beletic et al. .............. 709/206
5,724,406 A * 3/1998 Juster ...................... 379/88.13
5,790,044 A * 8/1998 Lin et al. ................... 340/7.23
5,878,343 A * 3/1999 Robert et al. ............... 455/424
5,966,663 A * 10/1999 Gleason ...................... 455/466
5,970,122 A * 10/1999 LaPorta et al. ............ 379/67.1
5,974,300 A * 10/1999 LaPorta et al. ............ 455/31.2
6,014,429 A * 1/2000 LaPorta et al. .......... 379/88.15
6,246,871 B1 * 6/2001 Ala-Laurila ................. 455/413

* cited by examiner

*Primary Examiner*—Wellington Chin
*Assistant Examiner*—M. Phan
(74) *Attorney, Agent, or Firm*—Perman & Green, LLP

(57) ABSTRACT

A messaging system is provided for communicating a message between a first communications unit having a first messaging entity and a second communications unit having a second messaging entity, each messaging entity having a messaging call control means for establishing a messaging communications link with the other messaging entity; and a messaging means for, once the messaging communications link has been established, exchanging messaging information with the said other messaging entity. Also a method is provided for communicating a message between a first communications unit and a second communications unit, the first communications unit having an application layer, a messaging entity and a network layer.

12 Claims, 46 Drawing Sheets

MMS – API and MMS Internal Structure

DECT layers

MMS – API and MMS Internal Structure

Full API Protocol Layer Model

Half –API Model

Non-API Model

General Model

Fig. 19
M-MMS
M-MMS
MMS-COMMAND
MMS-COMMAND-RPY

Call Establishment

Fig. 27

```
Bit: | 8 | 7 | 6 | 5 | 4 | 3 | 2 | 1 |
     Ú---Â---------------------------¿  Octet:
     ³ 1 ³ 1   1   0   0   0   0   0 ³   1
     ³   ³     <<BASIC-SERVICE>>     ³
     Ã---Á-----------Â---------------´
     ³      Call     ³     Basic     ³   2
     ³      class    ³    Service    ³
     À---------------Á---------------Ù
```

```
Bit: | 8 | 7 | 6 | 5 | 4 | 3 | 2 | 1 |
     Ú---Â---------------------------¿  Octet:
     ³ 0 ³   << CALL-ATTRIBUTES >>   ³   1
     Ã---Á---------------------------´
     ³     Length of Contents (L)    ³   2
     Ã---Â-------Â-------------------´
     ³ 1 ³ Coding³ Network Layer     ³   3
     ³   ³ std.  ³ Attributes        ³
     Ã---Å-------Á---Â---------------´
     ³ 1 ³  C-plane  ³  C-plane      ³   4
     ³   ³   class   ³  routing      ³
     Ã---Å-------Â---Á---------------´
     ³0/1³U-plane³ LU identification ³   5
     ³   ³ symm  ³                   ³
     Ã---Å-------Å-------------------´
     ³ 1 ³ 0   0 ³ LU identification ³   5a
     ³   ³ spare ³     F=>P direction³
     Ã---Å-------Á---Â---------------´
     ³0/1³  U-plane  ³ U-plane frame ³   6
     ³   ³  class    ³ type;         ³
     Ã---Å-----------Å---------------´
     ³ 1 ³  U-plane  ³ U-plane frame ³   6a
     ³   ³ class F=>P³ type; F=>P    ³
     À---Á-----------Á---------------Ù
```

Fig. 28

| COMMENTS | BIT 8 | 7 | 6 | 5 | 4 | 3 | 2 | 1 | OCTET: |
|---|---|---|---|---|---|---|---|---|---|
| | 0 | <<IWU-ATTRIBUTES>> | | | | | | | 1 |
| | | LENGTH OF CONTENTS (L) | | | | | | | 2 |
| PROFILE ATTRIBUTES: | 0/1 | CODING | | | | PROFILE | | | 3 |
| PROFILE ATTRIBUTES: | 0/1 | NEGOTIATION INDICATOR | | | | SPARE | | | 4 |
| NETWORK ATTRIBUTES: | 0/1 | NWK ID | | EXTERNAL CONNECTION TYPE | | | | | 5 |
| NETWORK ATTRIBUTES: | 0/1 | NETWORK | | TE-NETWORK INTERFACE | | | | | 5a |
| NETWORK ATTRIBUTES: | 0/1 | EXTERNAL SERVICE TYPE | | | | | | | |
| LLC ATTRIBUTES: | 0/1 | LLC ID | | LLC CODING INDICATOR | | | | | 6 |
| LLC INFORMATION TRANSFER ATTRIBUTES: | 0/1 | SPARE | | INFORMATION TRANSFER CAPABILITY | | | | | 6a |
| LLC INFORMATION TRANSFER ATTRIBUTES: | 0/1 | TRANS MODE | | INFORMATION TRANSFER RATE | | | | | 6b |
| LLC INFORMATION TRANSFER ATTRIBUTES: | 0/1 | UNIT RATE | | RATE MULTIPLIER | | | | | 6b |
| LLC INFORMATION TRANSFER ATTRIBUTES: | 0/1 | STRUCTURE | | CONFIG. | | ESTABL. | | | 6c |
| LLC INFORMATION TRANSFER ATTRIBUTES: | 0/1 | SYMMETRY | | INFORMATION TRANSFER RATE (DEST => ORIGINATOR) | | | | | 6d |
| LLC INFORMATION TRANSFER ATTRIBUTES: | 0/1 | UNIT RATE | | RATE MULTIPLIER (DEST => ORIGINATOR) | | | | | 6e |
| LLC ACCESS ATTRIBUTES: | 0/1 | RATE ADAPT. | | SIGNALLING ACCESS PROTOCOL | | S/A | NEG. | | 7 |
| LLC ACCESS ATTRIBUTES: | 0/1 | USER RATE | | | | | | | 7a |
| LLC ACCESS ATTRIBUTES: | 0/1 | INTERN. RATE | | NIC ON TX | NIC ON RX | F-C tx | F-C rx | 0 | 7b |
| LLC ACCESS ATTRIBUTES: | 0/1 | STOP BITS | | DATA BITS | | PARITY | | | 7c |
| LLC ACCESS ATTRIBUTES: | 1 | DUP | | MODEM TYPE | | | | | 7d |
| LLC TRANSPARENT U-PLANE ATTRIBUTES: | 0/1 | SPARE | | USER INFORMATION LAYER 1 PROTOCOL | | | | | 8 |
| LLC TRANSPARENT U-PLANE ATTRIBUTES: | 0/1 | SPARE | | USER INFORMATION LAYER 2 PROTOCOL | | | | | 8a |
| LLC TRANSPARENT U-PLANE ATTRIBUTES: | 0/1 | SPARE | | USER INFORMATION LAYER 3 PROTOCOL | | | | | 8b |
| HLC ATTRIBUTES: | 0/1 | HLC ID | | HLC CODING INDICATOR | | | | | 9 |
| HLC ATTRIBUTES: | 0/1 | SPARE | | USER PROTOCOL ID | | | | | 9a |
| HLC ATTRIBUTES: | 0/1 | USER INFORMATION LAYER 4 PROTOCOL | | | | | | | 9b |
| HLC ATTRIBUTES: | 0/1 | USER INFORMATION LAYER 5 PROTOCOL | | | | | | | 9c |
| HLC ATTRIBUTES: | 0/1 | USER INFORMATION LAYER 6 PROTOCOL | | | | | | | 9d |
| HLC ATTRIBUTES: | 1 | USER INFORMATION LAYER 7 PROTOCOL | | | | | | | 9e |
| QoS ATTRIBUTES: | 1 | QoS ID | | SPARE | | | | | 10 |

| Octet: | Bits 8 | 7 | 6 | 5 | 4 | 3 | 2 | 1 |
|---|---|---|---|---|---|---|---|---|
| 1 | 0 | <<FACILITY>> | | | | | | |
| 2 | Length of Contents (L) | | | | | | | |
| 3 | 1 | 0 | 0 | Service discrimin. | | | | |
| 4 | 1 | MMS Action type | | | | Rep. | | Esc. |
| 5 | 0/1 | MMS sequence number | | | | | | |
| 5a | 1 | MMS sequence numbering (extension) | | | | | | |
| 6 | 0/1 | Service type | | | | | | |
| 7 | 0/1 | Service subtype | | | | Transmission type | | |
| 8 | 0/1 | Data content type | | | | | | |
| 9 | 0/1 | Action result | | | | | | |
| 10 | 0/1 | Command type | | | | | | |
| 11 | 0/1 | Information type | | | | | | |
| 12 | 0/1 | Command object | | | | | | |
| 13 | 0/1 | Command object (extension) | | | | | | |
| 14 | 0/1 | User data length | | | | | | |
| 14a | 0/1 | User data length (extension) | | | | | | |
| 14b | 0/1 | User data length (extension) | | | | | | |
| 14c | 1 | User data length (extension) | | | | | | |

| Bit: 8 | 7 | 6 | 5 | 4 | 3 | 2 | 1 | Octet: |
|---|---|---|---|---|---|---|---|---|
| 0 | << CALLED-PARTY-NUMBER >> | | | | | | | 1 |
| | Length of Contents (L) | | | | | | | 2 |
| 1 | Number Type | | | Numbering plan identification | | | | 3 |
| 0 | | | | | | | | 4 |
| 0 | Called Party Address | | | | | | | |
| 0 | (List of DECT characters) | | | | | | | L+2 |

Fig. 31

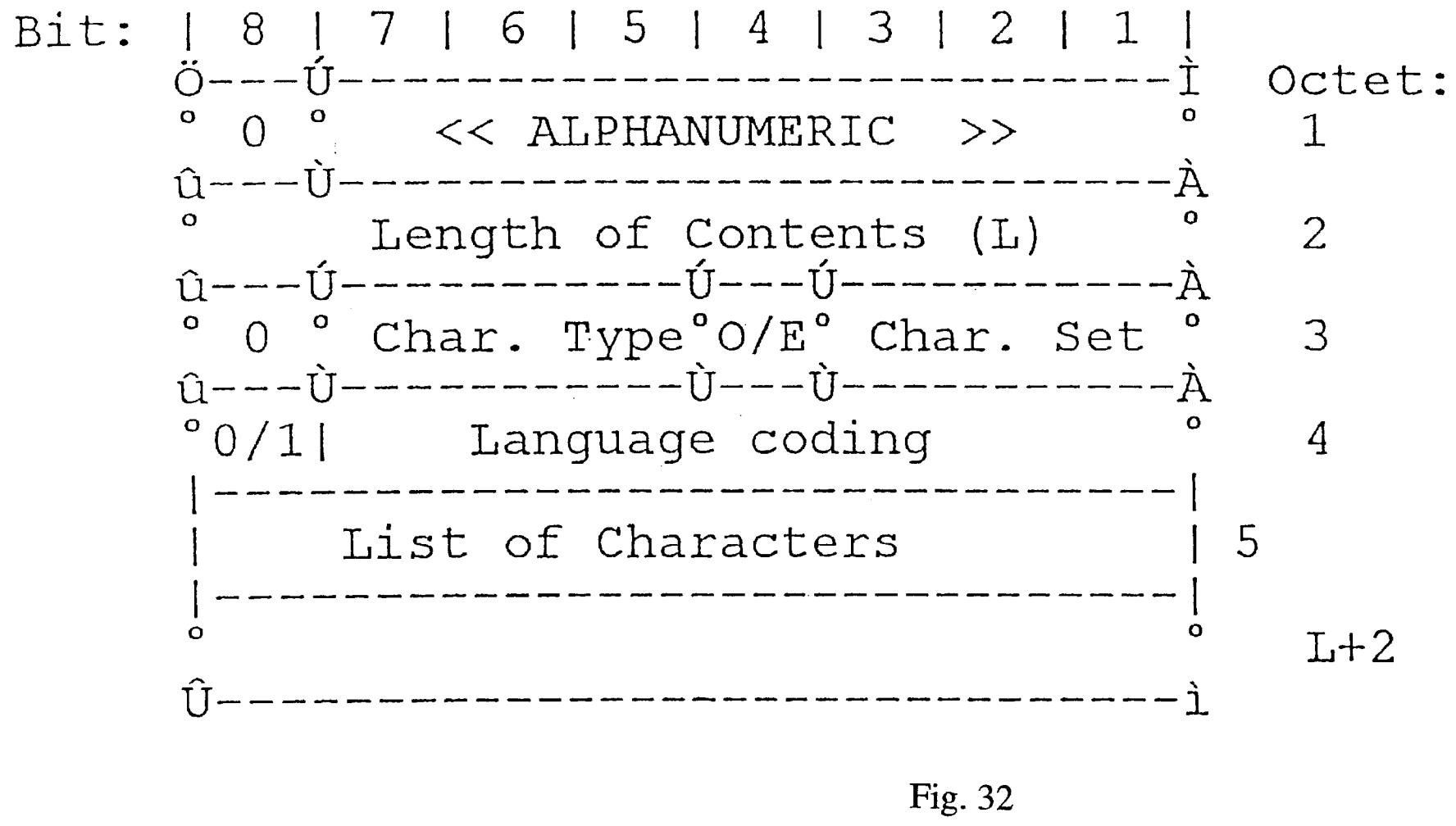

```
Bit: | 8 | 7 | 6 | 5 | 4 | 3 | 2 | 1 |
     Ö---Ú---------------------------Ì  Octet:
     ° 0 °   << ALPHANUMERIC  >>     °    1
     û---Ù---------------------------À
     °       Length of Contents (L)  °    2
     û---Ú----------Ú---Ú------------À
     ° 0 ° Char. Type°O/E° Char. Set °    3
     û---Ù----------Ù---Ù------------À
     °0/1|     Language coding       °    4
     |-------------------------------|
     |     List of Characters        | 5
     |-------------------------------|
     °                               °    L+2
     Û-------------------------------ì
```

Fig. 32

```
Bit: | 8 | 7 | 6 | 5 | 4 | 3 | 2 | 1 |
     Ö---Ú---------------------------Ì  Octet:
     °  0 °  << SERVICE-CHANGE-INFO >> °   1
     û---Ù---------------------------À
     °       Length of Contents (L)    °   2
     û---Ú-------Ú---Ú---------------À
     °0/1°  Coding° M °  Change Mode   °   3
     °ext°  std.   °   °               °
     °   °  std.   °   °               °
     û---é-------Ù---Ù---------------À
     °  1 °  Extended change mode      °   3a
     °    °                            °
     û---é-----------Ú---Ú-----------À
     °  1 °   A        ° R °   B       °   4
     °    °  attributes°   ° attributes°
     Û---Ù-----------Ù---Ù-----------ì
```

```
Bit:  | 8 | 7 | 6 | 5 | 4 | 3 | 2 | 1 |
      Ö---Ú---------------------------Ì   Octet:
      û---Ù---------------------------À
      °       Length of Contents (L)  °      2
      û---Ú---------------------------À
      °0/1°          Feature          °      3
      û---é---------------------------À
      ° 1 °         Parameter         °      3a
      Û---Ù---------------------------ì
```

Fig. 35

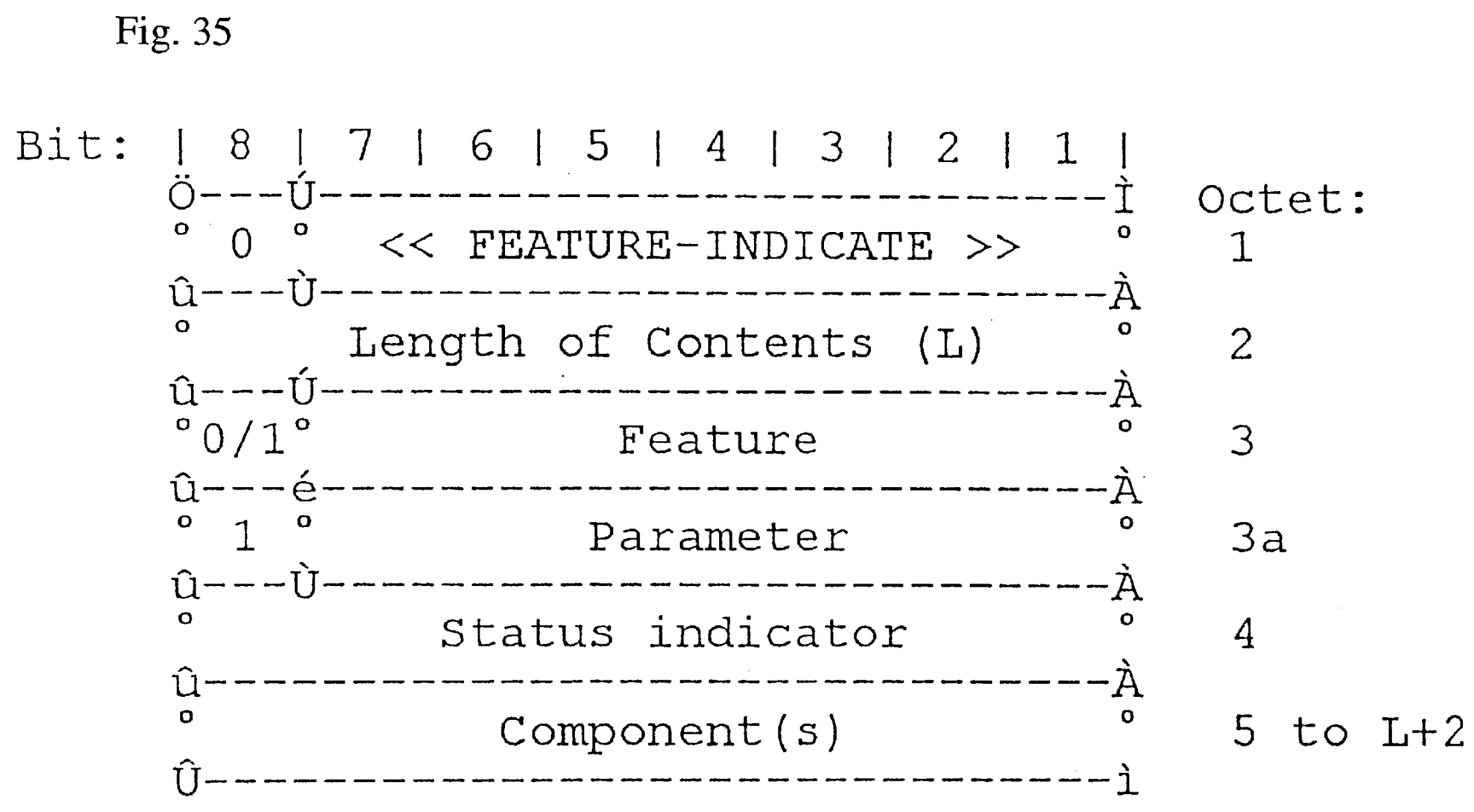

| Bit: 8 | 7 \| 6 \| 5 \| 4 \| 3 \| 2 \| 1 | Octet: |
|---|---|---|
| 0 | << FEATURE-INDICATE >> | 1 |
| Length of Contents (L) | | 2 |
| 0/1 | Feature | 3 |
| 1 | Parameter | 3a |
| Status indicator | | 4 |
| Component(s) | | 5 to L+2 |

Fig. 36

| Bit: 8 | 7 | 6 | 5 | 4 | 3 | 2 | 1 | Octet: |
|---|---|---|---|---|---|---|---|---|
| 0 | << IWU-TO-IWU >> | | | | | | | 1 |
| Length of Contents (L) | | | | | | | | 2 |
| 1 | S/R | Protocol Discriminator | | | | | | 3 |
| | | | | | | | | 4 |
| IWU-TO-IWU INFORMATION | | | | | | | | |
| | | | | | | | | L+2 |

| MESSAGE TYPE | FORMAT | DIRECTIONS |
|---|---|---|
| CC-INFORMATION | S | BOTH |

| INFORMATION ELEMENT | | SUB-CLAUSE | F TO P MESSAGE | P TO F MESSAGE | LENGTH OCTETS |
|---|---|---|---|---|---|
| PROTOCOL DISCRIMINATOR | | 7.2 | M | M | 1/2 |
| TRANSACTION IDENTIFIER | | 7.3 | M | M | 1/2 |
| MESSAGE TYPE | | 7.4 | M | M | 1 |
| | | | | | |
| IWU ATTRIBUTES | 6 | 8.2.3 | M/N | M/N | 5-* |
| LOCATION AREA | 4 | 7.7.25 | N | 0 | 3-* |
| NWK ASSIGNED IDENTITY | 4 | 7.7.28 | N | 0 | 5-20 |
| REPEAT INDICATOR | 5 | 7.6.3 | 0 | 0 | 1 |
| FACILITY | | 7.7.15 | 0 | 0 | 2-* |
| REPEAT INDICATOR | 5 | 7.6.3 | 0 | N | 1 |
| PROGRESS INDICATOR | | 7.7.31 | 0 | N | 4 |
| DISPLAY | | 7.5.5 | 0 | N | 2-* |
| KEYPAD | 1 | 7.5.5 | N | 0 | 2-* |
| SIGNAL | | 7.6.8 | 0 | N | 2 |
| FEATURE ACTIVATE | | 7.7.16 | N | 0 | 3-4 |
| FEATURE INDICATE | | 7.7.17 | 0 | N | 4-* |
| NETWORK PARAMETER | 4 | 7.7.29 | N | 0 | 4-* |
| CALLING PARTY NUMBER | | 7.7.9 | 0 | 0 | 5-* |
| CALLED PARTY NUMBER | 1,3 | 7.7.7 | 0 | 0 | 4-* |
| CALLED PARTY SUBADDR | 3 | 7.7.8 | 0 | 0 | 4-* |
| SENDING COMPLETE | 2 | 7.6.2 | 0 | 0 | 1 |
| TEST HOOK CONTROL | | 7.6.10 | 0 | N | 2 |
| REPEAT INDICATOR | 5 | 7.6.3 | 0 | 0 | 1 |
| MMS PROTOCOL | | | 0 | 0 | 8- |
| TIME/DATE | | | 0 | 0 | 8 |
| SEGMENTED INFO | | 7.7.37 | 0 | 0 | 4 |
| ALPHANUMERIC | | 7.7.3 | 0 | 0 | 4-* |
| IWU-TO-IWU | | 7.7.23 | 0 | 0 | 4-* |
| IWU-PACKET | | 7.7.22 | 0 | 0 | 4-* |

M = MANDATORY; 0 = OPTIONAL
N = NOT ALLOWED:

FIG.37

PP Originated Call

PP Terminated Call

MESSAGING SYSTEM

BACKGROUND OF THE INVENTION

This invention relates to a messaging system, in particular a messaging system for use in the DECT (Digital European Cordless Telecommunications) system and other communications systems such as WCPE (Wireless Customer Premises Equipment) and PHS (Personal Handyphone System). The system may be used to provide a multipurpose messaging service that can be used for access to alternate data/messaging services with a common air interface structure accomplished with a general protocol layer defined on the top of the DECT protocol layers.

One implementation of a DECT system will now be described.

The Digital European Cordless Telecommunications (DECT) is a standard provided for cordless communications for both voice and data traffic. Reference may be had to the ETSI documents defining the system, which are incorporated herein by reference. A DECT system includes at least one portable part (PP) and at least one fixed part (FP). The PP contains all elements between the user and the air interface whereas the FP contains all elements between a local network and air interface. Thus no fixed infrastructure has been defined. The connection to the networks is made through interworking unit (IWU), functions of which are defined in the DECT profiles.

The DECT protocol layer structure is illustrated in the FIG. 1. The following descriptions of the layers are based on the common interface standard ETS 300 175-1 to 9. Radio Equipment and Systems (RES); Digital European Cordless Telecommunications (DECT) Common interface Part 1-9. European Telecommunications Standards Institute 1992 thus the features described here form a library of services for use by different profiles. DECT provides on the physical layer, in the frequency band of 1880–1900 MHz, 10 carriers each of which are carrying 24 TDMA slots. The slots can be used for either bi-directional (12 slots for both directions) or unidirectional traffic (maximum of 23 slots for one direction). The gross bit rate is 1152 kbit/s. A timeslot is divided into control/signalling (4.8 kbit/s net rate) and traffic fields (32 kbit/s net rate).

The medium access layer (MAC) can provide broadcast, connectionless and connection oriented service. The connection oriented service can be non-protected or protected. The protected service provides a possibility for modulo 2 retransmisson.

The data link control layer is divided into C- (signalling and low rate user traffic) and U-planes (user traffic). The U-plane can provide the following services for the upper layer application: LU1 transparent unprotected data (for voice), LU2 frame relay (data), LU3 frame switching (LU2 with LAP protocol for data), LU4 forward error correction (data), LU5 and LU6 rate adaptation for V.110 traffic. In addition LU7 is defined in the DECT/ISDN interworking profile to provide services for ISDN traffic.

The network layer on the C-plane contains the following services: Call Control (CC) used for call establishment and maintenance, mobility management (MM), call independent supplementary service (CISS) used for supplementary services, connection oriented message service (COMS) is an acknowledgment service used for transportation of limited amount of user data and Connectionless message service (CLMS) used for broadcast or point to point connectionless traffic. Call related supplementary services (CRSS) are related to a CC call and it provides a specific keypad protocol for the service management. The U-plane does not have a network layer.

BRIEF SUMMARY OF THE INVENTION

According to a first aspect of the present invention there is provided a messaging system for communicating a message between a first communications unit having a first messaging entity and a second communications unit having a second messaging entity, each messaging entity comprising: a messaging call control means for establishing a messaging communications link with the other messaging entity; and a messaging means for, once the messaging communications link has been established, exchanging messaging information with the said other messaging entity.

Preferably, the messaging entity constitutes a virtual layer between the application layer and the network layer of the communication protocol.

The messaging information suitably includes header data and user data associated with the message. The header data and the user data suitably include data defining a message sequence number of the message. The header data and the user data are preferably carried by different communications links. Most preferably one link operates through a C-plane and the other link operates through a U-plane of a communication protocol.

The messaging system suitably operates according to the DECT, WCPE or PHS protocols. One of the communications units may be a portable part and the other is a fixed part. Alternatively, one of the units may be an intermediate server unit. One of the communications units may be provided with an interworking unit for performing protocol conversion.

According to the present invention from a second aspect there is provided a messaging method for communicating a message between a first communications unit and a second communications unit, the first communications unit having an application layer, a messaging entity and a network layer, the method comprising the steps of: transmitting a signal from the application layer to the network layer as a means of establishing a call; exchanging messaging information between the application layer and the network layer by way of the messaging entity to communicate the message; and transmitting a signal from the application layer to the network layer as a means of disconnecting the call.

According to the present invention from a third aspect there is provided a messaging method for communicating a message between a first communications unit and a second communications unit, the first communications unit having an application layer, a messaging entity and a network layer, the method comprising the steps of: transmitting a signal from the messaging entity to the network layer as a means of establishing a call; exchanging messaging information between the application layer and the network layer by way of the messaging entity to communicate the message; and transmitting a signal from the messaging entity to the network layer as a means of disconnecting the call.

In the messaging system/method commands can preferably be sent between messaging entities of each communications unit. The commands preferably include MMS SEND, MMS RETREIVE, MMS-RETREIVE-RPY, MMS COMMAND, MMS-COMMAND-RPY and MMS STATUS.

A messaging entity can preferably request a reply from the other messaging entity or an end entity. The said header data is preferably conveyed in one or more DECT/WCPE/

WLL call control information elements and most preferably in one CC message.

The messaging system/method preferably includes any or all aspects of the up/downgrading, the service negotiation and the interworking procedures and the <<BASIC-SERVICE>> element described below.

The present invention suitably relates to a system for, for instance, providing teleservices for FAX and short message (such as GSM SMS) transfer. This may suitably allow for GSM interworking and also, generally, may extend the capabilities of DECT systems. In the future the demand for data messaging may also expand to other teleservices/data services (such as Internet based messaging/file transfer) and the present invention may preferably provide for this too. Employing a preferred embodiment of the invention a DECT system may expand from a cordless telephone system into a multipurpose information system with a wide variety of information services. At the same time it may offer also basic voice traffic and hence widen the possibilities for DECT service providers and manufacturers.

The present invention suitably provides a messaging service for a DECT system which can provide a wide variety of network services with a single new protocol layer compared to prior art DECT systems. In this way a simple and cheap portable terminal with wide variety of messaging/data services may suitably be provided for users. The protocol preferably contains a general set of minimum functionality for all alternate services, because the services contain such a wide variety of different options that it may conceivably be difficult to accomplish all functions of different services at the same time while maintaining a low level of complexity of a protocol.

The new protocol layer will be referred to as a multipurpose messaging service (MMS). The MMS protocol may preferably provide for general interworking to multiple information services such as T.611 Fax, GSM SMS, CCITT X.400 and internet HTTP.

The protocol may preferably be usable by both short messaging and fax/file services. The principal difference between these type of services is in the transmission capability: the short messaging preferably uses only the control channel (C-plane) for MMS signalling and user data transfer whereas the fax/file service preferably uses the traffic channel (U-plane) for user data and control channel (C-plane) for MMS signalling. This type of structure can suitably provide a flexible service. That is, a U-plane bearer service (C.2 data profile) can suitably be upgraded into fax/file transfer-teleservice by adding the MMS protocol on it. Also short messaging (E profile) can suitably be upgraded to a fax service by adding the U-plane service to the short messaging. Downgrading is preferably also possible. These procedures can suitably be done during already established connection as illustrated in FIG. 2. This procedure can be utilized for instance by sending the user a short message indicating that a fax is arriving. The user can, if he is capable to receive the fax, upgrade his short message connection into a fax capable high speed service to receive the fax.

Since the prior art DECT air interface typically supports only a limited service negotiation capability, the present invention preferably also provides for a new flexible service negotiation, suitably by adding new elements to some DECT messages. In this way the service negotiation may suitably be more flexible and some interworking unit/network service parameters may suitably be negotiated/changed even during call establishment. Also a new coding of the DECT IWU selection (<<iwu-attributes >>) element may preferably be used to provide more general coding to IWU service selection. This may help to overcome the problem that prior art DECT coding is only ISDN oriented and does not fit well into general data service selection. The new coding is preferably backwards compatible with the old coding.

Aspects of the present invention may help to provide the following advantages:

- allowing a wide set of services to be accessed in a standardized simple way;
- providing relatively simple terminal applications, so the terminals can be simple and cheap;
- providing an up/down grading procedures allowing a user friendly flexible service system to be implemented;
- allowing expansion of the DECT systems and terminals for future data services;
- minimizing the changes required in the DECT protocol layers
- keeping close to the GAP DECT general voice profile, reducing the changes required in standard DECT terminals Processing aspects of the present invention may suitably be provided by appropriate software operating under the control of a processor in a fixed or portable part.

BRIEF DESCRIPTION OF THE DRAWINGS

The present invention will now be described by way of example only, with reference to the accompanying schematic drawings, in which:

FIG. 27 shows the BASIC-SERVICE information element;

FIG. 28 shows the CALL-ATTRIBUTES information element;

FIG. 29 shows the IWU-ATTRIBUTES information element;

FIG. 30 shows the FACILITY information element;

FIG. 31 shows the CALLED-PARTY-NUMBER information element;

FIG. 32 shows the ALPHANUMERIC information element;

FIG. 33 shows the SERVICE-CHANGE-INFO information element;

FIG. 34 shows the FEATURE-ACTIVATE information element;

FIG. 35 shows the FEATURE-INDICATE information element;

FIG. 36 shows the IWU-TO-IWU information element;

FIG. 37 shows the CC-INFOrmation message;

DETAILED DESCRIPTION OF THE INVENTION

Figure 1:
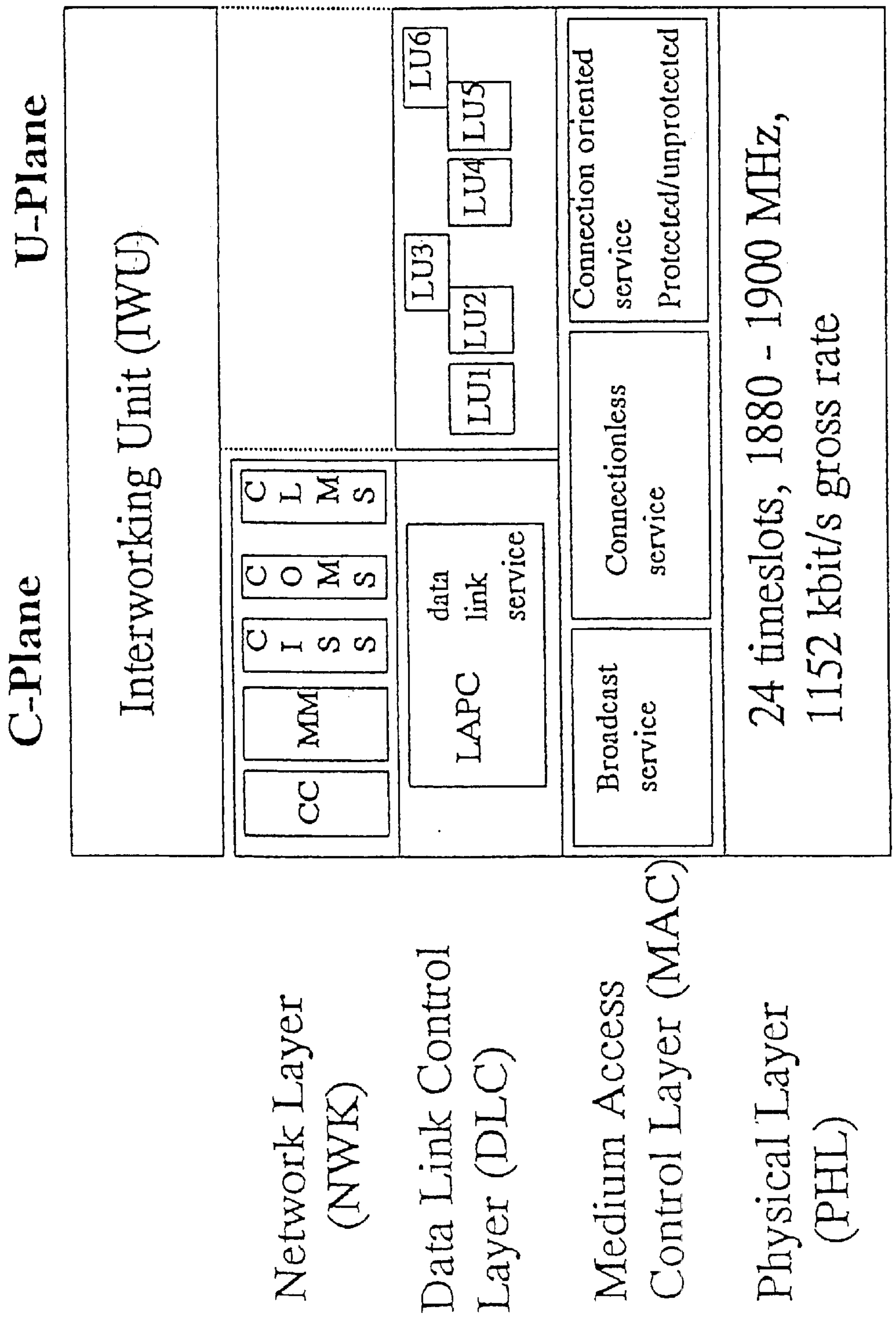
FIG. 1 shows DECT layers and services.
Figure 2:
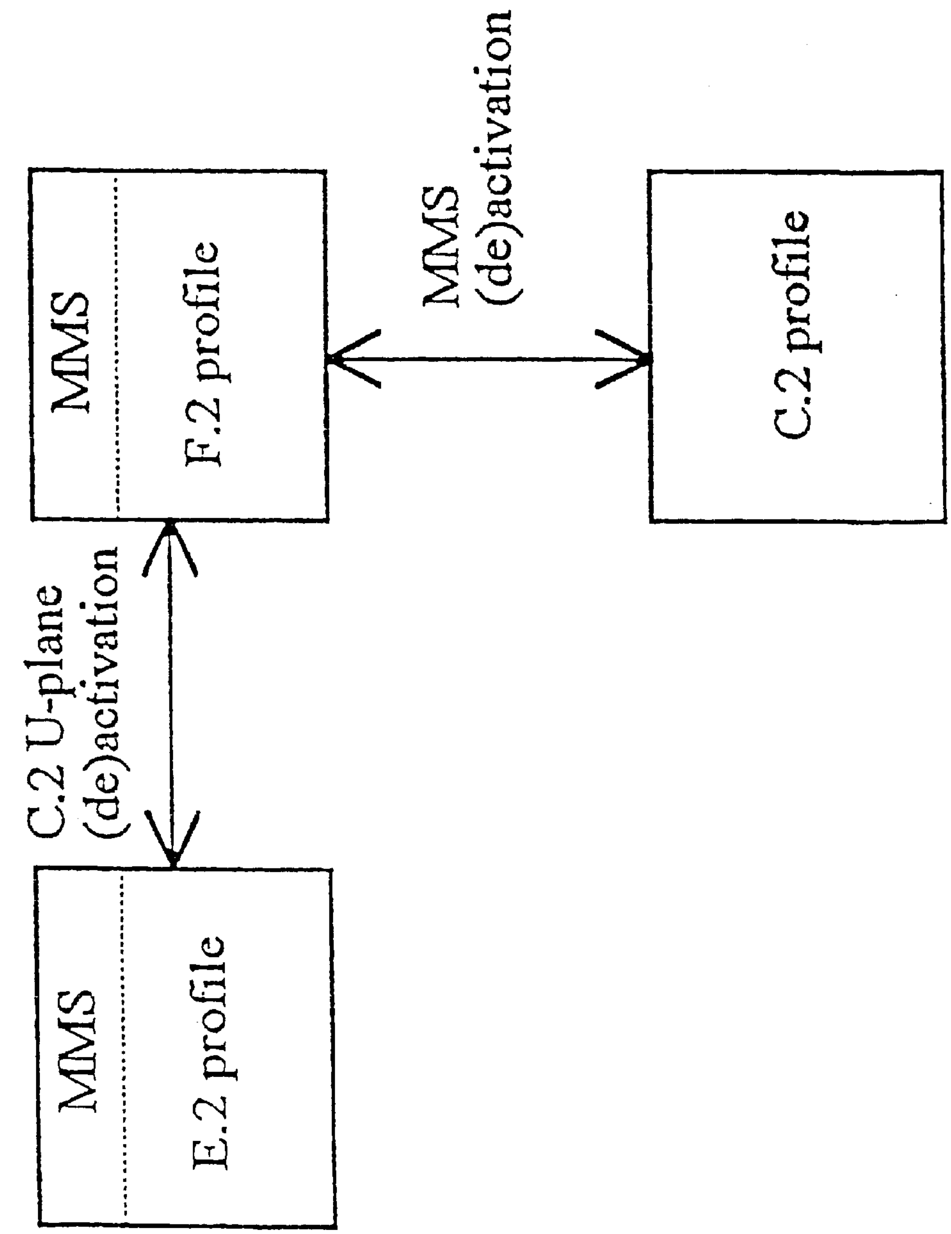
FIG. 2 shows the upgrading/downgrading procedures.

The MMS definitions and the MMS functional model will first be defined and concepts relating to the MMS, its architecture, basic functionality and the relationship of the MMS to the DECT protocol layer model and to the outside networks will be clarified.

The horizontal MMS model defined below specifies the position of the MMS and the MMS entities in relation to the outside networks and in DECT physical and logical entities (FPs, PPs and IWUs). The architecture section below defines the MMS virtual layer internal structure. The functions section below defines the functionality of the MMS virtual layer. Full-API, half-API and non-API models are also clarified below.

The vertical MMS model defined below specifies the position of the MMS to the DECT layer structure: to the DECT network layer (NWK) and to the application/Interworking Unit (IWU).

The following bullets give a general view of the MMS functions, its advantages and its properties.

- MMS is a generic set of commands and information elements for file/messaging service.
- MMS provides a generic file handling/messaging services over the DECT air interface by utilizing the DECT transportation mechanism in the best way possible at the same time offering a general set of functions to the applications using its services.
- MMS provides a compact subset of functions to information servers with the advantage that a single terminal with MMS support can use a wide variety of information and messaging services with minimum amount of application layer complexity. If a complete set of services is needed an escape sequence has to be used or some other means such as transparent protocol transportation mechanism are needed.
- MMS is in fact a DECT messaging service with wide selection of data types. It is very much like GSM SMS with wider variety of data types and operations without the length limitation of the messages. Thus MMS provides GSM SMS SM-TP layer services as a subset of its functions.
- MMS is not a real protocol layer in the terms of OSI model but it is a virtual layer which utilizes the services of the DECT Call Control entity. It could be regarded as a supplementary service type of service that provides signalling/control and application specific information related to the teleservices provided by the DECT data profiles. MMS messages are part of the DECT Call Control messages and are accessed through the CC primitives.
- For the MMS and data profiles utilization an Application Programming Interface (API) can be used to provide an application independent interface. This interface provides a standard set of a primitives for MMS messaging. However, even though the application see the MMS as protocol layer when using the API access points the MMS is only utilizing the CC entity functions with some added features.
- MMS itself is a stateless virtual protocol which defines a set of framing rules and information elements each containing optional and mandatory information fields.
- MMS can be regarded as a non-existent protocol layer. That is, it does not have to exist in real DECT protocol layer structure. However, it is treated in this context as a real (virtual) protocol layer for clarifying the concepts, functions and vertical interactions in the protocol structure.

Figure 3:
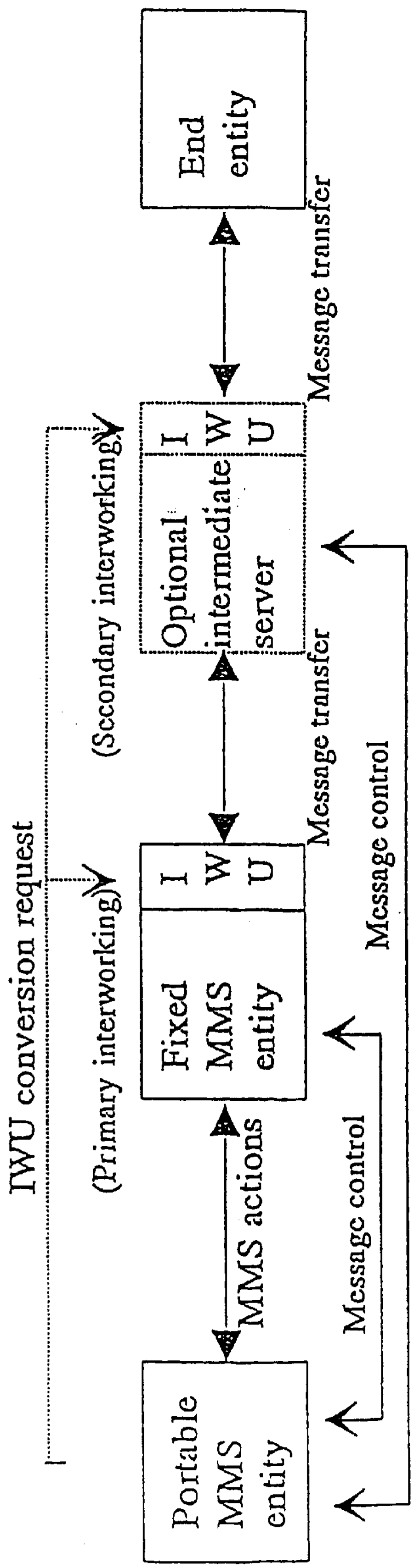
FIG. 3 shows MMS definitions.

The MMS horizontal definitions (i.e. the relations of the messaging service to the outside networks as well as the different DECT MMS and outside (IWU) network entities) will now be defined. FIG. 3 illustrates some of the MMS definitions.

Portable MMS Entity: Portable MMS Entity is the PP.

Fixed MMS Entity: Fixed MMS Entity is the FP with Interworking Unit (IWU).

MMS entity: Portable MMS Entity or Fixed MMS Entity, an entity with MMS messaging capabilities MMS action: MMS actions take place between MMS entities. The actions provide means for message and file transfer or retrieval between these MMS entities. Also a set of controlling actions are available for the remote transactions focused into a MMS message/file stored/handled by the Message Control Entity. The Message Control Entity may send status information data as a response to a control action or to a specific request set by other MMS actions.

Message Control Entity: The Message Control Entity is a server that is responsible for the controlling of the message sent by a MMS entity or the End Entity. It can be either the intermediate server or fixed MMS entity. The Portable MMS entity can control the messages in the Message Control Entity i.e. request the status, cancel the message forwarding etc. Also the portable MMS entity may be a Message Control Entity. In this case the Fixed MMS Entity or the intermediate server can control the message in the Portable MMS Entity. After the Message control entity has finished its transaction (forwarding the message) the message cannot be controlled anymore. In this case only status information regarding the message can be requested from or sent by the Message Control Entity.

Intermediate server: An optional intermediate server can be in the messaging network. This intermediate server is on the other side of the Fixed MMS Entity IWU i.e. in the interworked network. The protocol between the Fixed MMS Entity and the intermediate server may be selected by the MMS (primary IWU conversion) as well as the protocol between the intermediate and the End Entity (secondary IWU conversion). The selection of these protocols can be left to the Message Control Entity and/or to the Fixed MMS Entity. The intermediate server could be a GSM Short message service center (SC) or a Fax server in LAN environment. With MMS the message/file processing taking place in the intermediate server can be controlled. In this case the intermediate server is the Message Control Entity. If no intermediate server address is defined then the Fixed MMS Entity is the Message Control Entity.

End entity: The End Entity is the final object of the message transfer. It does not necessarily understand MMS messaging i.e. the Fixed MMS Entity (primary IWU conversion) or the intermediate server (secondary IWU conversion) may do protocol conversion according to the requests set in the MMS messages. The End Entity can also be another MMS entity, for instance, the Fixed MMS Entity can forward a MMS message to another the Portable MMS Entity. In this case the Fixed MMS Entity is Message Control Entity.

MMS addressing: MMS protocol provides addressing for the intermediate server and End Entity. The intermediate server address is provided during the MMS call establishment to define the intermediate server as a Message Control Entity. If no address has been defined the fixed MMS entity is the Message Control Entity. The End Entity address is sent in MMS actions. If no End Entity address is present then the message is processed by default by the Message Control Entity.

Primary IWU conversion: The protocol conversion done in the Fixed MMS Entity according to the request of the MMS action or spontaneously according to interworking requirements.

Secondary IWU conversion: The protocol conversion done in the intermediate server according to the request of the MMS action that is converted to a action in the Fixed MMS entity or spontaneously according to interworking requirements.

Figure 4:
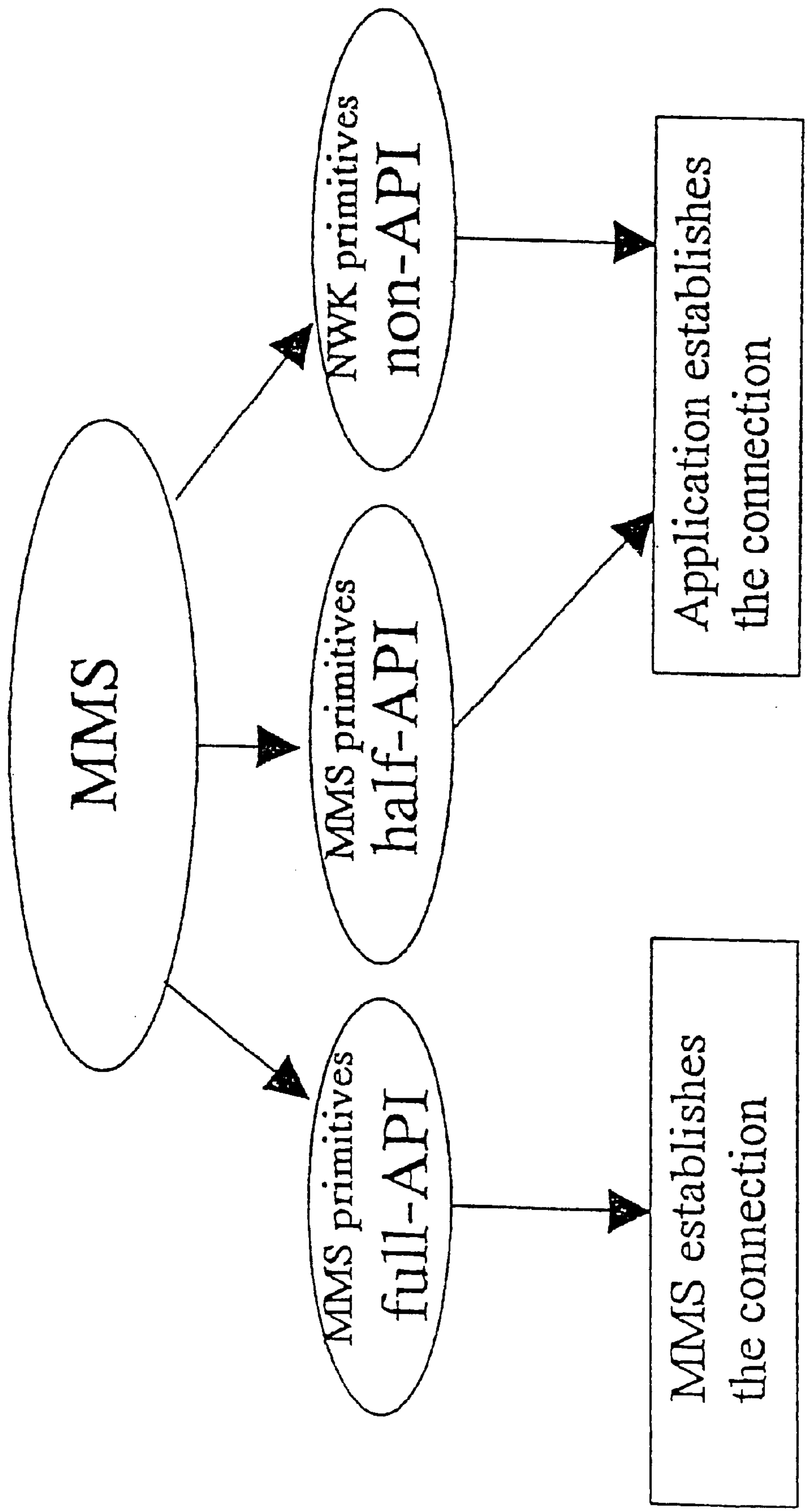
FIG. 4 shows MMS API relations.

The functionality of the MMS will now be described. In general the MMS functions as a stateless protocol. The full API protocol model defines the internal structure of the MMS API and the MMS virtual layer when the call control interactions are done by the MMS part itself directly according the rules defined in the interworking definitions. The half and non-API protocol models define how the MMS API or non-API primitives are used to control the MMS call and send MMS messages according to the definitions done in the service interworking definitions (see FIG. 4).

In half-API and non-API models the only task of the MMS is to packetize the information received from the application. The MMS standard frame format contains MMS specific information. After framing the MMS requests the network layer to transport the frames over the air interface. MMS layer may provides primitives for call control and MMS transportation to the application layer and the entity uses NWK primitives. In this case it is a half API interface (i.e. MMS does only framing) and in fact the call control primitives it offers to the application are network layer primitives. The other option, the non-API, is to define MMS as a set of information elements and framing rules. In this case the application will use directly the network layer primitives for call establishment, control and release and there are no MMS primitives. In this case MMS is only an addition of the CC or COMS entity (i.e. not more than a new set of information elements). The procedures relating to call control behavior are done in the interworking definitions. Thus the application becomes more complex.

Figure 5:
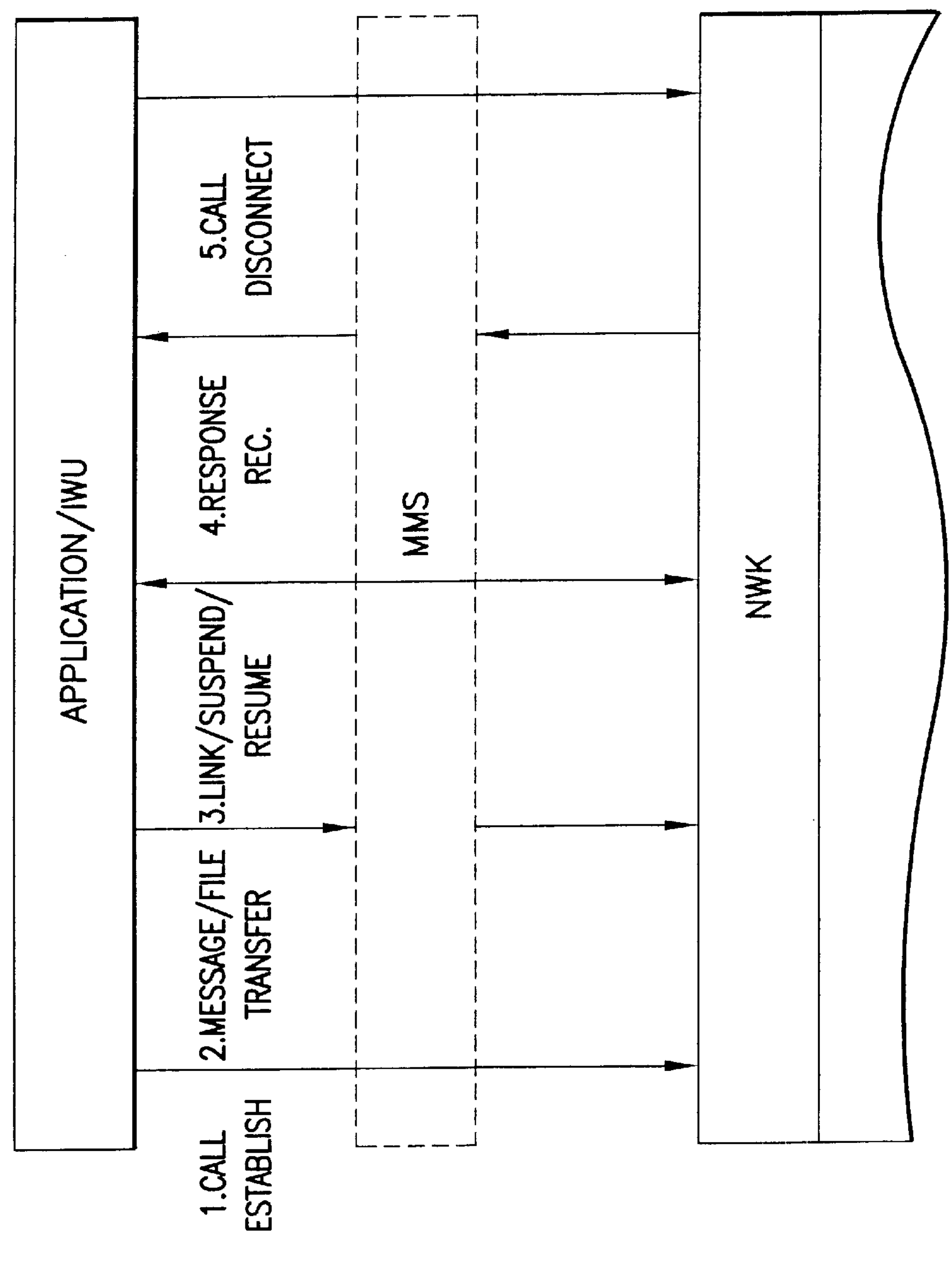
FIG. 5 shows MMS interaction half API and non-API cases.

FIG. 5 shows the following instructions: 1. Call establishment; 2. Message/file transfer (with MMS framing); 3. Link suspend/resume (optional); 4. Response received; and 5. Call disconnect. The features of the models are listed below.

Half-API Model

- API primitives available to the upper layer
- MMS is a set of framing and messaging rules
- stateless
- the application controls the call control through API primitives Non-API Model

- DECT NWK primitives used by the upper layer
- MMS is a set of framing and messaging rules, the application fulfills these rules for its own purposes
- stateless
- the application controls the call control directly through the NWK primitives Some potential advantages and disadvantages of this protocol model are:

- MMS is a part of CC or COMS entity thus no additional protocol layer structure has to be defined into DECT standard
- the MMS definition is easy i.e. it is only a set of framing rules and information elements
- the call establishment procedures can be built into the application or interworking annex. This is important since the procedures vary from application to application.

In the full-API model the MMS is a protocol layer with only few primitives such as MN-MMS-SEND.Req, MN-MMS-FETCH.Req or MN-MMS-SEND-RPY.Ind. The call establishment is solely the matter of MMS layer (i.e. it establishes a call and sends the data by using Network layer primitives). The rules for MMS functionality are different in different cases of interworking service: i.e. the requirements of FTP are different to GSM SMS. The MMS information general descriptions are done in the general definitions and the required behavior of the MMS with network layer is defined in the interworking annexes to different services. Thus the complexity is moved from the application to MMS. In this case MMS is a full Application Programming Interface (API) that provides a standard access point for the applications.

Figure 6:
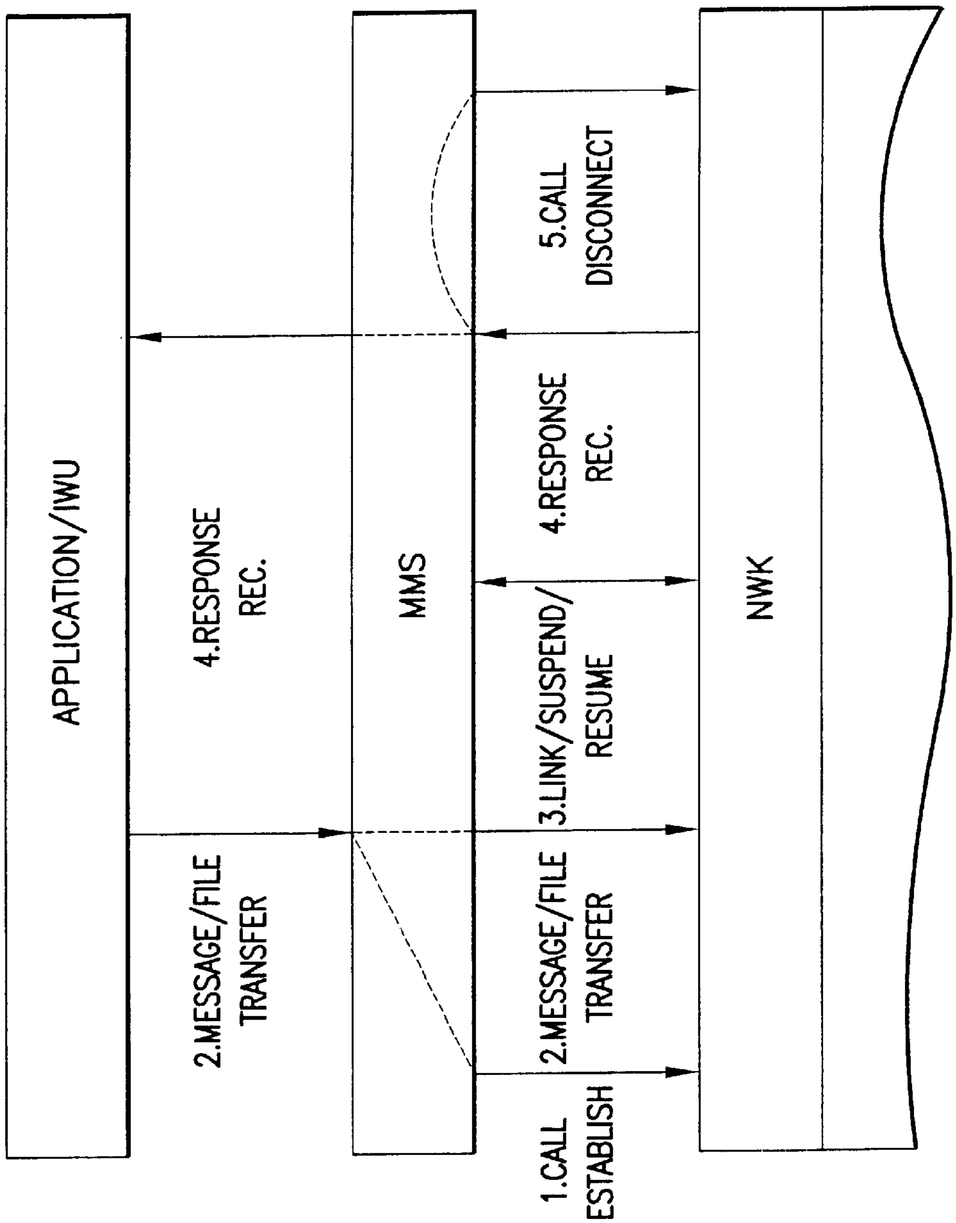
FIG. 6 shows MMS interaction full API case.

FIG. 6 shows the following interactions: 1. Call establishment; 2. Message/file transfer; 3. Link suspend/resume (optional); 4. Response received; and 5. Call disconnect. The features of the model are listed below.

Full-API Model

- limited set of API primitives available to the upper layer
- MMS is a set of framing and messaging rules
- stateless or states
- the MMS controls the call control using NWK primitives Some potential advantages and disadvantages of this protocol model are:

- A question raises whether MMS is part of DECT network layer or the interworking unit or a new protocol layer. The latter may imply a change in the structure of DECT The application remain simple, however, it is possible that the MMS behavior varies from application to application. Thus in each service interworking annex the MMS call control would have to be defined. This lowers the level of flexibility.

The MMS virtual layer internal architecture will now be defined in general terms.

Figure 7:
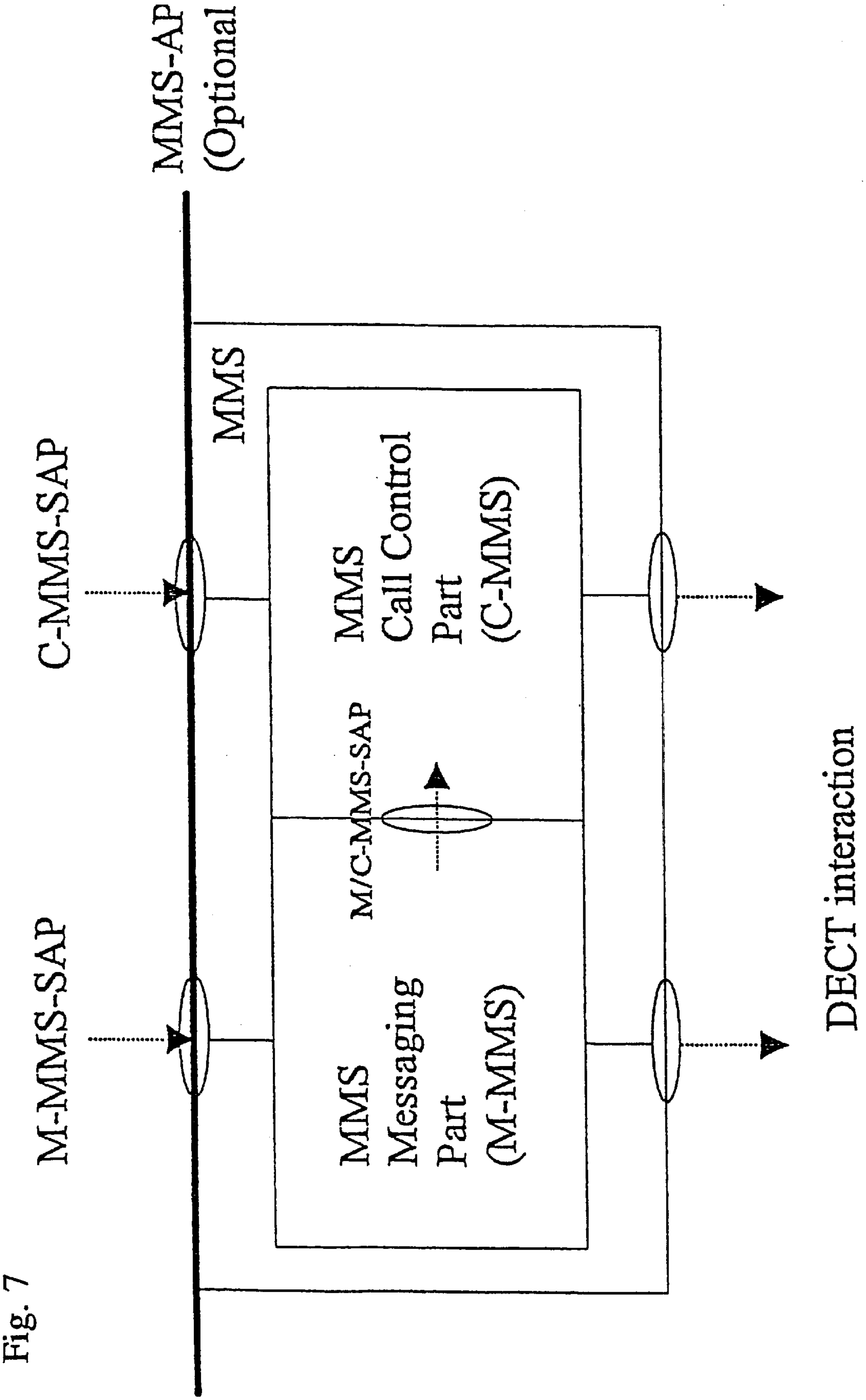
FIG. 7 shows MMS internal structure.

The MMS entity is divided into two separate parts: the call control entity (C-MMS) and the messaging entity (M-MMS). The structure is illustrated in FIG. 7. The C-MMS and M-MMS detailed functionality is service/application dependent and is described in the specific interworking descriptions.

The MMS messaging part provides means to the upper layer (application/IWU) to send and received MMS specific messages with MMS specific information between two horizontal MMS entities. The M-MMS part can only function if either the C-MMS part has established a connection between the horizontal entities according to the request of the M-MMS or the upper layer entity. M-MMS may provide a set of primitives to the upper layer or not. It contains MMS messaging framing rules and those rules may be either utilized by defining a set of primitives or the application itself may fulfill these framing/message contents rules when utilizing the MMS services. That is, in the former case DECT provides a standard MMS application programming interface (full or half MMS-API) to the upper application. In this case M-MMS-SAP exists. In the latter case DECT provides standard rules for MMS messaging to the upper layer applications. In this case DECT CC primitives are directly used and no M-MMS-SAP exists (non-API).

The M-MMS may control optionally the C-MMS part of the MMS entity by using as the access point the M/C-MMS-SAP point which is a service access point defined in between MMS virtual layer parts. The functionality of the M-MMS towards the C-MMS entity may be defined in the service/application interworking definitions. This is the full API model.

The M-MMS part can be itself divided into two parts: User data and User control data parts.

User data part provides the functionality to convey the pure data the user (application) wants to transmit i.e. a fax image data, the short message text etc.

User control data part provides the functionality to convey the additional control data that is combined into the MMS message such as control information to the server, time stamp information, recipient address, response request.

The MMS Call Control Part establishes a connection between two horizontal MMS entities according the request of either the upper layer entity (application or IWU) or the M-MMS part. It forwards the call control requests to the lower layers. The C-MMS-SAP may exist on the upper interface. C-MMS-SAP defines the required information for call establishment. However, it exists only in the case the MMS-API has been defined into the MMS. Another option is that the upper layer (application/IWU) fulfills the connection control requirements defined in the DECT interworking profiles. This is the half API or non-API model.

The optional M/C-MMS-SAP resides between M-MMS and C-MMS parts. Thus it cannot be accessed by the application and it is not a part of the MMS-API. It is a C-MMS service access point and provides part of the C-MMS-SAP primitives directly to the M-MMS part. The M-MMS part usage of the M/C-MMS-SAP is defined in the, interworking definition which is specific to a service to be interworked. The upper layer application cannot control completely the call is the case of the M/C-MMS-SAP usage. That is, the M-MMS is in this case responsible of the call establishment and release. The link suspension and release may be requested by the application. This is the full API model.

The MMS vertical relations (i.e. how it interacts its functionality with the upper and lower protocol layers) will now be defined.

The vertical model defines a (full and half) MMS-API, and a non-API interfaces to the application/interworking. The API provides a standard set of primitives to the upper layers. The non-API defines the rules/primitives of the CC entity for a standard set of MMS actions.

Figure 8:
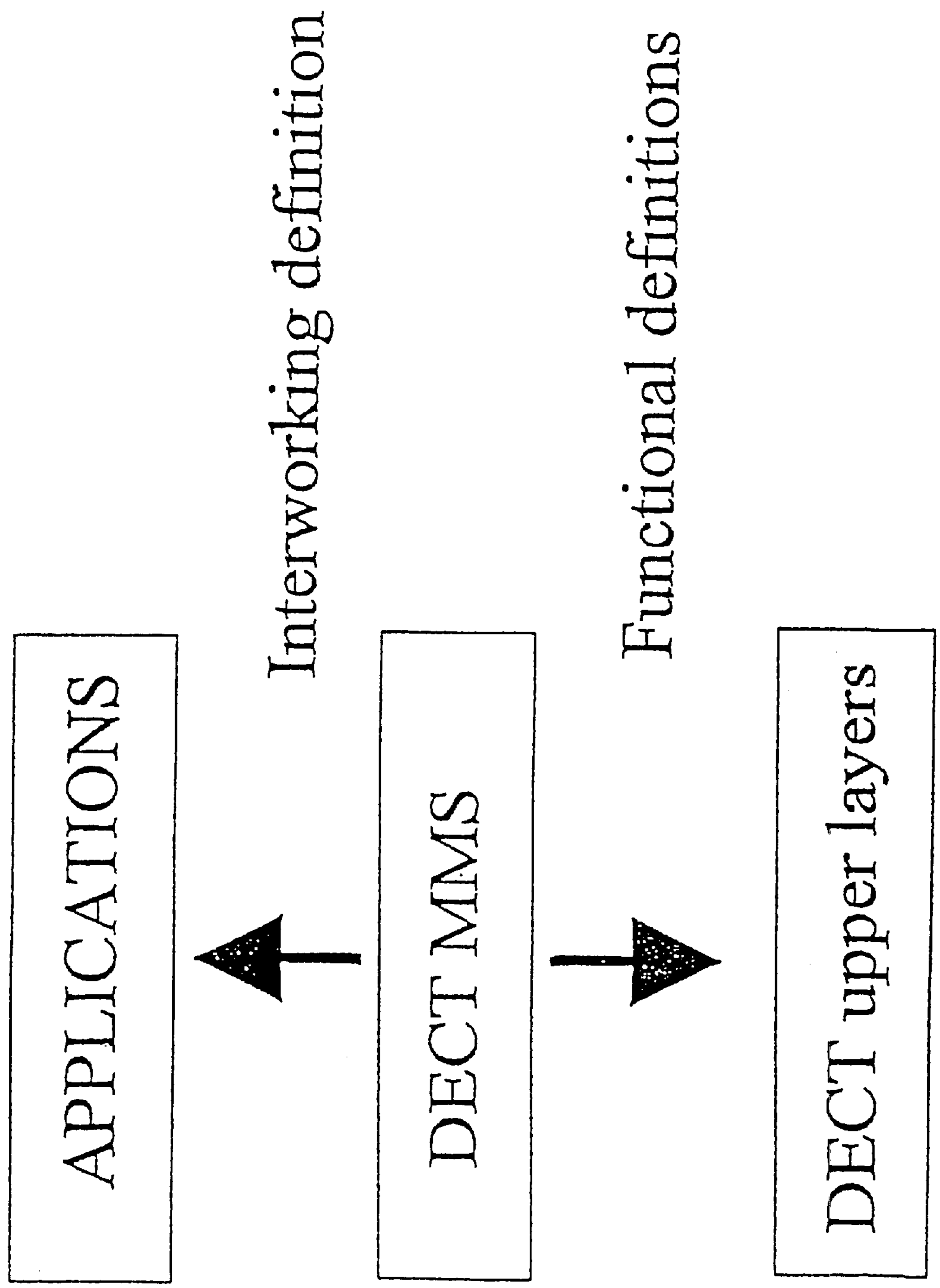
FIG. 8 shows modeling.

In order to provide full functionality the interworking of the protocol has to be defined to both directions: up to the application/interworking unit and down to the DECT layers. The following chapter defines the interworking definitions and the chapter following that defines the functionality of the DECT upper layers with MMS (see FIG. 8).

Figure 9:
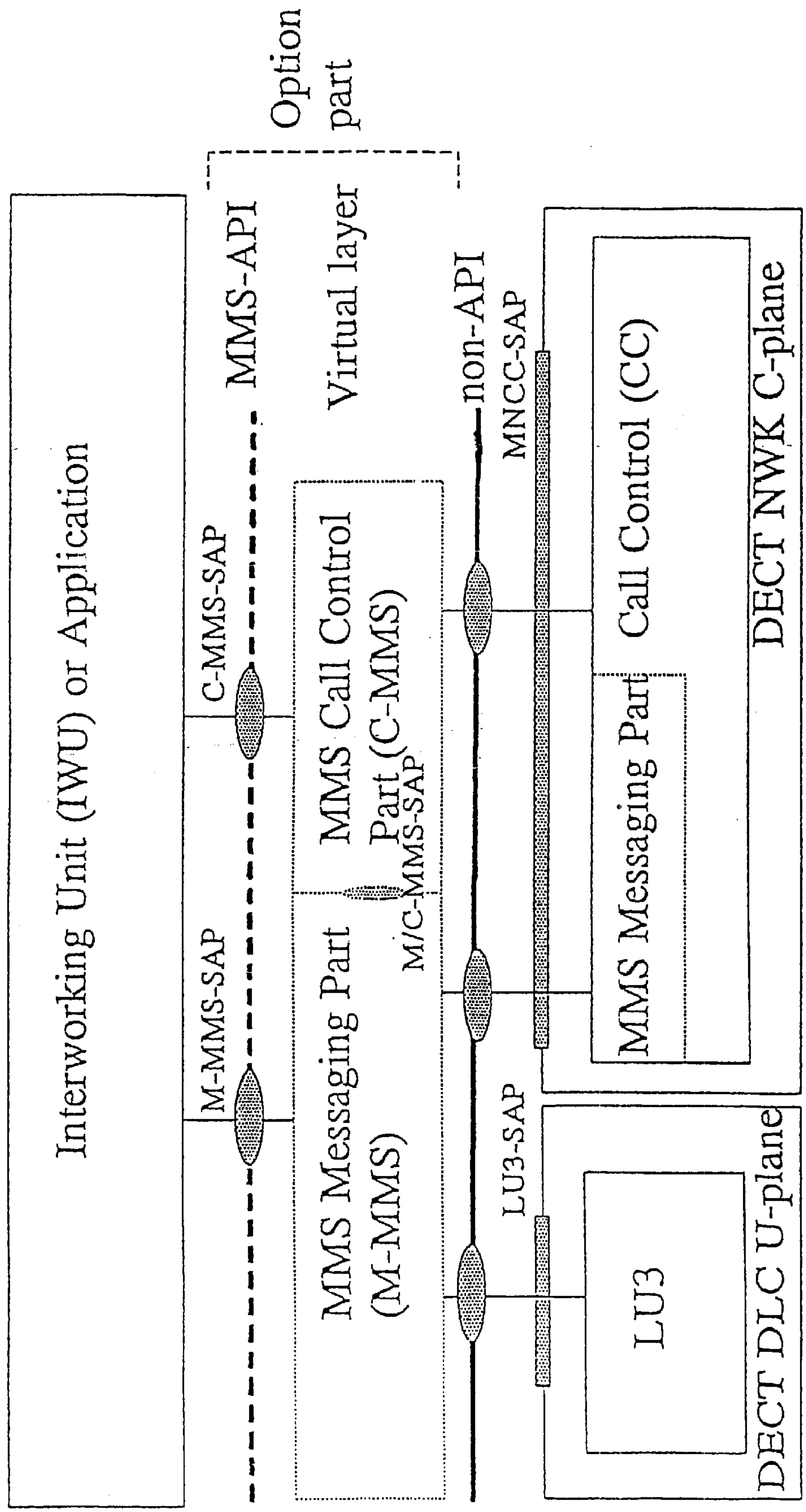
FIG. 9 shows the complete MMS layer structure.

MMS-API layer is a completely optional feature and it is intended to provide a standard application interface to the application and interworking units (IWU) exploiting the MMS services and facilities. It provides two services access points (SAPs) to the upper layer. These access points are defined below. The MMS-API and MMS internal structure has been illustrated in FIG. 9.

Figure 10:
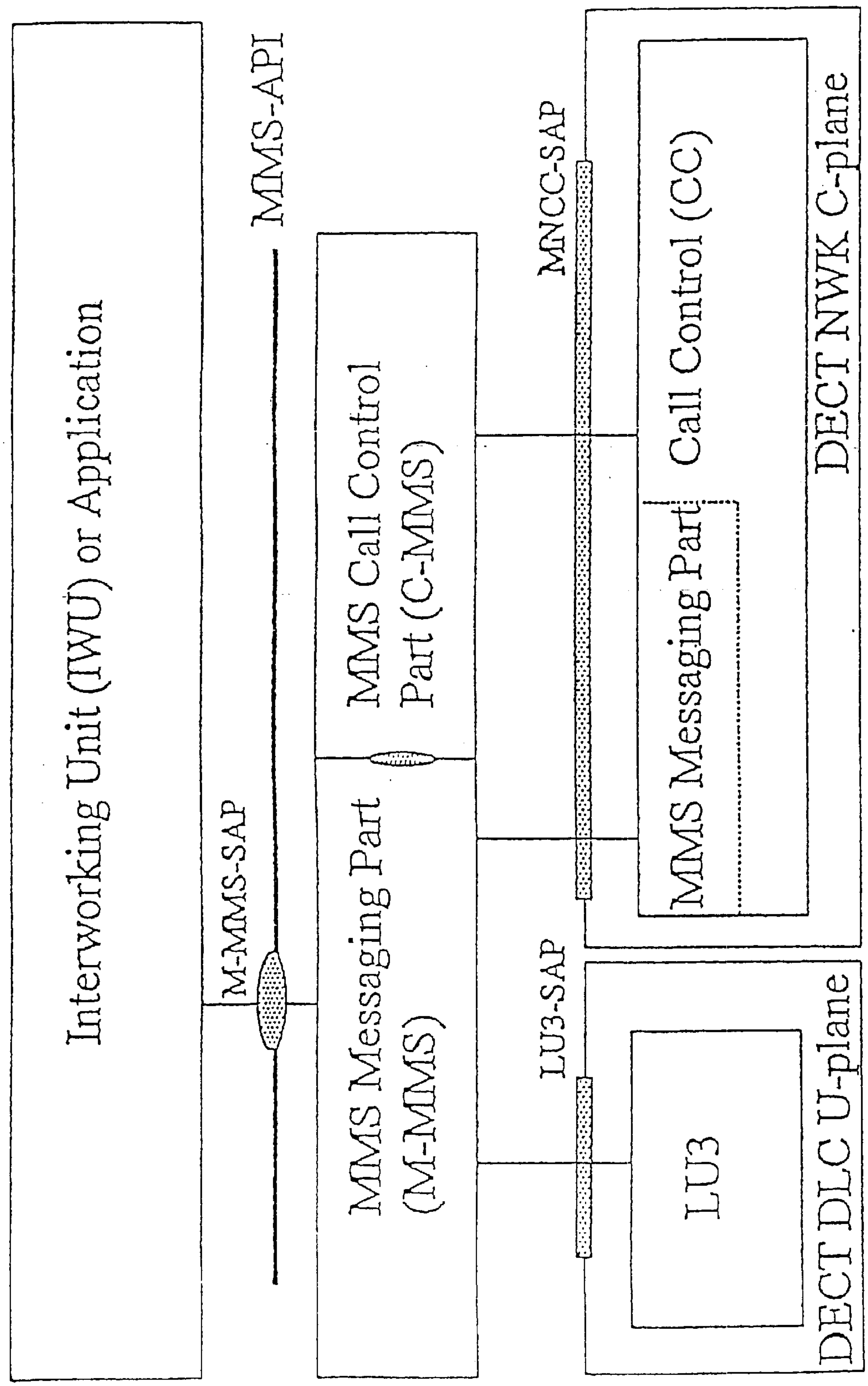
FIG. 10 shows the full-API MMS model.

The M-MMS-SAP resides on the MMS-API, thus it is applicable for the upper layer application. M-MMS-SAP is intended for requesting MMS message transportation or reception. If the feature of providing control between the MMS parts (the M/C-MMS-SAP) is present and the interworking description defines its functionality, the MMS action initiated by primitives through the M-MMS-SAP takes care of the call control functions. That is, no C-MMS-SAP call establishment primitives have to be used for call establishment. This is the full API protocol layer model and it is illustrated in FIG. 10.

Figure 11:
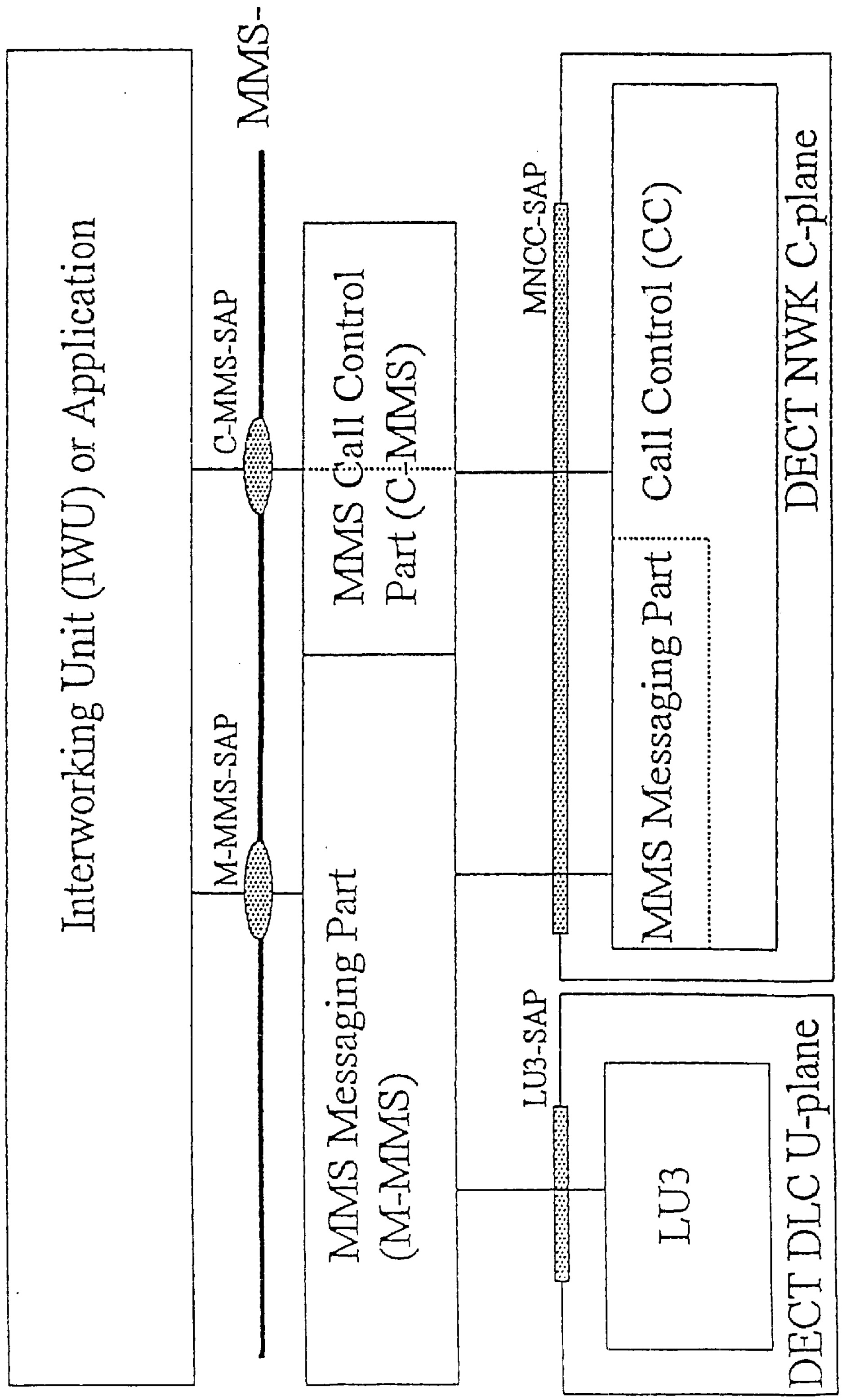
FIG. 11 shows the half-API MMS model.

In the case of half-API model the MMS connection control has to be done by the upper layer application directly utilizing the C-MMS-SAP primitives. The half-API model is illustrated in FIG. 11.

The C-MMS-SAP resides on the MMS-API, thus it is accessible for the upper layer application. The C-MMS-SAP primitives are used for MMS call control directly by the upper layer application. In the case of M/C-MMS-SAP usage the set of the primitives is limited and the main control of the call is done by the M-MMS part as defined in an appropriate service interworking definition.

Figure 12:
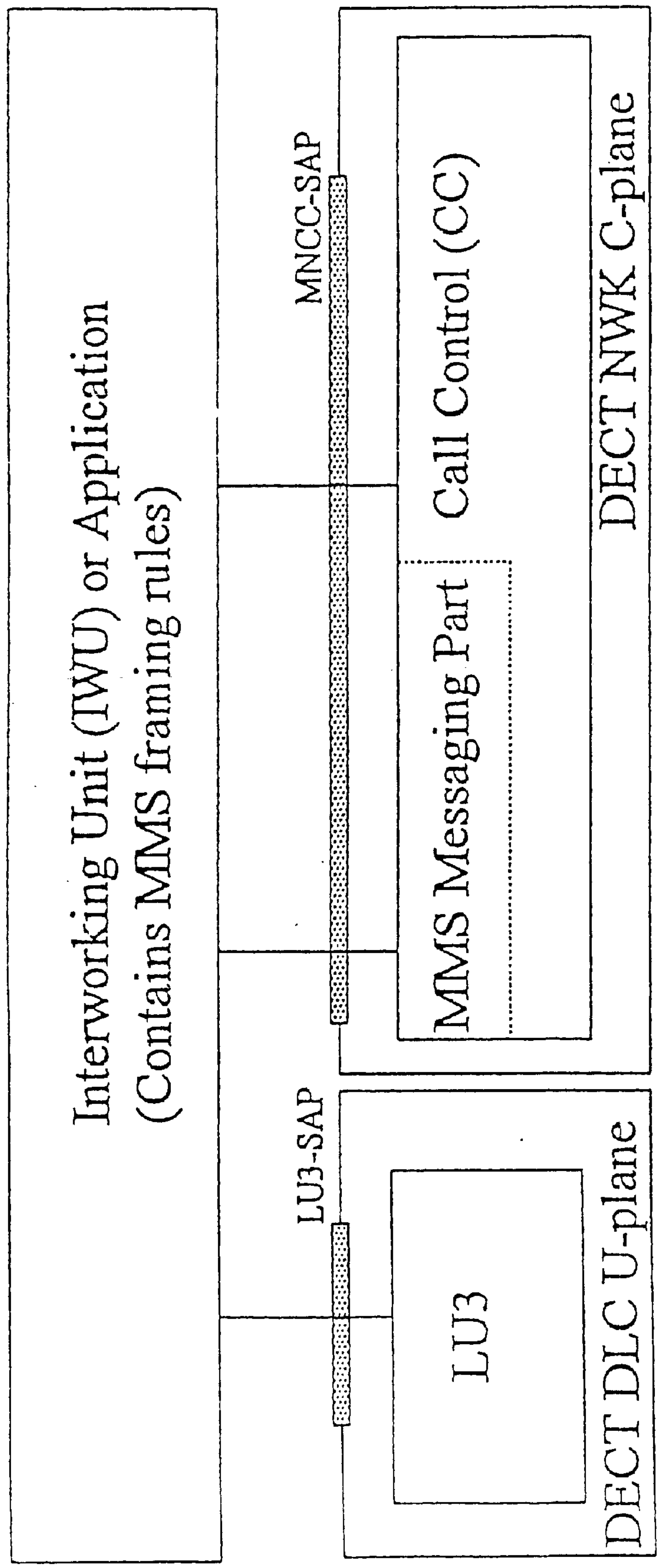
FIG. 12 shows the non-API MMS model.

The non-API interface defines how the DECT Call Control primitives can be utilized by the application/interworking unit directly in order to facilitate MMS actions. Thus no standard MMS-API interface is provided. This type of action takes place on the lower layer of the MMS-API plane. The non-API model has been illustrated in FIG. 12.

The relations of MMS towards the DECT Network Layer is as the non-API model. Thus the interface between the MMS virtual protocol layer is defined as a set of rules how the DECT NWK and DECT U-plane DLC primitives are used for MMS call control and MMS messaging. This is applicable for all half, full and non-API models.

M-MMS uses DECT Call Control messaging and information elements and DECT U-plane DLC layer for the MMS messages transfer. Thus M-MMS uses the Call Control and U-plane services.

C-MMS uses the normal DECT Call Control procedures for call establishment, suspension, resumption and release. Thus C-MMS is the same as the DECT Call control entity.

Figure 13:
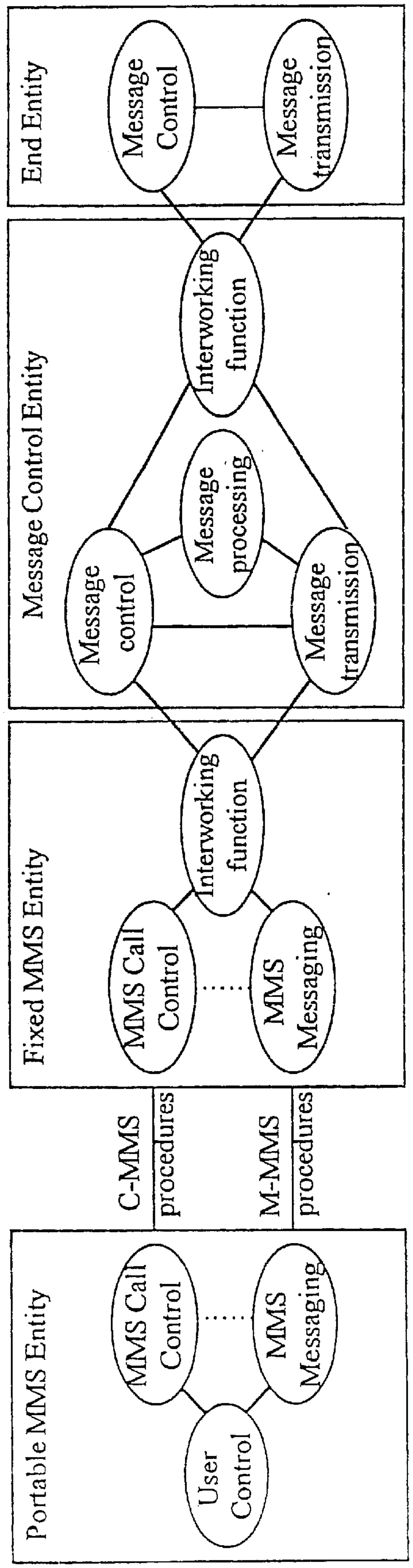
FIG. 13 shows the MMS general functional model.

The MMS relations according to the horizontal model (i.e. how the MMS protocol relates through the vertical model to Portable MMS entity, Fixed MMS entity with Interworking Unit, Intermediate server and outside network) will now be defined. The general model containing elements from both models is illustrated in FIG. 13. In the figure the Interworking function in fixed MMS entity is defined optionally, since the message control entity can be also in the Fixed MMS entity. The functions in the figure are in the End Entity dependent on the accessed service.

Figure 14:
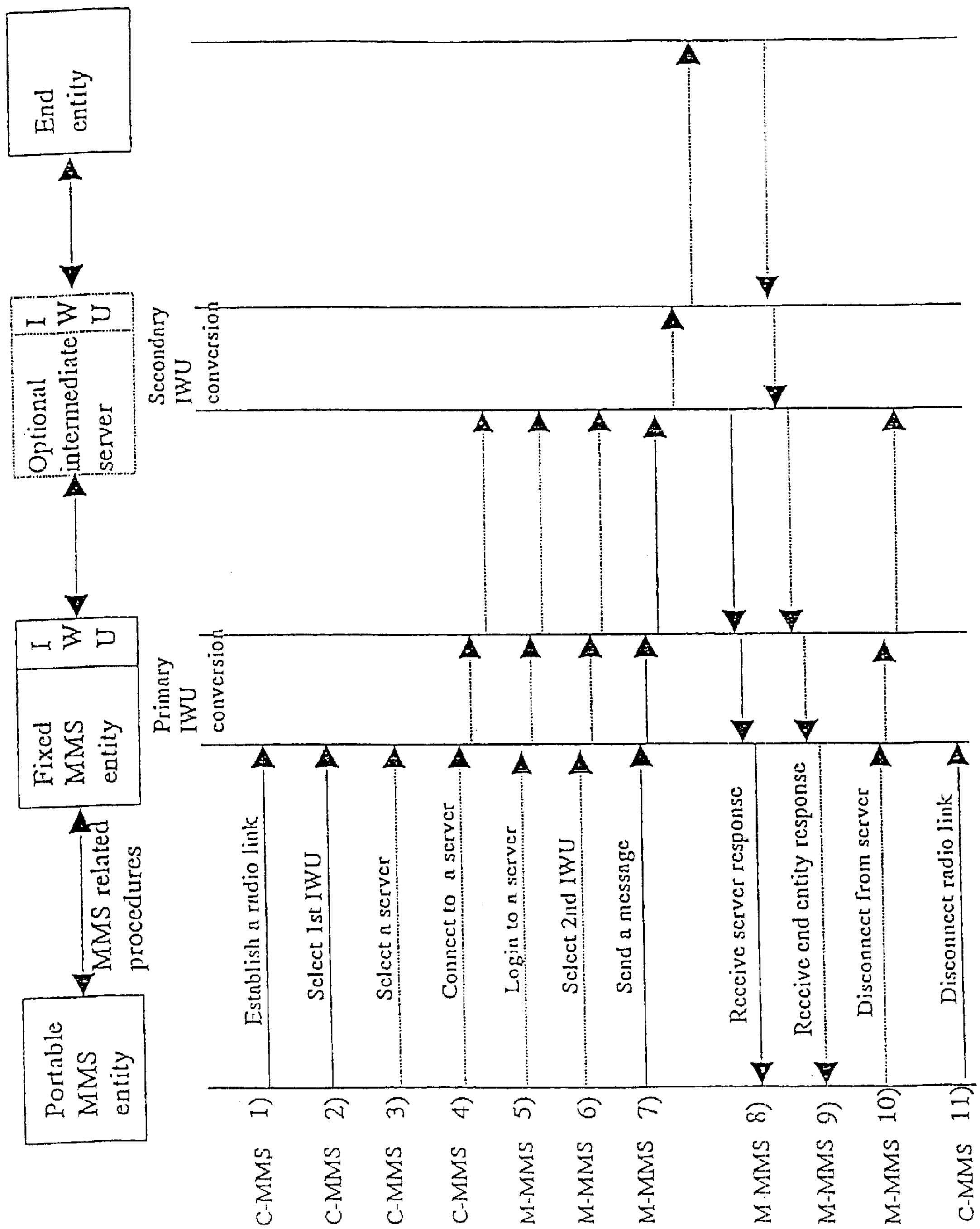
FIG. 14 shows the horizontal functions related to MMS messaging.
Figure 15:
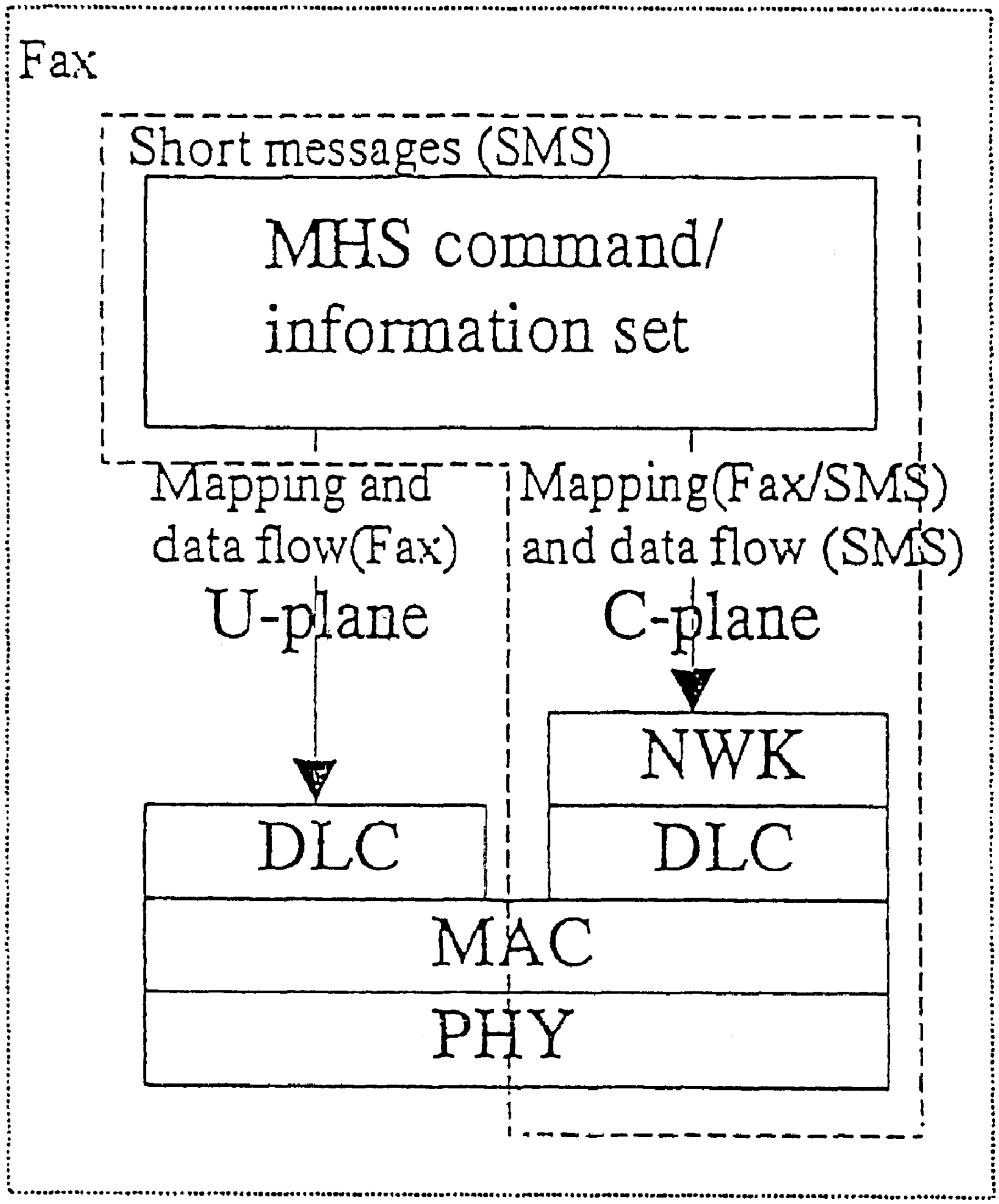
FIG. 15 shows MMS implementation for E and F profiles.

FIG. 15 illustrates a general MMS horizontal functional model. It should be noted that the procedures in the figure are not MMS actions but basic functions required for reaching the interworking services. Those procedures that have been drawn with dotted lines are optional i.e. these are not required by all services. A procedure is part of a MMS action, either C-MMS or M-MMS, thus a MMS action consists of MMS procedures defined here. Each procedure is defined next with a reference to the FIG. 14.

Procedure 1. Establish a radio link. This is a C-MMS procedure. The purpose is to establish a DECT radio link with MMS capabilities.

Procedure 2. Select IWU. This is part of a C-MMS procedure. The purpose is to select the Interworking Unit in the Fixed MMS entity in order to facilitate the required message mappings and access to the requested service.

Procedure 3. Select a server. This an optional C-MMS procedure. In some cases the intermediate server is accessed through a network the Fixed MMS entity provides access. This procedure is used to defined the server with identification (for instance, internet address, GSM SMS SC number etc.). If the fixed entity provides the service then this procedure is not needed.

Procedure 4. Connect to server. This is an optional C-MMS procedure. The connection is established through the network into the server.

Procedure 5. Login to server. This is a M-MMS procedure. In some cases a login procedure by user or application is required to reach access to the service provided by the server. For instance, in the FTP services case.

Procedure 6. Select 2nd IWU. This is a M-MMS procedure. The purpose is to select the Interworking Unit in the Intermediate server in order to facilitate the required message mappings or to reach required service.

Procedure 7. Send a message. This is a M-MMS procedure. This procedure is the actual message that is sent to the server for processing. Depending on the service either the server replies itself or forwards the message and then replies.

Procedure 8. Receive server response. This is a M-MMS procedure. The server has sent a response to the previously sent message.

Procedure 9. Receive end entity response. This is a M-MMS procedure. The server may send a response received from the end entity to the MMS portable entity.

Procedure 10. Disconnect from server. This is a M-MMS procedure. This is a procedure used to disconnect the connection to a server residing in a network (for instance, in internet).

Procedure 11. Disconnect from Fixed entity. This is a C-MMS procedure. This is a procedure used to disconnect the air interface.

A set of consecutive procedures can be combined into a single C- or M-MMS procedure. For example, procedures 1 (establish a radio link) and 2 (select 1s IWU) can be done with CC-SETUP message.

The MMS is utilized by the DECT data profiles E (Low rate messaging service) and F (Multimedia Messaging Service). It should be noted that even though the MMS protocol and F profile have the same name they are not the same. The F profile will only contain the MMS protocol definition but it will contain also definitions how the DECT U-plane is used for the data transmission (see FIG. 15).

The Low Rate Messaging Service (LRMS, E data profile) will use the MMS for short message transfer. In this case the User data and user control data is conveyed through the M-MMS part. The C-MMS part is used for call control.

The Multimedia messaging service (F data profile) will use the MMS for high speed data transfer. The User data is conveyed through the U-plane using LU3-SAP and the user control data is conveyed using M-MMS part. C-MMS part will take care of the Call control.

Figure 16:
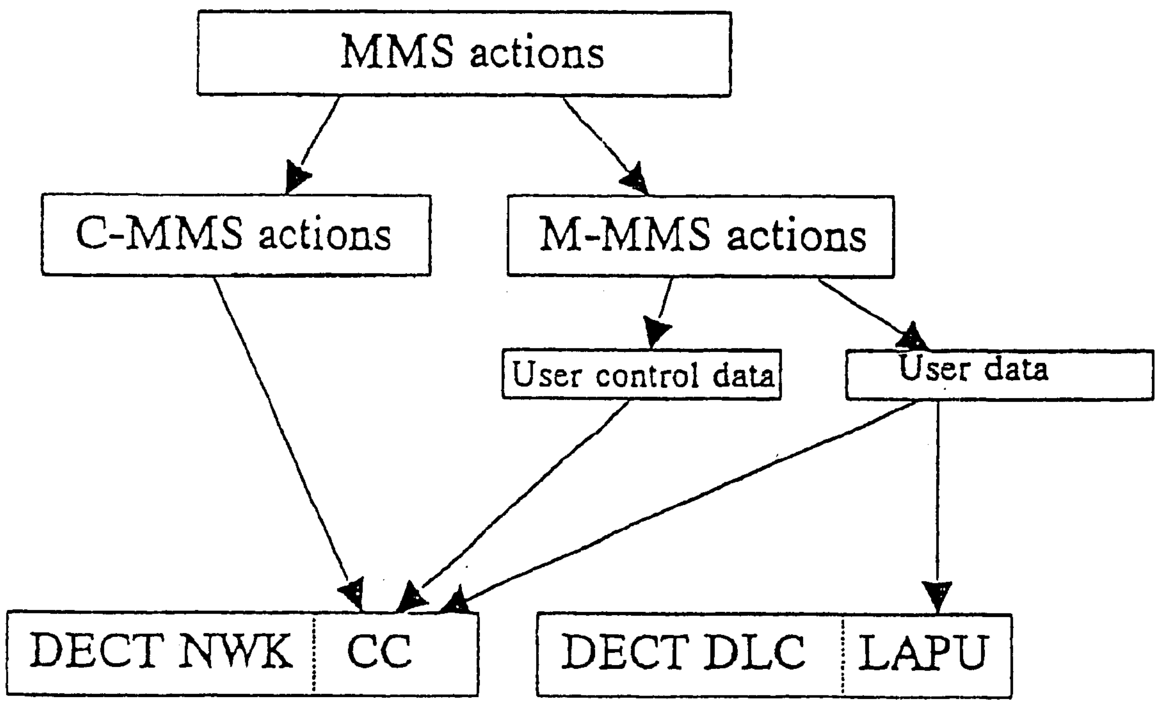
FIG. 16 shows the MMS action relations.

The MMS consists of different actions related to message/file handling. Not all actions are required in order to interwork to a specific interworking services i.e. a minimum subset of the following actions and information elements of the messages can be selected in order to facilitate interworking. However there is no limitation to implement all of them in addition to the minimum required set. The actions are defined as application layer information. The action information contents is divided into M-MMS and C-MMS actions/primitives by the content of the actions (see FIG. 16).

Figure 17:
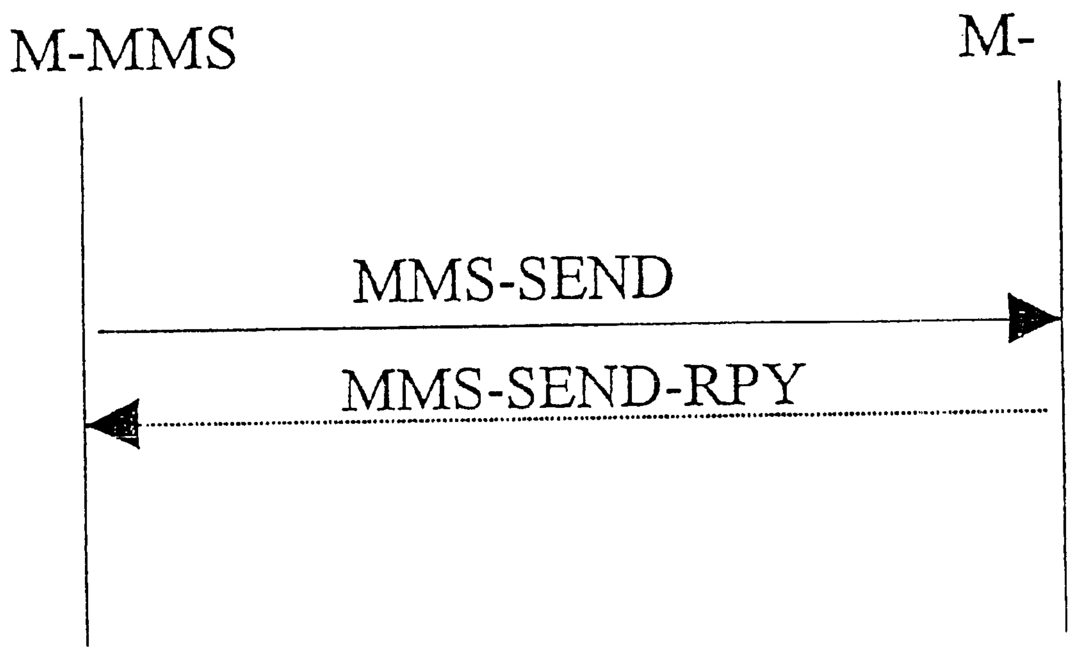
FIG. 17 shows MMS send action options.

The MMS SEND action is meant for data (message) transfer (sending) in both directions i.e. PP to FP and FP to PP. The reply is an optional feature and it can be requested by a specific field in the MMS-SEND message (see FIG. 17).

The following table shows the MMS-SEND message contents.

| Field in MMS-SEND | Status | Comment |
|---|---|---|
| USER CONTROL PART | | |
| Action type | M | Distinguishes MMS actions |
| Reply request | M | Is a reply requested for the action |
| MMS sequence number | M | A sequence number to distinguish MMS messages NOTE 1. |
| Service type | M | Defines the interworking service/network |
| Service subtype | O | Defines the subtype of the service |
| Message transmission type | M | Defines messaging specific information |
| Data content type | M | The upper layer (application) protocol of the interworking protocol (subtype of the service) |
| Time Stamp | O | When message was sent |
| Recipient address | M/O | The address of the recipient |
| Sender address | M/O | The address of the sender |
| Segmented info | O | Contains segmentation information |
| USER DATA PART | | |
| Character type coding | M | The data type in the user data field |
| Character set coding | M | |
| Language coding | O | Language of the message |
| User data length | M | The length of user data field. NOTE 1. |
| User data | M | The user data defined in Data type field |

NOTE. The MMS sequence number can be duplicated to both parts user control and user data parts when the message content is splitted between two data flow paths. This numbering is used to combine the data again in the IWU. The length also.

The following table shows the MMS-SEND-RPY message contents

| Field in MMS-SEND-RPY | Status | Comment |
|---|---|---|
| USER CONTROL PART | | |
| Action type | M | Distinguishes MMS actions |
| MMS sequence number | M | A sequence number to distinguish MMS messages |
| Action result | M | Result of the action |
| Control data length | O | Indicates if escape data is present |
| Control data | O | Escape field for application specific commands |

Figure 18:
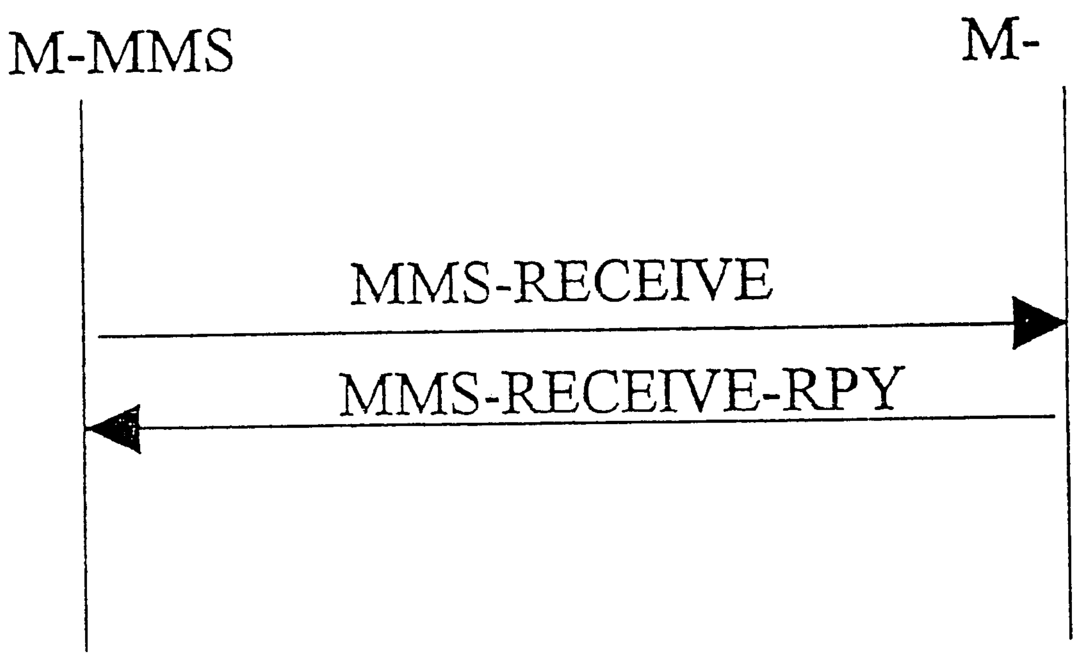
FIG. 18 shows MMS retrieve action options.

The MMS-RETRIEVE action is meant for data (message) retrieval for both directions i.e. PP to FP and FP to PP. The reply containing the information retrieved is carried in MMS-RETRIEVE-RPY message (see FIG. 18).

The following table shows the MMS-RETRIEVE message contents

| Field in MMS-RETRIEVE | Status | Comment |
|---|---|---|
| USER CONTROL PART | | |
| Action type | M | Distinguishes MMS actions |
| Reply request | M | Is a reply requested for the action In this case the reply is always requested |
| MMS sequence number | M | A sequence number to distinguish MMS messages |
| Service type | O | Defines the interworking service, used for message selection |
| Intermediate server address | O | The address of the optional intermediate server |
| MMS sequence number | M | The message number for requested message |
| Data content type | O | The user data type |
| Command type | O | The operation to be done to the message in the service after successful retrieval |

The following table shows the MMS-RETRIEVE-RPY message contents

| Field in MMS-RETRIEVE-RPY | Status | Comment |
|---|---|---|
| USER CONTROL PART | | |
| Action type | M | Distinguishes MMS actions |
| MMS sequence number | M | A sequence number to distinguish MMS messages (this action) |
| Service type | M | Defines the interworking service used |
| Network address (address type) | M | The address of the recipient or sender |
| Message transmission type | M | Defines messaging specific information |
| Data content type | M | The upper layer (application) protocol of the interworking protocol |
| Action result | M | Result of the action |
| MMS sequence number | M | The message number for requested message |
| Time Stamp | O | When message was sent |
| Segmented info | O | Contains segmentation information |

-continued

| Field in MMS-RETRIEVE-RPY | Status | Comment |
|---|---|---|
| USER DATA PART | | |
| Character type coding | M | The data type in the user data field |
| Character set coding | M | |
| Language coding | O | Language of the message |
| User data length | M | The length of user data field. NOTE 1. |
| User data | M | The user data defined in Data type field |

Figure 19:
FIG. 19 shows MMS Command action options.

MMS COMMAND action is meant for server control information transfer. With this functionality information stored/processed in the remote end can be controlled remotely (for instance, a status information can be requested or message scheduled for sending can be canceled). The control reply (MMS-COMMAND-RPY) is an optional reply requested with a specific field in the MMS-COMMAND message (see FIG. 19).

The following table shows the MMS-COMMAND message contents

| Field in MMS-COMMAND | Status | Comment |
|---|---|---|
| USER CONTROL PART | | |
| Action type | M | Distinguishes MMS actions |
| Reply request | M | Is a reply requested for the action |
| MMS sequence number | M | A sequence number to distinguish MMS messages |
| Service type | O | Defines the interworking service used |
| Time Stamp | M | When message was sent (in status information) |
| Intermediate server address | O | The address of the optional intermediate server |
| Data content type | M | The upper layer (application) protocol of the interworking protocol |
| Command object | M | The command object number (MMS sequence number) |
| Command type | M | The operation |
| Escape commands/inform ation present | M | Indicates the presence of an application specific command in user field |
| Control data length | M | Indicates if escape data is present |
| Control data | O | Escape field for application specific commands |

The following table shows the MMS-COMMAND-RPY message contents

| Field in MMS-COMMAND-RPY | Status | Comment |
|---|---|---|
| USER CONTROL PART | | |
| Action type | M | Distinguishes MMS actions |
| MMS sequence number | M | A sequence number to distinguish MMS messages |
| Time Stamp | O | When message was sent |

-continued

| Field in MMS-COMMAND-RPY | Status | Comment |
|---|---|---|
| Command object | M | The command object number (MMS sequence number) |
| Command type | O | The operation |
| Action result | M | Result of the action |
| Control data length | M | Indicates if escape data is present |
| Control data | O | Escape field for application specific commands |

Figure 20:
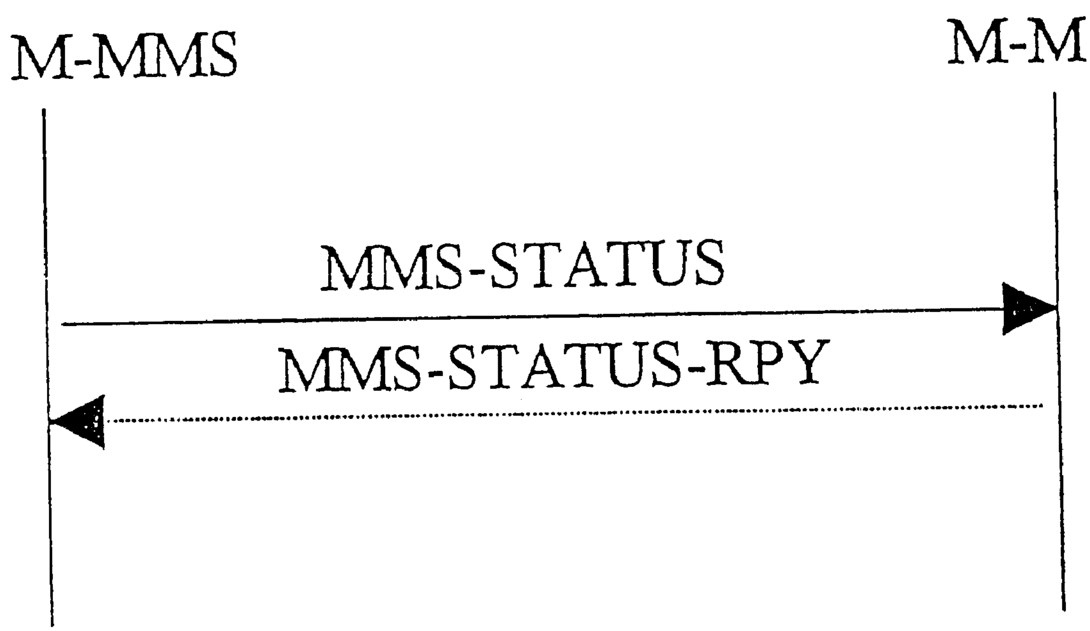
FIG. 20 show MMS Status action options.

MMS STATUS action is meant for messaging control information transfer. With this functionality a status information can sent independently of the pervious requests. The status reply (MMS-STATUS-RPY) is an optional reply requested with a specific field in the MMS-STATUS message. This message never contains user information. It can be used for informing waiting messages/files in server. In this case the message may contain detailed information about the message (see FIG. 20).

The following table shows the MMS-STATUS message contents

| Field in MMS-STATUS | Status | Comment |
|---|---|---|
| USER CONTROL PART | | |
| Action type | M | Distinguishes MMS actions |
| Reply request | M | Is a reply requested for the action |
| MMS sequence number | M | A sequence number to distinguish MMS messages |
| Time Stamp | M | When message was sent (in status information) |
| Information type | M | The operation |
| Action result | M/O | Result of the action |
| Command object | O | The number of the message the action is referring to (MMS sequence number) |
| Sender address | O | The address of the sender |
| Service type | O | Defines the interworking service/network |
| Service subtype | O | Defines the subtype of the service |
| Data content type | O | The upper layer (application) protocol of the interworking protocol (subtype of the service) |
| Message length | O | The length of the message waiting in server |

The following table shows the MMS-STATUS-RPY message contents

| Field in MMS-STATUS-RPY | Status | Comment |
|---|---|---|
| USER CONTROL PART | | |
| Action type | M | Distinguishes MMS actions |
| MMS sequence number | M | A sequence number to distinguish MMS messages |
| Action result | M | Result of the action |

The following table shows the Information elements in M-MMS actions

| Element | Values | Length | Comment |
|---|---|---|---|
| Action type | MMS-SEND<br>MMS-SEND-RPY<br>MMS-RECEIVE<br>MMS-RECEIVE-RPY<br>MMS-CONTROL<br>MMS-CONTROL-RPY<br>MMS-STATUS<br>MMS-STATUS-RPY | 4 bits | Distinguishes MMS actions |
| Reply request | No reply requested<br>From MMS entity<br>From End entity<br>From MMS and End entity | 2 bits | Is a reply requested for the action |
| MMS sequence number | Value 0–127 with extension<br>0–16384 | 7–14 bits | A sequence number to distinguish MMS messages |
| Network address Address Type: | Number type:<br>As in ETS300 175-5 7.7.7.<br>Alphanumeric (with DECT alphabets)<br>Numbering plan:<br>As in ETS 300 175-5 7.7.7.<br>IP address<br>IP server name (URI)<br>X.400 address<br>LAN address | | The address of the recipient or senderThe type of address used in address fields. Values coded as in DECT <<Called party number>> IE with some additions |
| Service type | Not specified<br>Any method<br>Address based IWU selection<br>A message handling facility<br>Physical<br>Voice telephone<br>Telex<br>Teletex<br>Facsimile group 3<br>Facsimile group 4<br>Videotex (T.100/T.101)<br>ERMES<br>National paging<br>UCI (ETS 300 133-3)<br>GSM SMS<br>DECT MMS<br>DECT LRMS<br>IA5 terminal<br>X.400 message handling<br>FTP<br>HTTP<br>Gopher<br>News<br>News/NNTP<br>Telnet<br>Wide area info server<br>Host specific file names<br>Prospero | 7 bits | The interworking service<br>This is the service type used through the message control entity (secondary IWU selection in most of the cases). |
| Service subtype | None<br>Standard<br>Telex:<br>Standard<br>Via teletex conversion<br>Teletex:<br>Standard<br>Oper. doc.<br>Monit doc<br>Ctrl doc.<br>TFT of Doc. tr. Mode<br>TFT of Binary File Tr.<br>TFT of Edifact<br>in PSPDN<br>in CSPDN<br>in analog PSTN<br>in digital ISDN | 4 bits | These values are related to the Service type field i.e. not all listed values are possible with all service type options. The service options related to the value of the Service type is defined. (TFT; Telematic File Transfer). |

-continued

| Element | Values | Length | Comment |
|---|---|---|---|
| | Facsimile group 3:<br>Standard<br>TFT of Basic tr.Mode<br>TFT of Doc. tr. Mode<br>TFT of Binary File Tr.<br>TFT of Edifact<br>Facsimile group 4:<br>Standard<br>Oper. doc.<br>Monit doc<br>Ctrl doc.<br>TFT of Doc. tr. Mode<br>TFT of Binary File Tr.<br>TFT of Edifact | | |
| Message transmission type | Unspecified<br>Encapsulated<br>Multipart<br>Body in U-plane<br>Header in C-plane<br>Normal | 3 bits | This field indicates the structure of the MMS message, i.e. multipart means sementation and body in U-plane means F profile functionality. |
| Message content type | Undefined<br>Specified by the service type<br>Local type<br>Simple formattable document<br>Basic text:<br>IA 5 text (T.50)<br>Telex<br>Teletex (T.61)<br>Videotex (T.100/T.101)<br>image<br>TIFF image<br>GIF image<br>JPEG image<br>Fax G 4 class 1<br>Fax G 3 (T.4/T.30)<br>Audio<br>AVI audio<br>Multipart: mixed<br>Multipart: parallel<br>Multipart: alternative<br>Multipart: digest<br>Encapsulated: RFC 822 or MIME<br>Encapsulated: GSM SMS<br>Encapsulated: X.400<br>Octet stream application<br>Postscript application<br>MPEG video | 7 bits | This field specifies the content of the message i.e. the format of the message content. |
| Character type coding | Others<br>Standard 8 bit characters<br>Standard 4 bit coding<br>Standard 7 bit characters<br>Binary<br>Compressed<br>Encrypted | 3 bits | The data type in the user data field Coded as in <<Alphanumeric >>IE in DECT with some additions |
| Character set coding | 8 bit characters:<br>DECT standard 8 bit<br>8 bit ASCII<br>US-ASCII<br>ISO 8859<br>8 bit EBCDIC<br>7 bit characters:<br>7 bit ERMES<br>7 bit standard ASCII<br>7 bit ASCII (IA5/T.50)<br>Others:<br>ASN.1. BER.1<br>User specific | 3 bits | When language coding is used the length of the field is extended with 7 bits. |

-continued

| Element | Values | Length | Comment |
|---|---|---|---|
| | National variations of IRA<br>Compressed:<br>ZIP<br>V.42 bis<br>Encrypted:<br>GSM encryption<br>DECT encryption | | |
| Language coding | German<br>English<br>Italian<br>French<br>Spanish<br>Dutch<br>Swedish<br>Danish<br>Portuguese<br>Finnish<br>Norwegian<br>Greek<br>Turkish<br>Reserved for European languages<br>Language unspecified | 7 bits | The language of the message |
| Time Stamp | Date, Time, Timezone | 7 octets | When message was sent |
| User data length | Tells the amount of octets in the user data field. | 1–4 octets | The length of user data field |
| User data | | Variable | The user data defined by message content and data coding type fields |
| Action result | General values:<br>Successful<br>Unsuccessful<br>Command successful<br>Command unsuccessful<br>Successful transactions:<br>Message sent to end entity<br>Message received by server<br>Message received by end entity<br>Message replaced by the server<br>Temporary Error:<br>No memory available<br>Congestion<br>End entity busy<br>No response from end entity<br>Quality of service not available<br>Error in end entity<br>Permanent Error:<br>invalid address<br>Incompatible file type<br>Invalid network(End User not accessible)<br>Service rejected<br>End entity not available<br>Primary IWU conversion failed | 7 bits | Result of the action |
| Command object | Values as in MMS coding<br>0 reserved for connection control | 7 or 14 bits | The command object number (MMS sequence number) If this field is omitted or it contains value 0 the command is related to the connection |

-continued

| Element | Values | Length | Comment |
|---|---|---|---|
| Command type | Message related: Delete Replace Cancel Memory available Status Enquiry Cancel status enquiry Connection related: Login Logout | 7 bits | The operation |
| Information type | Status report Message/file waiting in server | 7 bits | |
| Escape commands present | yes no | 1 bit | Indicates the presence of an application specific command in user field |
| Control data length | | Variable | Indicates if escape data is present |
| Control data | | Variable | Escape field for application specific commands |
| Segmented info | | 4 octets | Contains segmentation information |

The following actions use the DECT Call Control functionality directly for the MMS call controlling. The following clauses are describe generally their functionality. The procedures referred here are defined above. The actions are described here for consistency but basically they are DECT CC functionality and the their true functionality is described below.

The following actions can be accessed through the MMS-API in the full- and half-API cases or similar functionality can be reached through the DECT MNCC-SAP in the non-API case. The required information content of these C-MMS service actions is defined here and the mapping between respective DECT and MMS functions set out below.

The purpose of the MMS-SETUP action is to initiate a MMS connection through the air interface. It contains the procedures 1, 2, and 3. As a result of receiving these procedures the fixed MMS entity may also proceed with procedure 4. This functionality is done by using DECT CC-SETUP functionality.

The result of the MMS-SETUP action is accepted by sending a MMS-CONNECT message. The receiving MMS entity accepts the MMS call establishment and informs the intitating entity. The action is conducted by using DECT CC-CONNECT messages.

Figure 21:
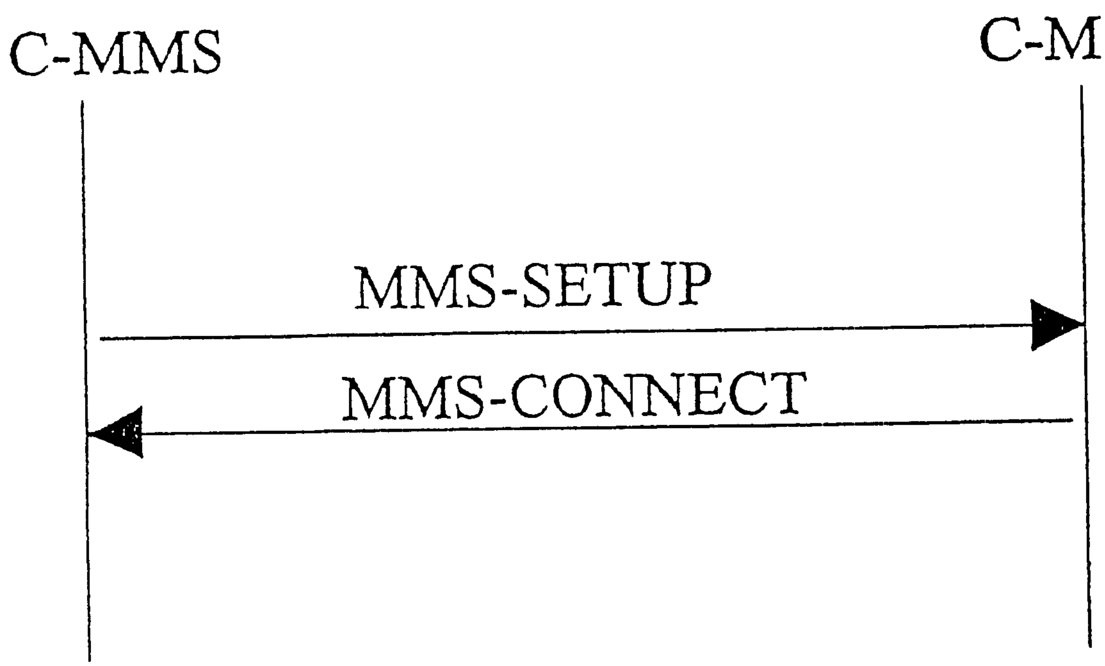
FIG. 21 shows MMS SETUP and CONNECT actions.

In unsuccessful cases of the connection establishment the release of the connection is a matter of the lower layer entities. The connection release is done in unsuccessful cases either by MMS-RELEASE of by MMS-RELEASE-COM (see FIG. 21).

The following table shows the MMS-SETUP message contents

| Field in MMS-SETUP | Status | Comment |
|---|---|---|
| Iwu-attributes | M | Defines the profile requirements (the interworking unit) |
| Called-Party-Number | O | Defines the server number. This number is optional. |
| Calling-Party-Number | O | Informs the server number. This number is optional. |

The MMS-CONNECT message contains no MMS specific information.

A normal release between MMS is done by the MMS-RELEASE action procedure. This action contains the procedure 11 of FIG. 14. It may also contain procedure 10. The response is MMS-RELEASE-COM.

Abnormal situations are done by MMS-RELEASE-COM message.

Figure 22:
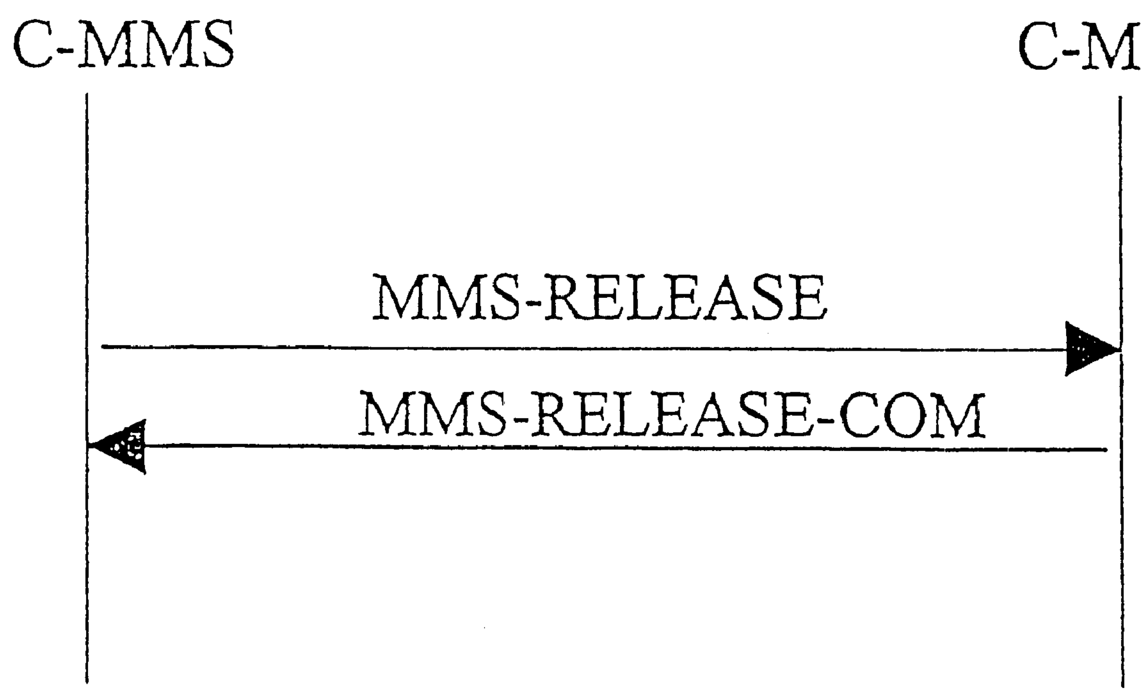
FIG. 22 shows MMS RELEASE action.

The detailed functionality of these procedures are in the layers below MMS (see FIG. 22).

The following table shows the MMS-RELEASE message contents

| Field in MMS-RELEASE | Status | Comment |
|---|---|---|
| Release reason | O | Defines the reason for the release |

The following table shows the MMS-RELEASE-COM message contents

| Field in MMS-RELEASE-COM | Status | Comment |
|---|---|---|
| Release reason | O | Defines the reason for the release |

The information element coding in C-MMS actions is done as defined below.

Figure 23:
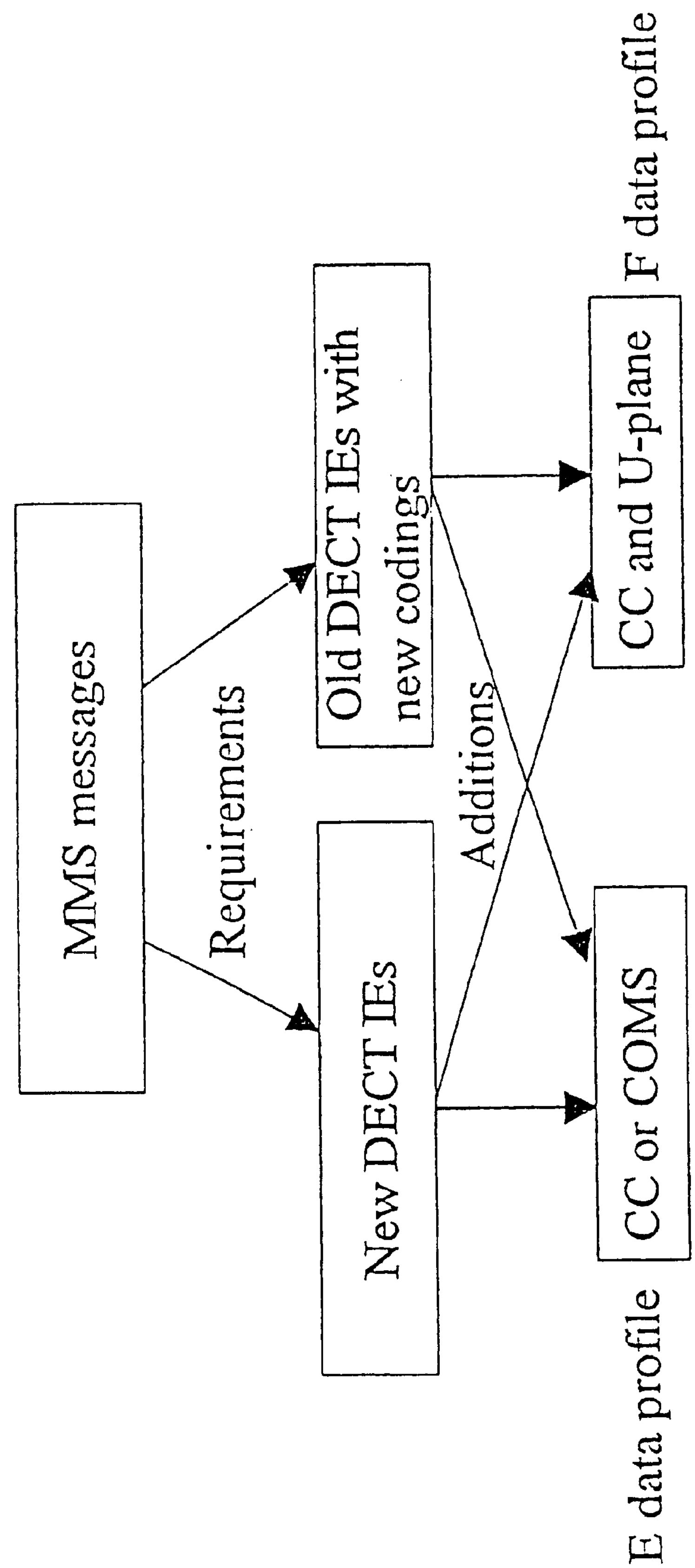
FIG. 23 shows MMS implementation for E and F profiles.

The defined MMS protocol information elements could be implemented to the DECT layers as illustrated in FIG. 23. A group of new information elements have to be defined but also a group of already existing DECT elements could be utilized by adding some new codings. Additions of the old and new information elements into DECT Call Control or COMS and U-plane messages has to be done.

Also the primitives related to the MMS-API should be defined. In the case MMS-API is used the layer does mapping between MMS-API primitives and DECT NWK and U-plane primitives.

The mapping of the M-MMS and C-MMS information elements into DECT messages will now be defined. The reference column of the tables refer to the clause which defines the information element. By reading the IE the field mapping is straigthforward. Detailed information on how the used DECT messages are coded is also presented.

The following table shows the M-MMS messages

| Item No | MMS MSG | DECT MSG | Status in GAP | Ref. | Map Status | Note |
|---|---|---|---|---|---|---|
| 1 | MMS-SEND | CC-INFO | M | 7.3.2.1 | M | |
| 2 | MMS-SEND | CC-INFO/U-plane LAPU frame | I | 7.3.2.2 | M | 1. |
| 3 | MMS-SEND-RPY | CC-INFO | M | 7.3.2.3 | M | |
| 4 | MMS-RETRIEVE | CC-INFO | M | 7.3.2.4 | M | |
| 6 | MMS-RETRIEVE-RPY | CC-INFO | M | 7.3.2.5 | M | |
| 5 | MMS-RETRIEVE-RPY | CC-INFO/U-plane LAPU frame | I | 7.3.2.6 | M | 1. |
| 7 | MMS-COMMAND | CC-INFO | M | 7.3.2.7 | M | |
| 8 | MMS-COMMAND-RPY | CC-INFO | M | 7.3.2.8 | M | |
| 9 | MMS-STATUS | CC-INFO | M | 7.3.2.9 | M | |
| 10 | MMS-STATUS-RPY | CC-INFO | M | 7.3.2.10 | M | |

NOTE.
This mapping take place only when the MMS (F-data profile) is using the MMS.

The following table shows the MMS-SEND-CC-INFO

| Item No | Message coding MMS MMS-SEND | Message coding DECT NWK CC-INFO | GAP status | Ref. | Map status | NOTE |
|---|---|---|---|---|---|---|
| 1 | Action type | Facility or MMS | I | 8.2.4; 8.2.6 | M | 2. |
| 2 | Reply request | Facility or MMS | I | 8.2.4; 8.2.6 | M | 2. |
| 3 | Recipient address | Called party number | I | 8.2.5 | M | |
| 4 | Sender address | Calling party number | I | 8.2.5 | M | |
| 5 | Service type | Facility or MMS | I | 8.2.4; 8.2.6 | M | 2. |
| 6 | Service subtype | Facility or MMS | I | 8.2.4; 8.2.6 | M | 2. |
| 7 | Message transmission type | Facility or MMS | I | 8.2.4; 8.2.6 | M | 2. |
| 8 | Data content type | Facility or MMS | I | 8.2.4; 8.2.6 | M | 2. |
| 9 | Time Stamp | Time/data | I | 8.2.7 | M | 3. |
| 10 | MMS sequence number | Facility or MMS | I | 8.2.4; 8.2.6 | M | 2. |
| 11 | Character type coding | Alphanumeric | I | 8.2.8 | M | 1. |
| 12 | Character set coding | Alphanumeric | I | 8.2.8 | M | 1. |
| 13 | Language coding | Alphanumeric | 1 | 8.2.8 | O | 1. |
| 14 | User data length | Alphanumeric | I | 8.2.8 | M | 1. |
| 15 | User data | Alphanumeric | I | 8.2.8 | M | 1. |
| 16. | Segmented info | Segmented info | I | ETS 300 175-5, 7.7.37 | M | 1. 5. |
| 18. | Content type | IWU-TO-IWU | I | 8.2.12 | | 4. |
| 19. | User data | IWU-TO-IWU | I | 8.2.12 | | 4. |

NOTE 1.
This mapping take place only when the LRMS (E-data profile) is using the MMS.
NOTE 2.
Either a new coding of Facility element is used or a new information element MMS is defined and used (See below).
NOTE 3.
A new information element is defined for this purpose below.
NOTE 4.
This mapping takes place if the <Message transmission type> field of the MMS message contains value "Encapsulated".
NOTE 5.
This mapping takes place if the <Message transmission type> field of the MMS message contains value "Multipart" or the segmentation may function independently of the MMS messaging as DECT NWK internal matter.

The following table shows the MMS-SEND-CC-INFO/U-plane LAPU frame

| Item No | Message coding MMS MMS-SEND | Message coding DECT NWK CC-INFO | GAP status | Ref. | Map status | NOTE |
|---|---|---|---|---|---|---|
| 1 | Action type | Facility or MMS | I | 8.2.4; 8.2.6 | M | 2. |
| 2 | Reply request | Facility or MMS | I | 8.2.4; 8.2.6 | M | 2. |
| 3 | Recipient address | Called party number | I | 8.2.5 | M | |
| 4 | Sender address | Calling party number | I | 8.2.5 | M | |
| 5 | Service type | Facility or MMS | I | 8.2.4; 8.2.6 | M | 2. |
| 6 | Service subtype | Facility or MMS | I | 8.2.4; 8.2.6 | M | 2. |
| 7 | Message transmission type | Facility or MMS | I | 8.2.4; 8.2.6 | M | 2. |
| 8 | Data content type | Facility or MMS LAPU frame | I | 8.2.4; 8.2.6 | M 4. | 2. |
| 9 | Time Stamp | Time/data | I | 8.2.7 | M | 3. |
| 10 | MMS sequence number | Facility or MMS LAPU frame | I | 8.2.4; 8.2.6 | M | 2. 4. |
| 11 | Character type coding | LAPU frame | I | 7.3.4. | M | 1. |
| 12 | Character set coding | LAPU frame | I | 7.3.4. | M | 1. |
| 13 | Language coding | LAPU frame | I | 7.3.4. | O | 1. |
| 14 | User data length | LAPU frame | I | 7.3.4. | M | 1. |
| 15 | User data | LAPU frame | I | 7.3.4. | M | 1. |

NOTE 1.
This mapping take place only when the MMS (F-data profile) is using the MMS. Then the <Message transmission type> field of the MMS message contains value "Body in U-plane"
NOTE 2.
Either a new coding of Facility element is used or a new information element MMS is defined and used.(See below).
NOTE 3.
A new information element is defined for this purpose in below.
NOTE 4.
The element is carried in both LAPU frame and CC-INFO message.

The following table shows the MMS-SEND-RPY-CC-INFO

| Item No | Message coding MMS MMS-SEND-RPY | Message coding DECT NWK CC-INFO | GAP status | Ref. | Map status | NOTE |
|---|---|---|---|---|---|---|
| 1 | Action type | Facility or MMS | I | 8.2.4; 8.2.6 | M | 2. |
| 2 | MMS sequence number | Facility or MMS | I | 8.2.4; 8.2.6 | M | 2. |
| 3 | Action result | Facility or MMS | I | 8.2.4; 8.2.6 | M | 2. |

NOTE 2.
Either a new coding of Facility element is used or a new information element MMS is defined and used.(See chapter 8).

The following table shows the MMS-RETRIEVE-CC-INFO

| Item No | Message coding MMS MMS-RETRIEVE | Message coding DECT NWK CC-INFO | GAP status | Ref. | Map status | NOTE |
|---|---|---|---|---|---|---|
| 1 | 8.2.4; 8.2.6 | Facility or MMS | I | 8.2.4; 8.2.6 | M | 2. |
| 2 | MMS sequence number | Facility or MMS | I | 8.2.4; 8.2.6 | M | 2. |
| 3 | Service type | Facility or MMS | I | 8.2.4; 8.2.6 | M | 2. |

-continued

| Item No | Message coding MMS MMS-RETRIEVE | Message coding DECT NWK CC-INFO | GAP status | Ref. | Map status | NOTE |
|---|---|---|---|---|---|---|
| 4 | intermediate server address | Called party number | I | 8.2.5 | M | |
| 5 | MMS sequence number | Facility or MMS | I | 8.2.4; 8.2.6 | M | 2. |
| 6 | Data object type | Facility or MMS | I | 8.2.4; 8.2.6 | M | 2. |
| 7 | Command type | Facility or MMS | I | 8.2.4; 8.2.6 | M | 2. |

| Item No | Message coding MMS MMS-RETRIEVE-RPY | Message coding DECT NWK CC-INFO | GAP status | Ref. | Map status | NOTE |
|---|---|---|---|---|---|---|
| 1 | Action type | Facility or MMS | I | 8.2.4; 8.2.6 | M | 2. |
| 2 | MMS sequence number | Facility or MMS | I | 8.2.4; 8.2.6 | M | 2. |
| 3 | Service type | Facitity or MMS | I | 8.2.4; 8.2.6 | M | 2. |
| 4 | Network address (with address type) | Called party number | I | 8.2.4; 8.2.6 | M | |
| 5 | Data content type | Facility or MMS | I | 8.2.4; 8.2.6 | M | 2. |
| 6 | Action result | Facility or MMS | I | 8.2.4; 8.2.6 | M | 2. |
| 7 | MMS sequence number | Facility or MMS | I | 8.2.4; 8.2.6 | M | 2. |
| 8 | Time Stamp | Time/Date | I | 8.2.7 | M | 3. |
| 9 | Character type coding | Alphanumeric | I | 8.2.8 | | |
| 10 | Character set coding | Alphanumeric | I | 8.2.8. | M | 1. |
| 11 | Language coding | Alphanumeric | I | 8.2.8. | | |
| 12 | User data length | Alphanumeric | I | 8.2.8. | M | 1. |
| 13 | User data | Alphanumeric | I | 8.2.8. | M | 1. |
| 16. | Segmented info | Segmented info | I | ETS 300 175-5 7.7.37. | M | 1. 5. |

NOTE 1.
This mapping take place only when the LRMS (E-data profile) is using the MMS.
NOTE 2.
Either a new coding of Facility element is used or a new information element MMS is defined and used.(See below).
NOTE 5.
This mapping takes place if the <Message transmission type> field of the MMS message contains value "Multipart" or the segmentation may function independently of the MMS messaging as DECT NWK internal matter.

The following table shows the MMS-RETRIEVE-RPY-CC-INFO/LAPU frame

| Item No | Message coding MMS MMS-RETRIEVE-RPY | Message coding DECT NWK CC-INFO | GAP status | Ref. | Map status | NOTE |
|---|---|---|---|---|---|---|
| 1 | Action type | Facility or MMS | I | 8.2.4; 8.2.6 | M | 2. |
| 2 | MMS sequence number | Facility or MMS | I | 8.2.4; 8.2.6 | M | 2. |
| 3 | Service type | Facility or MMS | I | 8.2.4; 8.2.6 | M | 2. |
| 4 | Network address (with address type) | Called party number | I | 8.2.5 | M | |
| 5 | Data content type | Facility or MMS LAPU frame | I | 8.2.4; 8.2.6 | M | 2. 4. |
| 6 | Action result | Facility or MMS | I | 8.2.4; 8.2.6 | M | 2. |

-continued

| Item No | Message coding MMS MMS-RETRIEVE-RPY | Message coding DECT NWK CC-INFO | GAP status | Ref. | Map status | NOTE |
|---|---|---|---|---|---|---|
| 7 | MMS sequence number | Facility or MMS LAPU frame | I | 8.2.4; 8.2.6 | M | 2. 4. |
| 8 | Time Stamp | Time/Date | I | 8.2.7 | M | 3. |
| 9 | Character type coding | LAPU frame | | 7.3.4 | | |
| 10 | Character set coding | LAPU frame | | 7.3.4 | M | 1. |
| 11 | Language coding | LAPU frame | | 7.3.4 | | |
| 12 | User data length | LAPU frame | | 7.3.4 | M | 1. |
| 13 | User data | LAPU frame | | 7.3.4 | M | 1. |

NOTE 1.
This mapping take place only when the MMS (F-data profile) is using the MMS.
NOTE 2.
Either a new coding of Facility element is used or a new information element MMS is defined and used.(See below).
NOTE 3.
A new information element is defined for this purpose below.
NOTE 4.
The element is carried in both LAPU frame and CC-INFO message.

The following table shows the MMS-COMMAND-CC-INFO

| Item No | Message coding MMS MMS-COMMAND | Message coding DECT NWK CC-INFO | GAP status | Ref. | Map status | NOTE |
|---|---|---|---|---|---|---|
| 1 | Action type | Facility or MMS | I | 8.2.4; 8.2.6 | M | 2. |
| 2 | Reply request | Facility or MMS | I | 8.2.4; 8.2.6 | M | 2. |
| 3 | MMS sequence number | Facility or MMS | I | 8.2.4; 8.2.6 | M | 2. |
| 4 | Service type | Facility or MMS | I | 8.2.4; 8.2.6 | M | 2. |
| 5 | Time Stamp | Time/Date | I | 8.2.7 | M | |
| 6 | Intermediate server address | Called party number | I | 8.2.5 | M | |
| 7 | Data content type | Facility or MMS | I | 8.2.4; 8.2.6 | M | 2. |
| 8 | Command object | Facility or MMS | I | 8.2.4; 8.2.6 | M | 2. |
| 9 | Command type | Facility or MMS | I | 8.2.4; 8.2.6 | M | 2. |
| 10 | Escape commands present | Facility or MMS | | 8.2.4; 8.2.6 | M | 2. |
| 11 | Control data length | IWU-TO-IWU | I | 8.2.12 | M | |
| 12 | Control data | IWU-TO-IWU | I | 8.2.12 | M | |

NOTE 2.
Either a new coding of Facility element is used or a new information element MMS is defined and used.(See below).

The following table shows the MMS-COMMAND-RPY-CC-INFO

| Item No | Message coding MMS MMS-COMMAND-RPY | Message coding DECT NWK CC-INFO | GAP status | Ref. | Map status | NOTE |
|---|---|---|---|---|---|---|
| 1 | Action type | Facility or MMS | I | 8.2.4; 8.2.6 | M | 2. |
| 2 | MMS sequence number | Facility or MMS | I | 8.2.4; 8.2.6 | M | 2. |

-continued

| Item No | Message coding MMS MMS-COMMAND-RPY | Message coding DECT NWK CC-INFO | GAP status | Ref. | Map status | NOTE |
|---|---|---|---|---|---|---|
| 3 | Time Stamp | Time/Date | I | 8.2.7 | M | |
| 4 | Command object | Facility or MMS | I | 8.2.4; 8.2.6 | M | 2. |
| 5 | Command type | Facility or MMS | I | 8.2.4; 8.2.6 | M | 2. |
| 6 | Action result | Facility or MMS | I | 8.2.4; 8.2.6 | M | 2. |
| 9 | Control data length | IWU-TO-IWU | I | 8.2.12 | M | |
| 10 | Control data | IWU-TO-IWU | I | 8.2.12 | M | |

NOTE 2.
Either a new coding of Facility element is used or a new information element MMS is defined and used.(See below).

The following table shows the MMS-STATUS-CC-INFO

| Item No | Message coding MMS MMS-STATUS | Message coding DECT NWK CC-INFO | GAP status | Ref. | Map status | NOTE |
|---|---|---|---|---|---|---|
| 1 | Action type | Facility or MMS | I | 8.2.4; 8.2.6 | M | 2. |
| 2 | Reply request | Facility or MMS | I | 8.2.4; 8.2.6 | M | 2. |
| 3 | MMS sequence number | Facility or MMS | I | 8.2.4; 8.2.6 | M | 2. |
| 5 | Time Stamp | Time/Date | I | 8.2.7 | M | |
| 6 | Information type | Facility or MMS | I | 8.2.4; 8.2.6 | M | 2. |
| 7 | Action result | Facility or MMS | I | 8.2.4; 8.2.6 | M | 2. |
| 8 | Command object | Facility or MMS | I | 8.2.4; 8.2.6 | M | 2. |
| 9 | Control data length | IWU-TO-IWU | | 8.2.12 | M | |
| 10 | Control data | IWU-TO-IWU | | 8.2.12 | M | |
| 11 | Sender address | Calling party number | I | 8.2.5 | M | |
| 12 | Service type | Facility or MMS | I | 8.2.4; 8.2.6 | M | 2. |
| 13 | Service subtype | Facility or MMS | I | 8.2.4; 8.2.6 | M | 2. |
| 14 | Data content type | Facility or MMS | | 8.2.4; 8.2.6 | M | 2. |
| 15 | Time Stamp | Time/Date | I | 8.2.7 | M | |
| 16 | User data length | Facility or MMS | I | 8.2.4; 8.2.6 | M | 2. |

NOTE 2.
Either a new coding of Facility element is used or a new information element MMS is defined and used.(See below).

The following table shows the MMS-STATUS-RPY-CC-INFO

| Item No | Message coding MMS MMS-STATUS-RPY | Message coding DECT NWK CC-INFO | GAP status | Ref. | Map status | NOTE |
|---|---|---|---|---|---|---|
| 1 | Action type | Facility or MMS | I | 8.2.4; 8.2.6 | M | 2. |
| 2 | MMS sequence number | Facility or MMS | I | 8.2.4; 8.2.6 | M | 2. |
| 3 | Action result | Facility or MMS | I | 8.2.4; 8.2.6 | M | 2. |

NOTE 2.
Either a new coding of Facility element is used or a new information element MMS is defined and used.(See below).

The following table shows the C-MMS messages

TABLE x

List of mapped C-MMS messages

| Item No | MMS MSG | DECT MSG | Status in GAP | Ref. | Map Status |
|---|---|---|---|---|---|
| 1 | MMS-SETUP | CC-SETUP | M | 7.3.3.1 | M |
| 2 | MMS-CONNECT | CC-CONNECT | M | 7.3.3.3 | M |
| 3 | MMS-RELEASE | CC-RELEASE | M | 7.3.3.2 | M |
| 4 | MMS-RELEASE-COM | CC-RELEASE-COM | M | 7.3.3.2 | M |

The following table shows the MMS-SETUP-CC-SETUP

| Item No | Message coding MMS MMS-SETUP | Message coding DECT NWK CC-SETUP | GAP status | Ref. | Map status | NOTE |
|---|---|---|---|---|---|---|
| 1 | Iwu-attributes | Iwu-attributes | I | 8.2.2 | M | |
| 2 | called party number | called party number | I | | M | |
| 3 | calling party number | calling party number | I | | M | |

The following table shows the MMS-CONNECT-CC-CONNECT

| Item No | Message coding MMS | Message coding DECT NWK | GAP status | Ref. | Map status | NOTE |
|---|---|---|---|---|---|---|
| | MMS-CONNECT | CC-CONNECT | | | | |

The following table shows the MMS-RELEASE-CC-RELEASE

| Item No | Message coding MMS | Message coding DECT NWK | GAP status | Ref. | Map status | NOTE |
|---|---|---|---|---|---|---|
| | MMS-RELEASE | CC-RELEASE | | | | |
| | Release reason | Release reason | | | | |

The following table shows the MMS-RELEASE-COM-CC-RELEASE-COM

| Item No | Message coding MMS | Message coding DECT NWK | GAP status | Ref. | Map status | NOTE |
|---|---|---|---|---|---|---|
| | MMS-RELEASE-COM | CC-RELEASE-COM | | | | |
| | Release reason | Release reason | | | | |

The added information element required in addition to GAP will now be defined. As defined elsewhere in this document the MMS virtual protocol can be regarded as service that supports the DECT data teleservices such as short messaging and facsimile. Thus the idea here is to provide the MMS User control coding and MMS messaging coding in the way DECT supplementary services are provided. This means that the MMS can be intitated during the call establishment but also a low bearer service connection can be upgraded into a full MMS connection. It should be noted that in the case of E-profile (LRMS) the MMS cannot be a supplementary service for voice call since the voice call has its own transaction identifier and the MMS service is cannot provide any additional information to this service. This is why in this document the expression Supplementary Service is avoided when referred to MMS. Thus MMS is an additional service that can be used to upgrade a bearer service into a full teleservice and this can be done even during the bearer service connection. This is possible in the case of F-data profile in a way that the C.2 profile which is the bearer service under the F can be upgraded into F profile by initiating the MMS connection during the call. In the case of LRMS a completely new CC instance has to be intitated without U-plane. The E profile can be also upgraded into F profile by adding a C.2 U-plane connection under the MMS protocol. Thus the following rules apply (see FIG. 24).

If C.2 is on and the MMS is activated to the same Call Control transaction the connection is upgraded into F.2 profile. Also other way around.

If E.2 is on and the C.2 U-plane is activated to the same Call Control transaction the connection is upgraded to F.2 connection. Also other way around.

The C.2 and E.2 can exist at the same time in a same terminal with separate transactions as well as F.2 and E.2.

For upgrading the C.2 to F.2 profile uses the <<Feature activate>> element. This can be done only in the direction PP to FP. The FP can indicate MMS activation with <<Feature indicate>> field.

For upgrading the E.2 to F.2 profile the CC-SERVICE-CHANGE message has to be used.

<<Facilty>> or new <<MMS protocol>> element in {CC-INFO} message is used for MMS message transfer in general.

When E and F profile call is established the systems initiate the MMS by default.

Since prior art DECT air interfaces support only a limited service negotiation capability, also a new service negotiation is also now proposed by adding the <<iwu-attributes>> element to the {CC-INFO} message. In this way the service negotiation is more flexible and some interworking unit/network service parameters can be negotiatied/changes even during the call establishment. Also a new coding of the <<iwu-attributes>> element is defined below to provide more general coding to IWU service selection. This was done due to fact that current coding of the <<iwu-attributes>> element is only ISDN oriented and does not fit well into general data service selection. The new coding is backwards compatible with the old coding.

Figure 24:
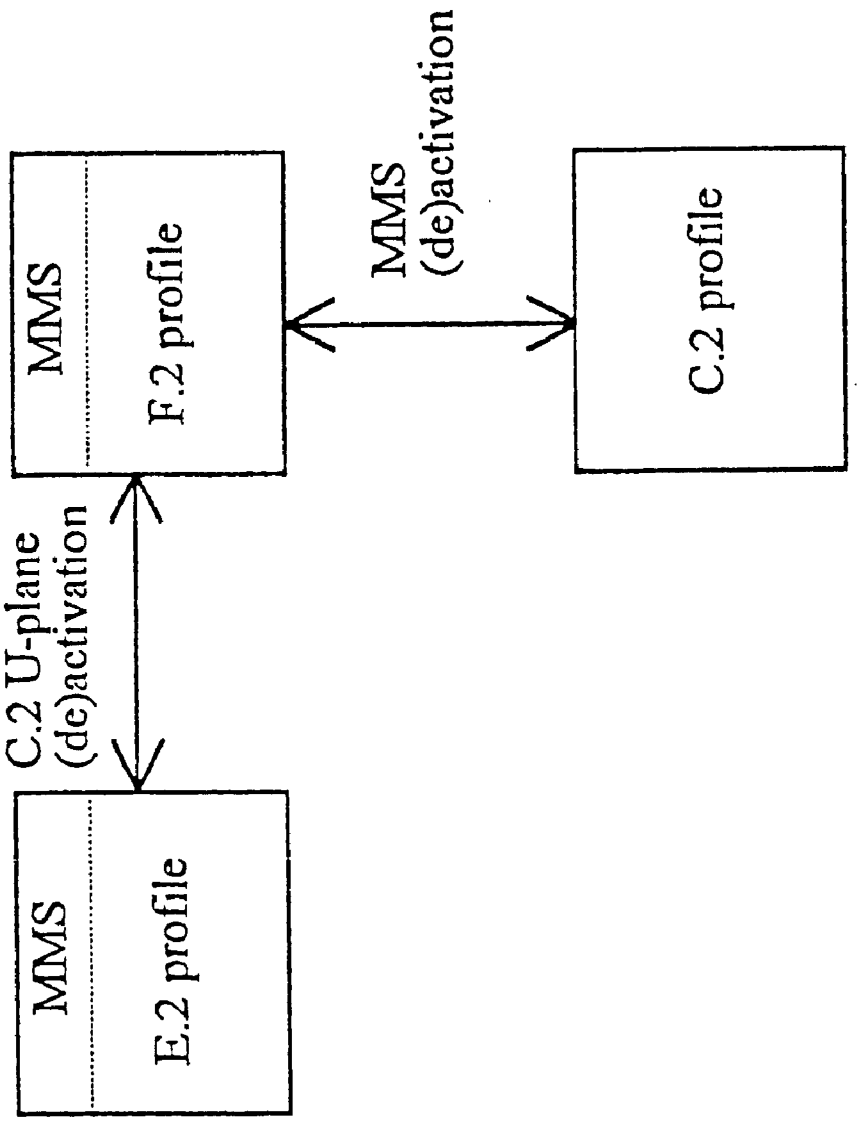
FIG. 24 shows the upgrading/downgrading procedures.

The call establishment has been illustrated in FIG. 24 in actions 1 and 2. It should be noted that additional signalling may take place between the {CC-SETUP} and {CC-CONNECT}. The {CC-SETUP} message will contain the following information in addition to the GAP requirements.

| Information element | status in GAP | Field within the information element | Standard values within the field/IE | Normative action/comment |
|---|---|---|---|---|
| <<Portable identity>> | M | | | Coded as in GAP |
| <<Fixed Identity>> | M | | | Coded as in GAP |
| <<Basic service>> | M | | | |
| | | <Call class> | 1 1 1 0 | "Messaging call setup" Note 1. |
| | | <Basic service> | 1 1 1 1 | "Other" The coding is defined by <<iwu attributes>> and <<call attributes>> Note 1. |
| <<Iwu-attributes>> | I | | | |
| | | <Coding standard> | 0 1 | "Profile specific coding" Note 1. |
| | | <Profile ID> | 0 0 0 1 1 0 0 1 0 0 | " E profile " or " F profile" Note 1. |
| | | <HLC ID> | 1 0 | Octet identifier Note 1. |
| | | <HLC coding indicator> | 0 0 0 0 1 | "User protocol ID present" Note 1. |
| | | <User protocol ID> | 1 1 0 0 1 | "DECT LRMS/MMS (MMSP)" Note 1. Rest of the codings are depending on the requested service. Note 1. |
| <<call attributes>> | I | | | |
| | | <Coding standard> | 0 0 | DECT |
| | | Network layer attributes | 0 1 1 0 0 | "DECT LRMS service profile (E data profile" or |
| | | | 0 1 1 0 1 | "DECT MMS service profile (F data profile)" Note 1. Rest of the codings are depending on the requested service. Note 1. |
| <<connection attributes>> | I | | | All codings are situation and profile dependent |
| | | <<Number of bearer coding>> | 0 0 0 0 0 | "No-U-plane" in E profile case |
| <<Called party number>> | I | | | |
| | | <Number type> | 0 1 1 | "Server number" Note 1. |
| | | <Numbering plan identification> | | Value depends on the interworked network |
| <<Calling party number>> | I | | | |
| | | <Number type> | 0 1 1 | "Network specific number" |

-continued

| Information element | status in GAP | Field within the information element | Standard values within the field/IE | Normative action/comment |
|---|---|---|---|---|
| | | <Numbering plan identification> | | Value depends on the interworked network |

NOTE. Contains new coding(s). See below.

{CC-CONNECT} message content is as it is defined in the GAP DRAFT prETS 300 444.Version 2.02. Radio Equipment and Systems (RES); Digital European Cordless Telecommunications (DECT): Generic Access Profile (GAP). European Telecommunications Standards Institute. May 1994.138 pages, i.e. all fields are optional.

The Low Rate Messaging Service (LRMS, the E-data profile) messaging uses {CC-INFO} messages to convey the MMS messages. In this case the CC-INFO contains the MMS user data information, the MMS user data control information as well as the MMS messaging information.

The following table shows the {CC-INFO} message content for this:

| Information element | status in GAP | Field within the information element | Standard values within the field/IE | Normative action/comment |
|---|---|---|---|---|
| <<Multi keypad>> | M | | | Not used with MMS |
| <<Facility>> | I | | | Either this element or <<MMS>> element |
| | | <Service discriminator> | 1 0 0 1 0 | "Discriminator for MMS service applications" |
| | | <Components> | | Contains the MMS control information |
| <<Calling-Party-Number>> | I | | | Defines the MMS message sender number. Note 1. |
| | | <Number type> | 0 1 1 | "Network specific number" |
| | | <Numbering plan identification> | | Value depends on the interworked network |
| <<Called-Party-Number>> | I | | | Defines the MMS message recipient number |
| | | <Number type> | 0 1 1 | "Network specific number" |
| | | <Numbering plan identification> | | Value depends on the interworked network |
| <<Called-Party-Subaddress>> | I | | | May contain additional information related to the recipient |
| | | <Subaddress type> | | Value depends on the interworked network |
| | | <Odd/Even> | | Value depends on the interworked network |
| <<Time/date>> | I | | | Date information. Note 1. |
| <<MMS>> | I | | | Either this of <<Facility>> element contains the MMS control |

-continued

| Information element | status in GAP | Field within the information element | Standard values within the field/IE | Normative action/comment |
|---|---|---|---|---|
| | | | | information. Note 1. |
| <<Segmented info>> | I | | | Contains information if the <<Alphanumeric>>element has been segmented. Note 1. |
| <<Alpha-numeric>> | I | | | Note 1. |
| | | <Character type> | | |
| | | <Odd/Even> | | |
| | | <Character set coding> | | |
| | | <List of characters> | | Contains the message information |
| <<IWU-TO-IWU>> | I | | | May contain upper layer messages or escape commands |
| | | <Protocol ID> | | Contains coding regarding the message content |

NOTE 1. New coding(s)/element. See below.

The Multimedia Messaging Service (MMS, the F-data profile) messaging uses CC-INFO messages to convey the MMS messages. In this case the CC-INFO contains the MMS user data control information as well as the MMS messaging information. The user data information is conveyed through the U-plane LAPU connection. The MMS message in CC-INFO transmits the control information related to the connection.

The following table shows the {CC-INFO} message content for this:

| Information element | status in GAP | Field within the information element | Standard values within the field/IE | Normative action/comment |
|---|---|---|---|---|
| <<Multi keypad>> | M | | | Not used with MMS |
| <<Facility>> | I | | | Either this element or <<MMS>> element. Note 1. |
| | | <Service discriminator> | 1 0 0 1 0 | "Discriminator for MMS service applications" |
| | | <Components> | | Contains the MMS control information |
| <<Calling-Party-Number>> | I | | | Defines the MMS message sender number. Note 1. |
| | | <Number type> | 0 1 1 | "Network specific number" |
| | | <Numbering plan identification> | | Value depends on the interworked network |
| <<Called-Party-Number>> | I | | | Defines the MMS message recipient number |
| | | <Number type> | 0 1 1 | "Network specific number" |

-continued

| Information element | status in GAP | Field within the information element | Standard values within the field/IE | Normative action/comment |
|---|---|---|---|---|
| | | <Numbering plan identification> | | Value depends on the interworked network |
| <<Called-Party-Subaddress>> | I | | | May contain additional information related to the recipient |
| | | <Subaddress type> | | Value depends on the interworked network |
| | | <Odd/Even> | | Value depends on the interworked network |
| <<Time/date>> | I | | | Date information. Note 1. |
| <<MMS>> | I | | | Either this of <<Facility>> element contains the MMS control information. Note 1. |

NOTE 1. New coding(s)/element. See below:

The following frame is carried in the LAPU information field. The content is the same as in <<Alphanumeric>> element.

| Information element | Field within the information element | Length | Normative action/comment |
|---|---|---|---|
| <<MMS sequence coding>> | | 1–2 octets (7 bits used of each octet) | This field has the same value as in the CC-INFO message carried at the same time. |
| <<Data content type>> | | 1 octet ( 7 bits used of each octet) | This field has the same value as in the CC-INFO message carried at the same time. |
| <Length of contents> | | 1–4 octets (7 bits used of each octet) | This element is coded as the User data length |
| <Character type> | | | Coded as respective field in 8.2.8 <<Alphanumeric>> element. |
| <Odd/Even> | | | Coded as respective field in 8.2.8 <<Alphanumeric>> element. |
| <Character set coding> | | | Coded as respective field in 8.2.8 <<Alphanumeric>> element. |
| <Data> | | | Contains the message information |

Note that the first three elements are coded exactly like respective codings in CC-INFO (the bit 8 of each octet is used for element coding purposes).

There are three different cases: the call service change, call suspension, call resumption and service up/downgrading.

Figure 25:
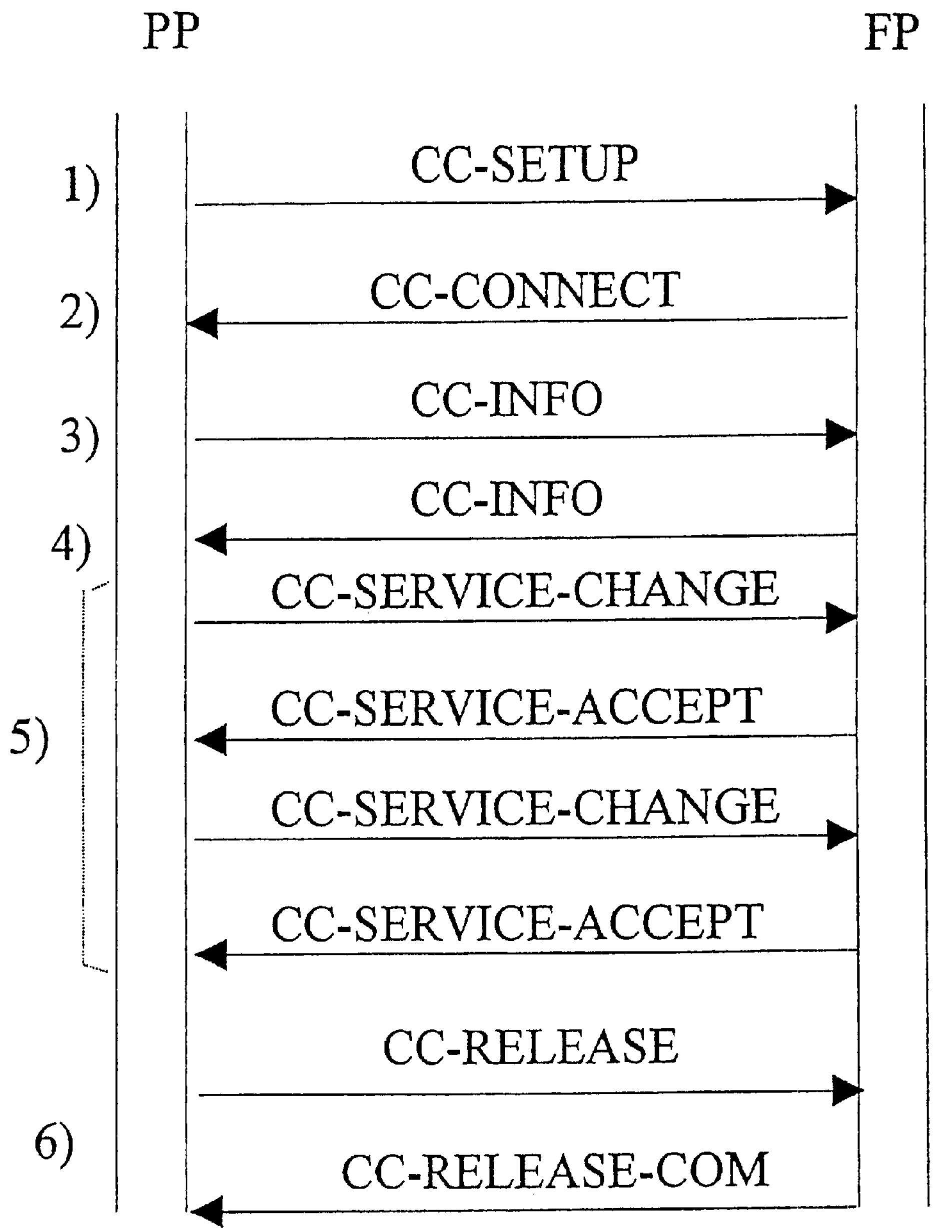
FIG. 25 shows outgoing MMS call.
Figure 26:
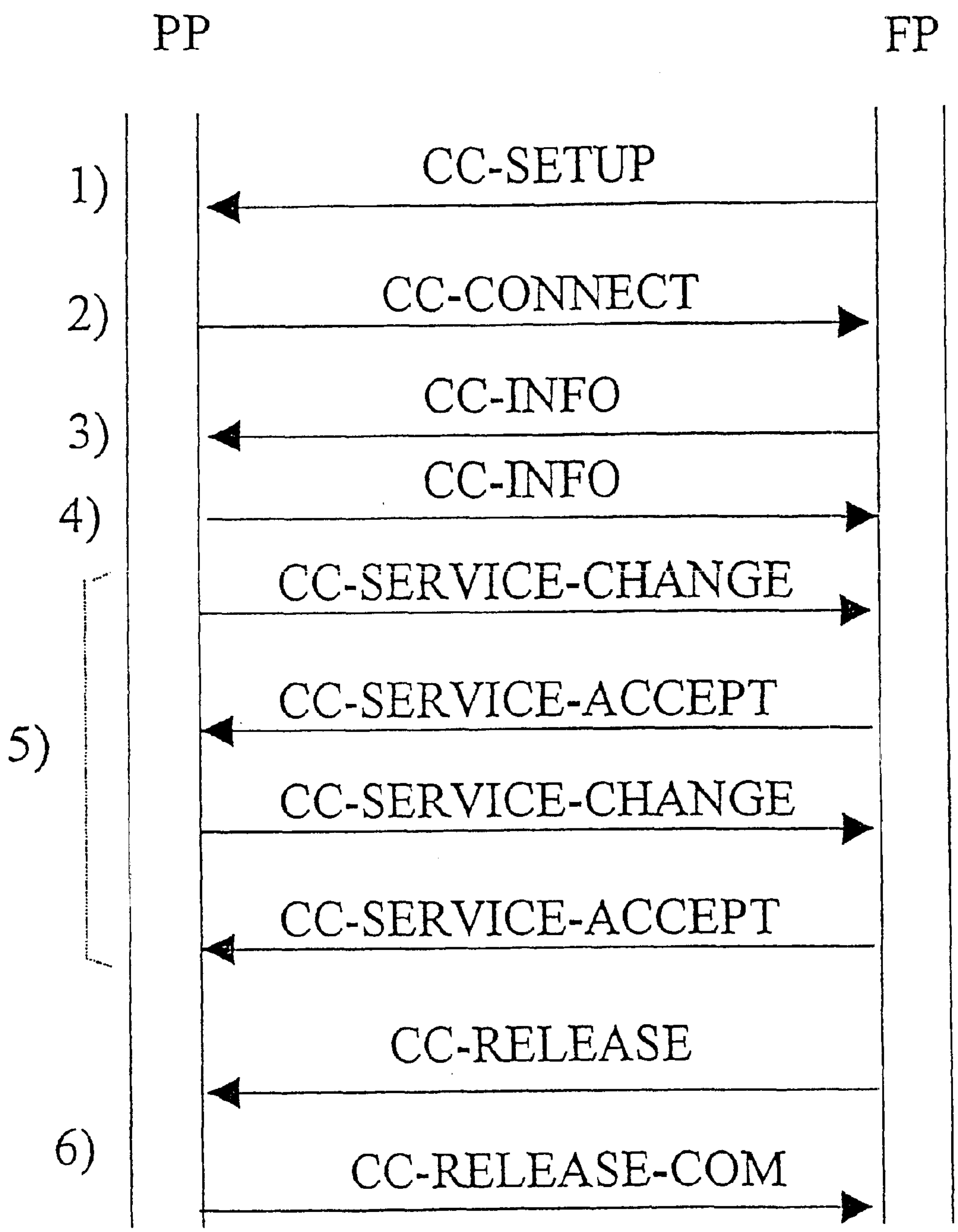
FIG. 26 shows incoming MMS call.

The call suspension illustrated in action 5 in FIGS. 25 and 26 and is done as described in the C.2 data profile Draft prETR 300 xxx. Version 5.00. Work Item No:DE/RES-03-030. Radio Equipment and Systems (RES); Digital European Cordless Telecommunications. Data Services Profile. Profile. Generic data link service. Service Type C, Class 2.

European Telecommunications Standards Institute.20.1.1995. 260 pages and is optional.

The call resumption illustrated in action 5 in FIGS. 25 and 26 and is done as described in the C.2 data profile and is optional.

The action 5 in the FIGS. 25 and 26 can be the link up/down grading procedure. This message is used only when the E profile connection is upgraded to F.2 profile connection by initiating C.2 profile U-plane.

The following table shows the {CC-SERVICE-CHANGE} message content:

| Information element | Field within the information element | Standard values within the field/IE | Normative action/comment |
|---|---|---|---|
| <<Service-change-info>> | | | Contains the service change info |
| | <Change mode coding> | 0 0 1 0 | Bandwidth change |
| <<Connection attributes>> | | | Contains the new connection attributes |
| | <Symmetry> | | Connection related values. See 7.7.11 in ETS 300 175-5 |
| | <Connection identity coding> | 1 N N N | Advanced connection number. The current connection number. |
| | <Bearer definition coding> | | Connection related values. See 7.7.11 in ETS 300 175-5 |
| | <Number of bearer coding> | 0 0 0 0 0 | "No U-plane". This value is used when F profile is downgraded to E. |
| | | n n n n n | Number of bearers. This field contains the requested bearer value when upgrading the E to F profile connection. |

The procedure of up/downgrading between F- and C-data profiles is used for changing a bearer services (C-data profile) to a teleservice (F-data profile). A PP can initiate this type of procedure by sending a <<feature activate>> information element in the {CC-INFO} message. The <<feature activate>> element contains value "MMS service" in the <<Feature coding>> field. The Fixed part responses with {CC-INFO} message containing <<Feature indicate>> element with value "MMS Service" in the <<Feature coding>> field and "Activated" in the <<Status indicator>> to indicate successful MMS activation.

The following table shows the {CC-INFO} message content:

| Information element | status in GAP | Field within the information element | Standard values within the field/IE | Normative action/comment |
|---|---|---|---|---|
| <<Feature activate>> | I | | | In PP to FP direction |
| | | <Feature coding> | x x x x | "MMS activate". Note 1. |
| <<Feature indicate>> | I | | | In FP to PP direction |
| | | <Feature coding> | x x x x | MMS indicate. Note 1. |

NOTE 1. New coding(s)/element. See below.

The procedure of connection parameter negotiation is used to negotation IWU service related parameters or affect the IWU selection during the established connection or during the connection establishment. The procedure takes place by sending new reqested values in <<iwu-attributes>> element of the {CC-INFO} message. This procedure can be used also with other data profiles i.e. no MMS functionality is needed. The {CC-INFO} message with new values can be sent an message of its own (requesting IWU/parameter change), as a response to {CC-SETUP} message (reflecting new parameters for a connection i.e. service negotiation) or as a response a {CC-INFO} requesting IWU service/parameter change. An example of the usage of this functionalty in the case of GSM interworking is given below.

The following table shows the {CC-INFO} message content:

| Information element | status in GAP | Field within the information element | Standard values within the field/IE | Normative action/comment |
|---|---|---|---|---|
| <<lwu-attributes>> | I | | | Note 1. |
| | | <Negotiation> | 1 1 0 | "Connection parameter negotiation". Note 1. Other codings are done according to the requested service. |

NOTE 1. New coding(s)/element. See below.

The call release procedures are done as defined in the GAP profile.

The following M-MMS-SAP primitives are used in the MMS-API interface of the full-API model.

| Primitive | Req | Cfm | Ind | Res |
|---|---|---|---|---|
| M-MMS-SEND- | x | x | x | x |
| M-MMS-RETRIEVE- | x | | x | |
| M-MMS-CONTROL- | x | x | x | x |

The M/C-MMS-SAP primitives of the full-API model are the same primitives as in C-MMS-SAP of half-API model but they are used directly by the M-MMS part.

| Primitive | Req | Cfm | Ind | Res |
|---|---|---|---|---|
| M-MMS-SETUP- | x | | x | |
| M-MMS-CONNECT- | x | x | x | |
| M-MMS-RELEASE- | x | x | x | x |
| M-MMS-MODIFY- | x | x | x | |

The rules how the M-MMS part uses the M/C-MMS-SAP are defined in each service interworking description.

The following M-MMS-SAP primitives are used in the MMS-API interface of the half-API model.

| Primitive | Req | Cfm | Ind | Res |
|---|---|---|---|---|
| M-MMS-SEND- | x | x | x | x |
| M-MMS-RETRIEVE- | x | | x | |
| M-MMS-CONTROL- | x | x | x | x |

The following C-MMS-SAP primitives are used in the MMS-API interface of the half-API model.

| Primitive | Req | Cfm | Ind | Res |
|---|---|---|---|---|
| M-MMS-SETUP- | x | | x | |
| M-MMS-CONNECT- | x | x | x | |
| M-MMS-RELEASE- | x | x | x | x |
| M-MMS-MODIFY- | x | x | x | |
| M-MMS-GRADING- | x | | x | |

NOTE: M-MMS-GRADING- primitives are used for up/down grading the connection between C and F data profiles.

NOTE: M-MMS-GRADING- primitives are used for up/down grading the connection between C and F data profiles.

The non-API interface functionality is defined below.

The following DECT network layer Call Control primitives provide for MMS message transportation.

MNCC-INFO{req,ind}

In addition if the U-plane is used for data transmission the following DECT DLC layer U-plane primitive is used.

DLU-LU3_DATA {req, ind}

The MMS messages are conveyed by this primitive by containing the MMS messages in a parameter.

For MMS call control the following DECT network layer Call Control primitives will be used.

MNCC-SETUP—{req, ind}

MNCC-CONNECT—{req, cfm, ind}

MNCC-RELEASE—{req, cfm, ind, res}

MNCC-MODIFY—{req, cfm, ind}

MNCC-INFO{req, ind}

The MMS messages are conveyed by this primitive by containing the MMS messages in a parameter.

The mapping in the MMS-API case between M-MMS-SAP and NWK primitives in full and half-API models is done as follows:

| MMS primitive | MNCC primitive |
|---|---|
| M-MMS-SEND{req, ind} | MNCC-INFO{req, ind} |
| M-MMS-RETRIEVE{req, ind} | MNCC-INFO{req, ind} |
| M-MMS-CONTROL-{req, ind} | MNCC-INFO{req, ind} |

The following mapping is done for the User data part (parameter) only in the case DECT U-plane is used. Other parameters are mapped as indicated before i.e. the User control data part is mapped to MNCC-INFO.

| MMS primitive | MNCC primitive |
|---|---|
| M-MMS-SEND{req, ind} | DLU-LU3_DATA{req, ind} |

All other primitives are produced inside the MMS virtual layer.

The mapping of C-MMS primitives in the MMS-API case between C-MMS-SAP and NWK primitives is done as follows:

| MMS primitive | MNCC primitive |
|---|---|
| M-MMS-SETUP-{req, ind} | MNCC-SETUP-{req, ind} |
| M-MMS-CONNECT-{req, cfm, ind} | MNCC-CONNECT-{req, cfm, ind} |
| M-MMS-RELEASE-{req, cfm, ind, res} | MNCC-RELEASE-{req, cfm, ind, res} |
| M-MMS-MODIFY-{req, cfm, ind} | MNCC-MODIFY- {req, cfm, ind} |
| M-MMS-GRADING-{req, cfm, ind} | MNCC-INFO{req, ind} |

The parameters depend on the content of the messages. The parameters and their values can be derived from the message contents as described herein.

The following new codings to the DECT network layer are preferred in order to provide MMS connections.

Figure 27:
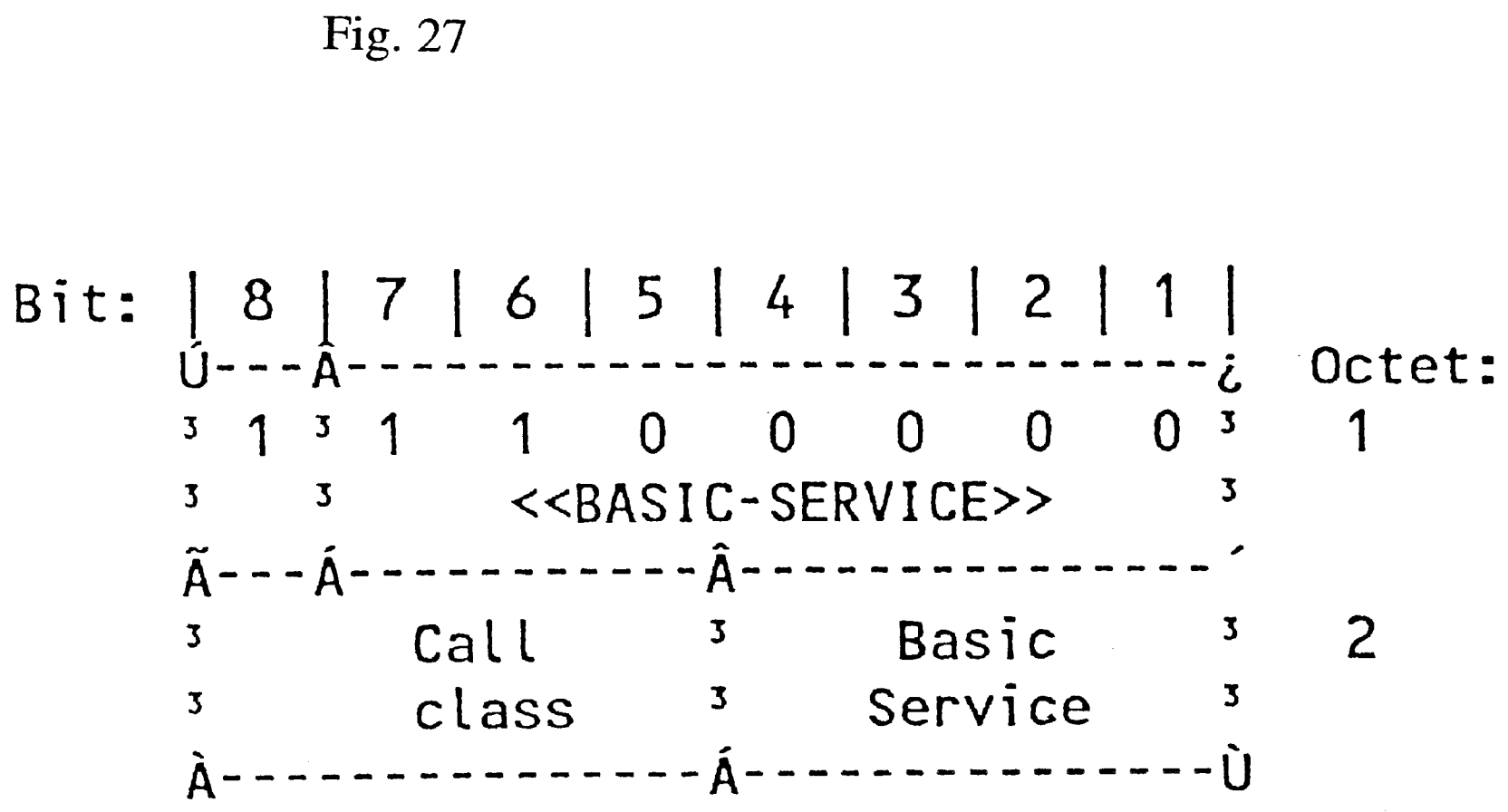

The purpose of the <<BASIC-SERVICE>> element (see Subclause 7.6.4 of ETS 300 175-5 2nd edition) is to indicate the basic aspects of the service requested. This element allows the user to indicate the use of default attributes, thereby reducing the length of the set-up message (see FIG. 27).

Call Class (Octet 2)

| Bits | 8 7 6 5 | Meaning |
|---|---|---|
| | 1 0 0 0 | Normal call set-up |
| | 1 0 0 1 | Internal call (typically used in residential environments) |
| | 1 0 1 0 | Emergency call set-up |
| | 1 0 1 1 | Service call set-up |
| | 1 1 0 0 | External handover call set-up (see subclause 9.3.1.1) |
| | 1 1 0 1 | Supplementary service call set-up |
| | 1 1 1 0 | Messaging service call setup |

All other values reserved.

Basic Service (Octet 2)

| Bits | 4 3 2 1 | Meaning |
|---|---|---|
| | 0 0 0 0 | Basic speech default set-up attributes (NOTE and subclause 9.3.1.1) |
| | 0 1 0 0 | DECT GSM IWP profile (Phase 2) |
| | 1 1 1 1 | Other (see subclause 9.3.1.1) |

All other values reserved.

NOTE: The value of this field may be used in future standards to indicate "specific profile default setup attributes".

The purpose of the <<CALL-ATTRIBUTES>> element (see Subclause 7.7.5 in ETS 300 175-5 2nd edition) is to describe the higher layer service to be provided by the DECT protocol. The element may be repeated in a set-up message when using service negotiation (see FIG. 28).

Coding Standard (Octet 3)

| Bits | 7 6 | Meaning |
|---|---|---|
| | 0 0 | DECT standard coding |

All other values reserved.

Network Layer Attributes (Octet 3)

| Bits | 5 4 3 2 1 | Meaning |
|---|---|---|
| | 0 0 0 0 0 | Undefined |
| | 0 0 0 0 1 | Basic speech |
| | 0 1 0 0 0 | DECT GSM IWP profile phase 2 |
| | 0 1 1 0 0 | DECT LRMS service profile (E data profile) |
| | 0 1 1 0 1 | DECT MMS service profile (F data profile) |

All other values reserved.

The following presentation of the IWU-ATTRIBUTES (see Subclause 7.7.21 in ETS 300 175-5 2nd edition) intends to expand the functionality of the element to be compatible also with other services than just ISDN connections. However the intention was to maintain compatibility with the older version. This proposed element contains also information carried in <<END-TO-END-COMPATIBILITY>> element. The purpose was to combine all information relating to the IWU selection to the same element. However, another option is to leave the <<END-TO-END-COMPATIBILITY>> element as a independent element and cut those overlapping part off from this element.

The purpose of the <<IWU-ATTRIBUTES>> element is to provide a means for service compatibility information to be exchanged (e.g. between a PP application and a FP interworking unit). This element is transferred transparently by the DECT protocol entities (see FIG. 29). Note—the octets 7–7*d* could be left out and replaced by <<end-to-end compatibility>> element. In this case the references to the <<iwu-attributes>> element in this document means a reference to both <<iwu-attributes>> and <<end-to-end compatibility>>. Also, in this case both these elements should be added to the {CC-INFO} message in the case of connection parameter negotiation.

Coding Standard (Octet 3)

| Bits | 7 6 | Meaning |
|---|---|---|
| | 0 0 | DECT standard coding |
| | 0 1 | Profile defined coding |

All other values reserved.

Profile Coding (Oclet 3)

| Bits | 5 4 3 2 1 | Meaning |
|---|---|---|
| | 0 0 0 0 0 | A/B data profile |
| | 0 0 0 0 1 | C data profile |
| | 0 0 0 1 0 | D data profile |
| | 0 0 0 1 1 | E data profile |
| | 0 0 1 0 0 | F data profile |

All other values reserved.

Negotiation Indicator (Octet 4)

| Bits | 7 6 5 | Meaning |
|---|---|---|
| | 0 0 0 | Negotiation not possible |
| | 1 0 0 | Exchanged parameter negotiation |
| | 1 1 0 | Connection parameter negotiation |

All other values reserved.

Network Identity (Octet 5)

| Bits | 7 6 | Meaning |
|---|---|---|
| | 0 0 | octet identifier |

All other values reserved.

External Connection Type (Octet 5)

| Bits | 4 3 2 1 | Meaning |
|---|---|---|
| | 0 0 0 0 | Not applicable |
| | 0 0 0 1 | Connection oriented |
| | 0 0 1 0 | Permanent Virtual Circuit |
| | 0 0 1 1 | Non-permanent Virtual Circuit |
| | 0 1 0 0 | Datagram |
| | 1 0 0 0 | Connectionless |

All other values reserved.

Network (Octet 5*a*)

| Bits | 7 6 5 4 | Meaning |
|---|---|---|
| | 0 0 0 0 | Unspecified |
| | 0 0 0 1 | PSTN |
| | 0 0 1 0 | ISDN |
| | 0 0 1 1 | GSM PLMN |
| | 0 1 0 0 | DECT local network |
| | 1 0 0 0 | CSPDN |
| | 1 0 0 1 | PSPDN |
| | 1 0 1 0 | Internet |
| | 1 0 1 1 | Local Area Networks |
| | 1 1 0 0 | B-ISDN |
| | 1 1 1 1 | Reserved for extension |

All other values reserved.

TE-network Interface (Octet 5*a*)

| Bits | 3 2 1 | Meaning |
|---|---|---|
| | 0 0 0 | Not defined |
| | 1 0 0 | Standard interface |

All other values reserved.

External Service Type (Octet 5*b*)

| Bits | 7 6 5 4 3 2 1 | Meaning |
|---|---|---|
| | 0 0 0 0 0 0 0 | Not specified |
| | 0 0 0 0 0 0 1 | Any method |
| | 0 0 0 0 0 1 0 | Address based IWU selection |
| | 0 0 0 0 0 1 1 | A message handling facility |
| | 0 0 0 0 1 0 0 | Physical |
| | 0 0 0 1 0 0 0 | Voice telephone |
| | 0 0 0 1 0 0 1 | Telex |
| | 0 0 0 1 0 1 0 | Teletex |
| | 0 0 0 1 0 1 1 | Facsimile group 3 |
| | 0 0 0 1 1 0 0 | Facsimile group 4 |
| | 0 0 0 1 1 0 1 | Videotex (T.100/T.101) |
| | 0 0 1 0 0 0 0 | ERMES |
| | 0 0 1 0 0 0 1 | National paging |
| | 0 0 1 0 0 1 0 | UCI (ETS 300 133-3) |
| | 0 0 1 0 0 1 1 | GSM SMS |
| | 0 0 1 0 1 0 0 | DECT MMS |

-continued

| Bits | 7 6 5 4 3 2 1 | Meaning |
|---|---|---|
| | 0 0 1 0 1 0 1 | DECT LRMS |
| | 0 0 1 0 1 1 0 | IA5 terminal |
| | 0 0 1 0 1 1 1 | X.400 message handling |
| | 0 1 0 0 0 0 0 | FTP |
| | 0 1 0 0 0 0 1 | HTTP |
| | 0 1 0 0 0 1 0 | Gopher |
| | 0 1 0 0 0 1 1 | News |
| | 0 1 0 0 1 0 0 | News/NNTP |
| | 0 1 0 0 1 0 1 | Telnet |
| | 0 1 0 0 1 1 0 | Wide area info server |
| | 0 1 0 0 1 1 1 | Host specific file names |
| | 0 1 0 1 0 0 0 | Prospero |

All other values reserved.

LLC Identity (Octet 6)

| Bits | 7 6 | Meaning |
|---|---|---|
| | 0 1 | octet identifier |

All other values reserved.

LLC Coding Indicator (Octet 6)

| Bits | 5 4 3 2 1 | Meaning |
|---|---|---|
| | x x x x 1 | LLC Information transfer attributes present |
| | x x x 1 x | LLC Access attributes present |
| | x x 1 x x | User information layer 1 protocol ID present |
| | x 1 x x x | User information layer 2 protocol ID present |
| | 1 x x x x | User information layer 3 protocol ID present |

All other values reserved.

Information Transfer Capability (Octet 6*a*)

| Bits | 5 4 3 2 1 | Meaning |
|---|---|---|
| | 0 0 0 0 0 | Speech |
| | 0 1 0 0 0 | Unrestricted digital information |
| | 0 1 0 0 1 | Restricted digital information |
| | 1 0 0 0 0 | 3.1 kHz audio |
| | 1 0 0 0 1 | 7.0 kHz audio |
| | 1 0 1 0 0 | Fax |
| | 1 1 0 0 0 | Video |

All other values reserved.

Transfer Mode (Octet 6*b*)

| Bits | 7 6 | Meaning |
|---|---|---|
| | 0 0 | Circuit mode |
| | 1 0 | Packet mode |
| | 1 1 | None (no transfer mode required) |

All other values reserved.

Information Transfer Rate (Octet 6*b* and 6*e*)

| Bits | 5 4 3 2 1 | |
|---|---|---|
| | 0 0 0 0 0 | Packet mode calls |
| | 0 1 0 1 0 | 16 kbps |
| | 0 1 0 1 1 | 32 kbps |
| | 1 0 0 0 0 | 64 kbps |
| | 1 0 0 0 1 | 2 × 64 kbps |
| | 1 0 0 1 1 | 384 kbps |
| | 1 1 1 1 0 | Unspecified |
| | 1 1 1 1 1 | Defined by rate multiplier |

All other values reserved.
NOTE 1: When octet 5c is omitted, the transfer rate is symmetric. When octet 5c is included, the rate in octet 5 refers to the direction Orig => Dest, and the rate in octet 5c refers to the reverse direction.

If the reserved coding "defined by rate multiplier" is used, then octet 5*a* shall follow. Octet 5*d* shall also follow if octet 5*c* is used (i.e. for asymmetric rates).

Structure (Octet 5*b*)

| 7 6 5 | Meaning |
|---|---|
| 0 0 0 | Default |
| 0 0 1 | 8 kHz integrity |
| 1 0 0 | SDU integrity |
| 1 1 1 | Unstructured |

All other values reserved.

If octet 5*b* is omitted, or the structure field is coded "default" the structure attribute shall be defaulted according to the following table:

| Transfer mode | Transfer capability | Structure |
|---|---|---|
| circuit | speech | 8 kHz integrity |
| circuit | restricted digital | 8 kHz integrity |
| circuit | 3.1 kHz audio | 8 kHz integrity |
| circuit | 7.0 kHz audio | 8 kHz integrity |
| circuit | fax | 8 kHz integrity |
| circuit | video | 8 kHz integrity |
| packet | unrestricted digital | SDU integrity |

Configuration (Octet 6*d*)

| Bits | 4 3 | Meaning |
|---|---|---|
| | 0 0 | point-to-point |

All other values reserved.

Establishment (Octet 6*d*)

| Bits | 2 1 | Meaning |
|---|---|---|
| | 0 0 | demand |

All other values reserved.

Unit Rate (Octet 6c and 6)

| Bits | 7 6 | Meaning |
|---|---|---|
| | 0 1 | 16 kbps steps |
| | 1 0 | 32 kbps steps |
| | 1 1 | 64 kbps steps |

All other values reserved.

Rate Multiplier (Octet 5a and 5d)

| Bits | 5 4 3 2 1 | Meaning |
|---|---|---|
| | 0 n n n n | Number of steps |

All other values reserved.
NOTE 2: The number of steps (nnnn) relates to the unit rate defined in the same octet. The value is coded with the natural binary value, with the least significant bit in bit position "1". Allowable values for "number of steps" are "1" to "15".

Symmetry (Octet 5c)

| Bits | 7 6 | Meaning |
|---|---|---|
| | 0 0 | bidirectional symmetric |
| | 1 0 | unidirectional asymmetric |
| | 1 1 | bidirectional asymmetric |

All other values reserved.

Rate Adaption (Octet 6)

| Bits | 5 4 | Meaning |
|---|---|---|
| | 0 0 | no rate adaption |
| | 0 1 | C.110/X.30 rate adaption |
| | 1 0 | CCITT X.31 flag stuffing |

All other values reserved.

Signalling Access Protocol (Octet 7)

| Bits | 5 4 3 | Meaning |
|---|---|---|
| | 0 0 1 | I.440/450 |
| | 0 1 0 | X.21 |
| | 0 1 1 | X.28 - dedicated PAD, individual NUI |
| | 1 0 0 | X.28 - dedicated PAD, universal NUI |
| | 1 0 1 | X.28 - non dedicated PAD |
| | 1 1 0 | X.32 |

All other values reserved.

Synchronous/asynchronous (Octet 7)

| 7 | Meaning |
|---|---|
| 0 | synchronous |
| 1 | asynchronous |

Negotiation (Octet 7)

| Bits | 6 | Meaning |
|---|---|---|
| | 0 | in-band negotiation not possible |

All other values reserved.
NOTE: See Rec. V.110 and X.30

User Rate Coding (Oclet 7a)

| Bits | 7 6 5 4 3 2 1 | Meaning |
|---|---|---|
| | 0 0 0 0 0 0 1 | 0.6 kbps; V.6 and X.1. |
| | 0 0 0 0 0 1 0 | 1.2 kbps; V.6. |
| | 0 0 0 0 0 1 1 | 2.4 kbps; V.6 and X.1. |
| | 0 0 0 0 1 0 0 | 3.6 kbps; V.6. |
| | 0 0 0 0 1 0 1 | 4.8 kbps; V.6 and X.1. |
| | 0 0 0 0 1 1 0 | 7.2 kbps; V.6. |
| | 0 0 0 0 1 1 1 | 8.0 kbps; I.460. |
| | 0 0 0 1 0 0 0 | 9.6 kbps; V.6 and X.1. (GSM HSCSD) |
| | 0 0 0 1 0 0 1 | 14.4 kbps; V.6. (GSM HSCSD) |
| | 0 0 0 1 0 1 0 | 16 kbps; I.460. |
| | 0 0 0 1 0 1 1 | 19.2 kbps; V.6. (GSM HSCSD) |
| | 0 0 0 1 1 0 0 | 32 kbps; I.460. (GSM HSCSD) |
| | 0 0 0 1 1 1 0 | 48 kbps; V.6 and X.1. (GSM HSCSD) |
| | 0 0 0 1 1 1 1 | 56 kbps; V.6. |
| | 0 0 1 0 0 0 0 | 64 kbps; X.1. (GSM HSCSD) |
| | 0 0 1 0 1 0 1 | 0.1345 kbps; X.1. |
| | 0 0 1 0 1 1 0 | 0.1 kbps; X.1. |
| | 0 0 1 0 1 1 1 | 0.075/1.2 kbps; V.6 and X.1. (NOTE 5) |
| | 0 0 1 1 0 0 0 | 1.2/0.075 kbps; V.6 and X.1. (NOTE 5) |
| | 0 0 1 1 0 0 1 | 0.050 kbps; V.6 and X.1. |
| | 0 0 1 1 0 1 0 | 0.075 kbps; V.6 and X.1. |
| | 0 0 1 1 0 1 1 | 0.110 kbps; V.6 and X.1. |
| | 0 0 1 1 1 0 0 | 0.150 kbps; V.6 and X.1. |
| | 0 0 1 1 1 0 1 | 0.200 kbps; V.6 and X.1. |
| | 0 0 1 1 1 1 0 | 0.300 kbps; V.6 and X.1. |
| | 0 0 1 1 1 1 1 | 12 kbps; V.6. |
| | x x x x x x x | 28.8 kbps; (GSM HSCSD) |
| | x x x x x x x | 38.4 kbps; (GSM HSCSD) |
| | x x x x x x x | 57.6 kbps; (GSM HSCSD) |
| | x x x x x x x | 67.2 kbps; (GSM HSCSD) |
| | x x x x x x x | 76.8 kbps; (GSM HSCSD) |
| | x x x x x x x | 96 kbps; (GSM HSCSD) |

All other values reserved.
NOTE 5: The first rate is the transmit rate in the forward direction of the call. The second rate is the transmit rate in the backward direction of the call.
NOTE 6: See recommendations for CCITT X-series and CCITT I.460.

Intermediate Rate (Interm Rate) (Octet 7b)

| Bits | 7 6 | Meaning |
|---|---|---|
| | 0 0 | Not used |
| | 0 1 | 8 kbps |
| | 1 0 | 16 kbps |
| | 1 1 | 32 kbps |

Network Independent Clock on Transmission (NIC tx) (Octet 7b)

| Bits | 5 | Meaning |
|---|---|---|
| | 0 | Not required to send data with network independent clock |
| | 1 | Required to send data with network independent clock |

NOTE 7: NIC tx refers to transmission in the forward direction of the call.
NOTE 8: See CCITT Recommendations V.110 and X.30.

Network Independent Clock on Reception (NIC rx) (Octet 7*b*)

| Bits | 4 | Meaning |
|---|---|---|
| | 0 | Cannot accept data with Network independent clock |
| | 1 | Required to send data with Network independent clock |

NOTE 9: NIC rx refers to transmission in the backward direction of the call.
NOTE 10: See CCITT Recommendations V.110 and X.30.

Flow-Control on Transmission (F-C tx) (Octet 7*b*)

| Bits | 3 | Meaning |
|---|---|---|
| | 0 | Not required to send data with flow control mechanism |
| | 1 | Required to send data with flow control mechanism |

NOTE 11: F-C tx refers to transmission in the forward direction of the call.

Flow-Control on Reception (F-C rx) (Octet 7*b*)

| Bits | 2 | Meaning |
|---|---|---|
| | 0 | Cannot accept data with flow control mechanism (i.e. sender does not support this optional procedure); |
| | 1 | Can accept data with flow control mechanism (i.e. sender does support this optional procedure); |

NOTE 12: F-C rx refers to transmission in the backward direction of the call.

Stop Bits Coding (Octet 7*c*)

| Bits | 7 6 | Meaning |
|---|---|---|
| | 0 0 | Not used |
| | 0 1 | 1 bit |
| | 1 0 | 1.5 bits |
| | 1 1 | 2 bits |

Data Bits Coding (Octet 7*c*)

| Bits | 5 4 | Meaning |
|---|---|---|
| | 0 0 | Not used |
| | 0 1 | 5 bits |
| | 1 0 | 7 bits |
| | 1 1 | 8 bits |

Parity Coding (Octet 7*c*)

| Bits | 3 2 1 | Meaning |
|---|---|---|
| | 0 0 0 | Odd |
| | 0 1 0 | Even |
| | 0 1 1 | None |
| | 1 0 0 | Forced to 0 |
| | 1 0 1 | Forced to 1 |

All other values reserved.

Duplex Mode (Dup) (Octet 7*d*)

| Bits | 7 | Meaning |
|---|---|---|
| | 0 | Half duplex |
| | 1 | Full duplex |

Modem Type (Octet 7*d*)

| Bits | 6 5 4 3 2 1 | Meaning |
|---|---|---|
| | 0 0 0 0 0 0 | Reserved |
| | 0 0 0 0 0 1 | V.21 |
| | 0 0 0 0 1 0 | V.22 |
| | 0 0 0 0 1 1 | V.22 bis |
| | 0 0 0 1 0 0 | V.23 |
| | 0 0 0 1 0 1 | V.26 |
| | 0 0 0 1 1 0 | V.26 bis |
| | 0 0 0 1 1 1 | V.26 ter |
| | 0 0 1 0 0 0 | V.27 |
| | 0 0 1 0 0 1 | V.27 bis |
| | 0 0 1 0 1 0 | V.27 ter |
| | 0 0 1 0 1 1 | V.29 |
| | 0 0 1 1 0 0 | V.32 |
| | 0 0 1 1 0 1 | V.35 |
| | x x x x x x | V.32 bis |
| | x x x x x x | V.34 |
| | 1 0 0 0 0 0 to | } Reserved for national use |
| | 1 1 1 1 1 1 | } |

All other values reserved.
NOTE 13: CCITT V-series Recommendations

User Information Layer 1 Protocol (Octet 8)

| Bits | 7 6 5 4 3 2 1 | Meaning |
|---|---|---|
| | 0 0 0 0 0 0 0 | default layer 1 protocol |

All other values reserved.

User Information Layer 2 Protocol (Octet 8*a*)

| Bits | 5 4 3 2 1 | Meaning |
|---|---|---|
| | 0 0 0 0 0 | User specific (escape) |
| | 0 0 0 0 1 | Basic mode ISO Publication 1745 |
| | 0 0 0 1 0 | CCITT Recommendation Q.921/I.441 (LAP.D) |
| | 0 0 1 1 0 | CCITT Recommendation X.25; link layer (LAP.B) |
| | 0 0 1 1 1 | CCITT Recommendation X.25 multilink |
| | 0 1 0 0 0 | Extended LAP.B |
| | 0 1 1 0 0 | ISO Publication 8802/2 (LAN LLC) |
| | 1 0 0 0 1 | ISO Publication 8802/x [33] (NOTE 7) |
| | 1 0 0 1 0 | GSM Recommendation 04.06) |
| | 1 0 1 1 0 | CCITT Recommendation V.42 (LAP.M) |
| | 1 1 0 0 0 | ISO 6429, codeset 0 (DC1/DC3) |
| | 1 1 0 0 1 | X.75 layer 2 modified (teletex) |
| | 1 1 0 1 0 | videotex profile 1 |
| | 1 1 1 0 0 | COPnoFlCt (Character oriented Protocol with no Flow Control mechanism) |
| | 1 1 1 0 1 | Internet Protocol |

All other values reserved.
NOTE 4: ISO Publication 8802/x refers to LAN operation with a null Layer 2 protocol (LLC not implemented).

User Information Layer 3 Protocol (octet 8*b*)

| Bits | 5 4 3 2 1 | Meaning |
|---|---|---|
| | 0 0 0 0 0 | User specific (escape) |
| | 0 0 0 1 0 | ETS 300 102 |
| | 0 0 1 1 0 | CCITT Recommendation X.25 packet layer |
| | 0 0 1 1 1 | ISO Publication 8208 (CCITT Recommendation X.25 packet level for DTE) |
| | 0 1 0 0 0 | ISO Publication 8348 (OSI C/O protocol) |
| | 0 1 0 0 1 | ISO Publication 8473 (OSI C/L service) |
| | 0 1 0 1 0 | CCITT Recommendation T.70, minimum network layer |
| | 1 0 0 1 0 | GSM Recommendation 04.08 |
| | 0 0 0 0 1 | Transmission Control Protocol |

All other values reserved.

HLC Identity (Octet 9)

| Bits | 7 6 | Meaning |
|---|---|---|
| | 1 0 | octet group identifier |

All other values reserved.

HLC Coding Indicator (Octet 9)

| Bits | 5 4 3 2 1 | Meaning |
|---|---|---|
| | x x x x 1 | User protocol ID present |
| | x x x 1 x | User information layer 4 protocol ID present |
| | x x 1 x x | User information layer 5 protocol ID present |
| | x 1 x x x | User information layer 6 protocol ID present |
| | 1 x x x x | User information layer 7 protocol ID present |

User Protocol ID (Octet 9*a*)

| Bits | 5 4 3 2 1 | Meaning |
|---|---|---|
| | 0 0 0 0 0 | User specific (escape) |
| | 0 0 0 0 1 | V.110/X.30 rate adaption (NOTE 6) |
| | 0 0 0 1 0 | G.711 $\mu$-law PCM |
| | 0 0 0 1 1 | G.711 A-law PCM |
| | 0 0 1 0 0 | G.721 ADPCM |
| | 0 0 1 0 1 | H.221 and H.242 |
| | 0 0 1 1 0 | H.261 Video |
| | 0 0 1 1 1 | Non-standard rate adaption |
| | 0 1 0 0 0 | V.120 rate adaption |
| | 0 1 0 0 1 | X.31 rate adaption |
| | 1 0 0 0 0 | Group 3 fax |
| | 1 0 0 0 1 | Group 4 fax |
| | 1 1 0 0 0 | X.28/X.29 |
| | 1 0 0 1 0 | GSM Recommendation 03.40, SM-TP messages [xx] |
| | 1 0 0 1 1 | CCITT Recommendation X.400 messages [yy] |
| | 1 0 1 0 0 | Internet RFC 822 or MIME messages [zz] |
| | 1 1 0 0 1 | DECT LRMS/MMS protocol (MMSP) |

All other values reserved.
NOTE 3: If octet 6 indicates "V.110/X.30 rate adaption", the set-up message is also required to contain the <<END-TO-END-COMPATIBILITY>> element to define the attributes of the rate adaption service.

User Information Layer 4 Protocol (Octet 9*b*)

| Bits | | | | | |
|---|---|---|---|---|---|
| 5 | 4 | 3 | 2 | 1 | Meaning |

All other values reserved.

User Information Layer 5 Protocol (Octet 9*c*)

| Bits | | | | | |
|---|---|---|---|---|---|
| 5 | 4 | 3 | 2 | 1 | Meaning |

All other values reserved.

User Information Layer 6 Protocol (Octet 9*d*)

| Bits | | | | | |
|---|---|---|---|---|---|
| 5 | 4 | 3 | 2 | 1 | Meaning |

All other values reserved.

User Information Layer 7 Protocol (Octet 9*e*)

| Bits | | | | | |
|---|---|---|---|---|---|
| 5 | 4 | 3 | 2 | 1 | Meaning |

All other values reserved.

QoS Identity (Octet 10)

| Bits | | |
|---|---|---|
| 7 | 6 | Meaning |
| 1 | 1 | octet group identifier |

All other values reserved.

The purpose of the <<FACILITY>> information element (see Subclause 7.7.15 in ETS 300 175-5 2nd edition) is to indicate the invocation and operation of supplementary services, identified by the corresponding operation value within the <<FACILITY>> information element (see FIG. 30).

Service Discriminator Coding

| Bits | | | | | |
|---|---|---|---|---|---|
| 5 | 4 | 3 | 2 | 1 | Meaning |
| 1 | 0 | 0 | 0 | 1 | Discriminator for supplementary service applications |
| 1 | 0 | 0 | 1 | 0 | Discriminator for Multimedia Messaging service applications |

All other values are reserved.

Other fields are coded as indicated below.

The purpose of the <<CALLED-PARTY-NUMBER>> element (see Subclause 7.7.7 in ETS 300 175-5 2nd edition) is to identify the called party of a call in an en-bloc format (see FIG. 31).

Number Type (Octet 3)

| Bits | | | |
|---|---|---|---|
| 7 | 6 | 5 | Meaning |
| 0 | 0 | 0 | Unknown |
| 0 | 0 | 1 | International number |
| 0 | 1 | 0 | National number |
| 0 | 1 | 1 | Network specific number |
| 1 | 0 | 0 | Subscriber number |
| 1 | 0 | 1 | Server number |
| 1 | 1 | 0 | Abbreviated number |
| 1 | 1 | 1 | Reserved for extension |

All other values reserved.

Numbering Plan Identification (Octet 3)

| Bits | | | | |
|---|---|---|---|---|
| 4 | 3 | 2 | 1 | Meaning |
| 0 | 0 | 0 | 0 | Unknown |
| 0 | 0 | 0 | 1 | ISDN/telephony plan Rec. E.164/E.163 |
| 0 | 0 | 1 | 1 | Data plan Rec. X.121 |
| 1 | 0 | 0 | 0 | National standard plan |
| 1 | 0 | 0 | 1 | Private plan |
| 1 | 0 | 1 | 0 | IP Address |
| 1 | 0 | 1 | 1 | IP Address Character format (URI) |
| 1 | 1 | 0 | 0 | X.400 address |
| 1 | 1 | 0 | 1 | URI |
| 1 | 1 | 1 | 0 | LAN address |
| 1 | 1 | 1 | 1 | Reserved for extension |

All other values reserved.
NOTE: DECT characters are specified below. They are based on IA5 characters.

MMS Protocol Element

| Bits | | | | | | | | |
|---|---|---|---|---|---|---|---|---|
| 8 | 7 | 6 | 5 | 4 | 3 | 2 | 1 | Octet: |
| 0 | < <MMS protocol element> > | | | | | | | 1 |
| Length of Contents (L) | | | | | | | | 2 |
| 1 | MMS Action type | | | | Rep. | | Esc | 3 |
| 0/1 | MMS sequence number | | | | | | | 4 |
| 1 | MMS sequence numbering (extension) | | | | | | | 4a |
| 0/1 | Service type | | | | | | | 5 |
| 0/1 | Service subtype | | | | Transmission type | | | 6 |
| 0/1 | Data content type | | | | | | | 7 |
| 0/1 | Action result | | | | | | | 8 |
| 0/1 | Command type | | | | | | | 9 |
| 0/1 | Information type | | | | | | | 10 |
| 0/1 | Command object | | | | | | | 11 |
| 0/1 | Command object (extension) | | | | | | | 11a |
| 0/1 | User data length | | | | | | | 12 |
| 0/1 | User data length (extension) | | | | | | | 12a |
| 0/1 | User data length (extension) | | | | | | | 12b |
| 1 | User data length (extension) | | | | | | | 12c |

MMS Action Type (Octet 3)

| Bits | | | | |
|---|---|---|---|---|
| 7 | 6 | 5 | 4 | Meaning |
| 0 | 0 | 0 | 1 | MMS-SEND |
| 0 | 0 | 1 | 0 | MMS-SEND-RPY |

-continued

| Bits | | | | |
|---|---|---|---|---|
| 7 | 6 | 5 | 4 | Meaning |
| 0 | 0 | 1 | 1 | MMS-RECEIVE |
| 0 | 1 | 0 | 0 | MMS-RECEIVE-RPY |
| 1 | 0 | 0 | 0 | MMS-CONTROL |
| 1 | 0 | 0 | 1 | MMS-CONTROL-RPY |
| 1 | 0 | 1 | 0 | MMS-STATUS |
| 1 | 0 | 1 | 1 | MMS-STATUS-RPY |

All other values reserved.

Replay Requested (Octet 3)

| Bits | | |
|---|---|---|
| 3 | 2 | Meaning |
| x | 0 | Reply not requested from MMS entity |
| x | 1 | Reply requested from MMS entity |
| 0 | x | Reply not requested from end entity |
| 1 | x | Reply requested from end entity |

All other values reserved.

Escape Command Present (Octet 3)

| Bits 1 | Meaning |
|---|---|
| 0 | Escape command not present |
| 1 | Escape command present |

All other values reserved

MMS Sequence Number (Octet 4)

Coded as natural binary value. Value 0 is reserved for general use.

Extended MMS Sequence Number (Octet 4*a*)

Coded as octet 4. This octet is optional. The complete MMS sequence number is a combination of both octets.

Service Type (Octet 5)

| Bits | | | | | | | |
|---|---|---|---|---|---|---|---|
| 7 | 6 | 5 | 4 | 3 | 2 | 1 | Meaning |
| 0 | 0 | 0 | 0 | 0 | 0 | 0 | Not specified |
| 0 | 0 | 0 | 0 | 0 | 0 | 1 | Any method |
| 0 | 0 | 0 | 0 | 0 | 1 | 0 | Address based IWU selection |
| 0 | 0 | 0 | 0 | 0 | 1 | 1 | A message handling facility |
| 0 | 0 | 0 | 0 | 1 | 0 | 0 | Physical |
| 0 | 0 | 0 | 1 | 0 | 0 | 0 | Voice telephone |
| 0 | 0 | 0 | 1 | 0 | 0 | 1 | Telex |
| 0 | 0 | 0 | 1 | 0 | 1 | 0 | Teletex |
| 0 | 0 | 0 | 1 | 0 | 1 | 1 | Facsimile group 3 |
| 0 | 0 | 0 | 1 | 1 | 0 | 0 | Facsimile group 4 |
| 0 | 0 | 0 | 1 | 1 | 0 | 1 | Videotex (T.100/T.101) |
| 0 | 0 | 1 | 0 | 0 | 0 | 0 | ERMES |
| 0 | 0 | 1 | 0 | 0 | 0 | 1 | National paging |
| 0 | 0 | 1 | 0 | 0 | 1 | 0 | UCI (ETS 300 133-3) |
| 0 | 0 | 1 | 0 | 0 | 1 | 1 | GSM SMS |
| 0 | 0 | 1 | 0 | 1 | 0 | 0 | DECT MMS |
| 0 | 0 | 1 | 0 | 1 | 0 | 1 | DECT LRMS |
| 0 | 0 | 1 | 0 | 1 | 1 | 0 | IA5 terminal |
| 0 | 0 | 1 | 0 | 1 | 1 | 1 | X.400 message handling |
| 0 | 1 | 0 | 0 | 0 | 0 | 0 | FTP |

-continued

| Bits | | | | | | | |
|---|---|---|---|---|---|---|---|
| 7 | 6 | 5 | 4 | 3 | 2 | 1 | Meaning |
| 0 | 1 | 0 | 0 | 0 | 0 | 1 | HTTP |
| 0 | 1 | 0 | 0 | 0 | 1 | 0 | Gopher |
| 0 | 1 | 0 | 0 | 0 | 1 | 1 | News |
| 0 | 1 | 0 | 0 | 1 | 0 | 0 | News/NNTP |
| 0 | 1 | 0 | 0 | 1 | 0 | 1 | Telnet |
| 0 | 1 | 0 | 0 | 1 | 1 | 0 | Wide area info server |
| 0 | 1 | 0 | 0 | 1 | 1 | 1 | Host specific file names |
| 0 | 1 | 0 | 1 | 0 | 0 | 0 | Prospero |

All other values reserved.

Service Subtype (Octet 6)

| Bits | | | | |
|---|---|---|---|---|
| 7 | 6 | 5 | 4 | Meaning |
| 0 | 0 | 0 | 0 | Undefined |
| 0 | 0 | 0 | 1 | Standard |

Telex

| | | | | |
|---|---|---|---|---|
| 0 | 0 | 0 | 1 | Standard |
| 1 | 1 | 0 | 0 | Via teletex conversion |

Teletex

| | | | | |
|---|---|---|---|---|
| 0 | 0 | 0 | 1 | Standard |
| 0 | 0 | 1 | 0 | Oper. doc. |
| 0 | 0 | 1 | 1 | Monit doc |
| 0 | 1 | 0 | 0 | Ctrl doc. |
| 0 | 1 | 0 | 1 | TFT of Doc. tr. Mode |
| 0 | 1 | 1 | 0 | TFT of Binary File Tr. |
| 0 | 1 | 1 | 1 | TFT of Edifact |
| 1 | 0 | 0 | 0 | in PSPDN |
| 1 | 0 | 0 | 1 | in CSPDN |
| 1 | 0 | 1 | 0 | in analog PSTN |
| 1 | 0 | 1 | 1 | in digital ISDN |

Facsimile Group 3

| | | | | |
|---|---|---|---|---|
| 0 | 0 | 0 | 1 | Standard |
| 1 | 1 | 0 | 1 | TFT of Basic tr. Mode |
| 0 | 1 | 0 | 1 | TFT of Doc. tr. Mode |
| 0 | 1 | 1 | 0 | TFT of Binary File Tr. |
| 0 | 1 | 1 | 1 | TFT of Edifact |

Facsimile Group 4

| | | | | |
|---|---|---|---|---|
| 0 | 0 | 0 | 1 | Standard |
| 0 | 0 | 1 | 0 | Oper. doc. |
| 0 | 0 | 1 | 1 | Monit doc |
| 0 | 1 | 0 | 0 | Ctrl doc. |
| 0 | 1 | 0 | 1 | TFT of Doc. tr. Mode |
| 0 | 1 | 1 | 0 | TFT of Binary File Tr. |
| 0 | 1 | 1 | 1 | TFT of Edifact |

All other values reserved.

These values are related to the Service type field i.e. not all listed values are possible with all service type options. The service options related to the value of the Service type is defined. (TFT; Telematic File Transfer).

Message Transmission Type (Octet 6)

| Bits | | | |
|---|---|---|---|
| 3 | 2 | 1 | Meaning |
| 0 | 0 | 1 | Unspecified |
| 0 | 1 | 0 | Encapsulated |
| 0 | 1 | 1 | Multipart |
| 1 | 0 | 0 | Body in U-plane |
| 1 | 0 | 1 | Header in C-plane |
| 1 | 1 | 0 | Normal |

All other values reserved.

Message Content Type (Octet 7)

| Bits | | | | | | | |
|---|---|---|---|---|---|---|---|
| 7 | 6 | 5 | 4 | 3 | 2 | 1 | Meaning |
| 0 | 0 | 0 | 0 | 0 | 0 | 0 | Undefined |
| 0 | 0 | 0 | 0 | 0 | 0 | 1 | Specified by the service type |
| 0 | 0 | 0 | 0 | 0 | 1 | 0 | Local type |
| 0 | 0 | 0 | 0 | 0 | 1 | 1 | Simple formattable document |
| 0 | 0 | 0 | 0 | 1 | 0 | 0 | Basic text |
| 0 | 0 | 0 | 0 | 1 | 0 | 1 | IA 5 text (T.50) |
| 0 | 0 | 0 | 0 | 1 | 1 | 0 | Telex |
| 0 | 0 | 0 | 0 | 1 | 1 | 1 | Teletex (T.61) |
| 0 | 0 | 0 | 1 | 0 | 0 | 0 | Videotex (T.100/T.101) |
| 0 | 0 | 0 | 1 | 0 | 0 | 1 | Image |
| 0 | 0 | 0 | 1 | 0 | 1 | 0 | TIFF image |
| 0 | 0 | 0 | 1 | 0 | 1 | 1 | GIF image |
| 0 | 0 | 0 | 1 | 1 | 0 | 0 | JPEG image |
| 0 | 0 | 0 | 1 | 1 | 0 | 1 | Fax G 4 class 1 |
| 0 | 0 | 0 | 1 | 1 | 1 | 0 | Fax G 3 (T.4/T.30) |
| 0 | 0 | 1 | 0 | 0 | 0 | 0 | Audio |
| 0 | 0 | 1 | 0 | 0 | 0 | 1 | AVI audio |
| 0 | 0 | 1 | 0 | 0 | 1 | 0 | Multipart: mixed |
| 0 | 0 | 1 | 0 | 0 | 1 | 1 | Multipart: parallel |
| 0 | 0 | 1 | 0 | 1 | 0 | 0 | Multipart: alternative |
| 0 | 0 | 1 | 0 | 1 | 0 | 1 | Multipart: digest |
| 0 | 0 | 1 | 0 | 1 | 1 | 0 | Encapsulated: RFC 822 or MIME |
| 0 | 0 | 1 | 0 | 1 | 1 | 1 | Encapsulated: GSM SMS |
| 0 | 0 | 1 | 1 | 0 | 0 | 0 | Encapsulated: X.400 |
| 0 | 0 | 1 | 1 | 0 | 0 | 1 | Octet stream application |
| 0 | 0 | 1 | 1 | 0 | 1 | 0 | Postscript application |
| 0 | 0 | 1 | 1 | 0 | 1 | 1 | Video |
| 0 | 0 | 1 | 1 | 1 | 0 | 0 | MPEG video |
| 0 | 0 | 1 | 1 | 1 | 0 | 1 | AVI video |

All other values reserved.

This field specifies the content of the message i.e. the format of the message content.

Action Result (Octet 8)

| Bits | | | | | | | |
|---|---|---|---|---|---|---|---|
| 7 | 6 | 5 | 4 | 3 | 2 | 1 | Meaning |
| Successful transactions: | | | | | | | |
| 0 | 0 | 0 | 0 | 0 | 0 | 0 | Message received by server |
| 0 | 0 | 0 | 0 | 0 | 0 | 1 | Message sent to end entity |
| 0 | 0 | 0 | 0 | 0 | 1 | 0 | Message replaced by the server |
| 0 | 0 | 0 | 0 | 0 | 1 | 1 | Message received by end entity |

-continued

| Bits | | | | | | | |
|---|---|---|---|---|---|---|---|
| 7 | 6 | 5 | 4 | 3 | 2 | 1 | Meaning |
| | | | | | | | Temporary Error: |
| 0 | 1 | 0 | 0 | 0 | 0 | 0 | Congestion |
| 0 | 1 | 0 | 0 | 0 | 0 | 1 | End entity busy |
| 0 | 1 | 0 | 0 | 0 | 1 | 0 | No response from end entity |
| 0 | 1 | 0 | 0 | 1 | 0 | 0 | Quality of service not available |
| 0 | 1 | 0 | 0 | 1 | 0 | 1 | Error in end entity |
| 0 | 1 | 0 | 0 | 1 | 1 | 0 | No memory available |
| | | | | | | | Permanent Error: |
| 1 | 0 | 0 | 0 | 0 | 0 | 1 | Invalid address |
| 1 | 0 | 0 | 0 | 0 | 1 | 1 | Invalid network(End User not accessible) |
| 1 | 0 | 0 | 0 | 0 | 1 | 0 | End entity not available |
| 1 | 0 | 0 | 0 | 1 | 0 | 1 | Secondary interworking failed |
| 1 | 0 | 0 | 0 | 1 | 1 | 0 | Primary interworking failed |
| 1 | 0 | 0 | 0 | 1 | 1 | 1 | Incompatible file type |
| 1 | 0 | 0 | 1 | 0 | 0 | 0 | Service rejected |
| | | | | | | | General values: |
| 1 | 0 | 0 | 0 | 0 | 0 | 0 | Command successful |
| 1 | 0 | 0 | 0 | 0 | 0 | 1 | Command unsuccessful |
| 1 | 0 | 0 | 0 | 0 | 1 | 0 | Successful |
| 1 | 0 | 0 | 0 | 0 | 1 | 1 | Unsuccessful |

All other values reserved.

Command Type (Octet 9)

| Bits | | | | | | | |
|---|---|---|---|---|---|---|---|
| 7 | 6 | 5 | 4 | 3 | 2 | 1 | Meaning |
| | | | | | | | Message related: |
| 0 | 0 | 0 | 0 | 0 | 0 | 0 | Status Enquiry |
| 0 | 0 | 0 | 0 | 0 | 0 | 1 | Cancel status enquiry |
| 0 | 0 | 0 | 0 | 0 | 1 | 0 | Delete |
| 0 | 0 | 0 | 0 | 1 | 0 | 0 | Replace |
| 0 | 0 | 0 | 0 | 1 | 0 | 1 | Memory available |
| 0 | 0 | 0 | 0 | 1 | 1 | 0 | Cancel |
| | | | | | | | Connection related: |
| 0 | 0 | 1 | 0 | 0 | 0 | 0 | Login |
| 0 | 0 | 1 | 0 | 0 | 0 | 1 | Logout |

All other values reserved.

Information Type (Octet 10)

| Bits | | | | | | | |
|---|---|---|---|---|---|---|---|
| 7 | 6 | 5 | 4 | 3 | 2 | 1 | Meaning |
| 0 | 0 | 0 | 0 | 0 | 0 | 0 | Status report |
| 0 | 0 | 0 | 0 | 0 | 0 | 1 | Message/file waiting in server |

All other values reserved.

Command Object (Octet 11 . . . 11*a*)

Coded as MMS Sequence Numbering

User Data Length (Octet 12, 12*a*, 12*b*, 12*c*)

Coded as natural binary value indicating the amount of octets in the user data field.

Time/Date Element

| Bits | | | | | | | | |
|---|---|---|---|---|---|---|---|---|
| 8 | 7 | 6 | 5 | 4 | 3 | 2 | 1 | Octet: |
| 0 | < < Time/Date > > | | | | | | | 1 |
| Length of Contents (L) | | | | | | | | 2 |
| Year | | | | | | | | 3 |
| Month | | | | | | | | 4 |
| Day | | | | | | | | 5 |
| Hour | | | | | | | | 6 |
| Minute | | | | | | | | 7 |
| Second | | | | | | | | 8 |
| Time zone | | | | | | | | 9 |

Time/date Coding

| | Year: | Month: | Day: | Hour: | Minute: | Second: | Time Zone |
|---|---|---|---|---|---|---|---|
| Digits: | 2 | 2 | 2 | 2 | 2 | 2 | 2 |

(Semi-octets)

The Time Zone indicates the difference, expressed in quarters of an hour, between the local time and GMT. In the first of the two semi-octets, the first bit (bit 3 of the seventh octet of the TP-Service-Centre-Time-Stamp field) represents the algebraic sign of this difference (0: positive, 1: negative). The Service-Centre-Time-Stamp, and any other times coded in this format, represents the time local to the sending entity. The Time Zone code enables the receiver to calculate the equivalent time in GMT from the other semi-octets in the Service-Centre-Time-Stamp, or indicate the time zone (GMT, GMT+1H etc.), or perform other similar calculations as required by the implementation.

The purpose of the <<ALPHANUMERIC>> element (see Subclause 7.7.3 in ETS 300 175-5 2nd edition) is to provide a transport mechanism for a family of alternative characters in both directions.

NOTE: This element shall not be used to carry dialing information.

This element shall not be used to carry dialling information (see FIG. 32).

Character Type Coding

| Value Bits | | | Meaning |
|---|---|---|---|
| 7 | 6 | 5 | (Character type) |
| 0 | 0 | 1 | Standard 8-bit characters |
| 0 | 1 | 0 | Standard 4-bit characters |
| 0 | 1 | 1 | Standard 7 bit characters |
| 1 | 0 | 0 | Binary |
| 1 | 0 | 1 | Compressed |
| 1 | 1 | 0 | Encrypted |
| 1 | 1 | 1 | Others |

All other values reserved.

Odd/even Coding

| Bits 4 | Meaning |
|---|---|
| 0 | Even number of characters |
| 1 | Odd number of characters |

NOTE:
The odd/even flag shall only be used when the character type is 4 bit. In all other cases it should be set to "even".

Standard 8-bit Character Set Coding

Character Set Coding

| Value Bits | | | Meaning |
|---|---|---|---|
| 3 | 2 | 1 | (Character set) |
| 0 | 0 | 0 | Reserved |
| 0 | 0 | 1 | DECT standard 8 bit |
| 0 | 1 | 0 | 8 bit ASCII |
| 0 | 1 | 1 | US-ASCII |
| 1 | 0 | 0 | ISO 8859 |
| 1 | 0 | 1 | 8 bit EBCDIC |

All 8-bit characters shall always be coded with one character per octet. Multiple characters shall be interpreted in the order of ascending octet numbers.

Standard 4-bit Character Set Coding

Character Set Coding

| Value Bits | | | Meaning |
|---|---|---|---|
| 3 | 2 | 1 | (Character set) |
| 0 | 0 | 0 | Reserved |
| 0 | 0 | 1 | WCPE standard 4-bit characters (Annex D) |
| 1 | 0 | 0 | ERMES 4-bit characters (ANSI/TIA Standard [27]) |

All other values reserved.

4-bit characters shall always be coded with two characters per octet. Multiple characters shall be interpreted in the order of ascending octet numbers, and within each octet the high placed character (bits position 5–8) first.

7 Bit Characters Set Coding

Character Set Coding

| Value Bits | | | Meaning |
|---|---|---|---|
| 3 | 2 | 1 | (Character set) |
| 0 | 0 | 0 | 7 bit ERMES |
| 0 | 0 | 1 | 7 bit standard ASCII |
| 0 | 1 | 0 | 7 bit ASCII (IA5/T.50) |

All other values reserved.

Others Characters Set Coding

Character Set Coding

| Value Bits | | | Meaning |
|---|---|---|---|
| 3 | 2 | 1 | (Character set) |
| 0 | 0 | 0 | ASN.1. BER.1 |
| 0 | 0 | 1 | User specific |
| 0 | 1 | 0 | National variations of IRA |

All other values reserved.

Compressed Characters Set Coding

Character Set Coding

| Value Bits | | | Meaning |
|---|---|---|---|
| 3 | 2 | 1 | (Character set) |
| 0 | 0 | 0 | ZIP |
| 0 | 0 | 1 | V.42 bis |

All other values reserved.

Encrypted Characters Set Coding

Character Set Coding

| Value | | | Meaning |
|---|---|---|---|
| Bits | | | |
| 3 | 2 | 1 | (Character set) |

All other values reserved.

The language coding defined in octet 5 is optional. The coding is done as specified in GSM 03.38.

The purpose of the <<SERVICE-CHANGE-INFO>> element (see Subclause 7.7.38 in ETS 300 175-5 2nd edition) is to indicate the attributes of the proposed service change (see FIG. 33).

Coding Standard

| Bits | | Meaning |
|---|---|---|
| 7 | 6 | |
| 0 | 0 | DECT standard coding |

All other values reserved.

M (Master) Coding

| Bits 5 | Meaning |
|---|---|
| 0 | Initiating side is master |
| 1 | Receiving side is master |

Change Mode Coding

| Bits | | | | |
|---|---|---|---|---|
| 4 | 3 | 2 | 1 | Meaning |
| 0 | 0 | 0 | 0 | None |
| 0 | 0 | 0 | 1 | Connection Reversal |
| 0 | 0 | 1 | 0 | Bandwidth change (NOTE 1) |
| 0 | 1 | 0 | 0 | Rerouting (of U-plane links) (NOTE 1) |
| 0 | 1 | 1 | 0 | Rerouting plus bandwidth change (NOTE 1) |
| 1 | 0 | 0 | 0 | Suspend |
| 1 | 0 | 0 | 1 | Resume |
| 1 | 1 | 1 | 1 | Reserved for extension (NOTE 2) |

All other values reserved.

NOTE 1: Additional information elements shall be included in the message when indicating "bandwidth change" or "rerouting". Refer to subclause 9.6. NOTE 2: When using the reserved value, octet 3*a* shall follow containing extended coding of the service change. NOTE 3:Octet 4 shall only appear for "suspend" and "resume" codings. Octet 4 shall only appear for "suspend" and "resume" codings.

Extended Change Mode

Extended change mode is reserved for further standardisation.

A Attributes Coding

| Bits | | | |
|---|---|---|---|
| 7 | 6 | 5 | Meaning |
| 0 | 0 | 0 | Not applicable |
| 0 | 1 | 0 | Maintain old connection(s) |
| 0 | 1 | 1 | Release old connection(s) |

Reset (R) Coding

| Bits 4 | Meaning |
|---|---|
| 0 | Do not reset state variables |
| 1 | Reset state variables |

B Attributes Coding

| Bits | | | |
|---|---|---|---|
| 3 | 2 | 1 | Meaning |
| 0 | 0 | 0 | Not applicable |
| 0 | 1 | 0 | Interrupt data transfer |
| 0 | 1 | 1 | Maintain data transfer |

Figure 34:
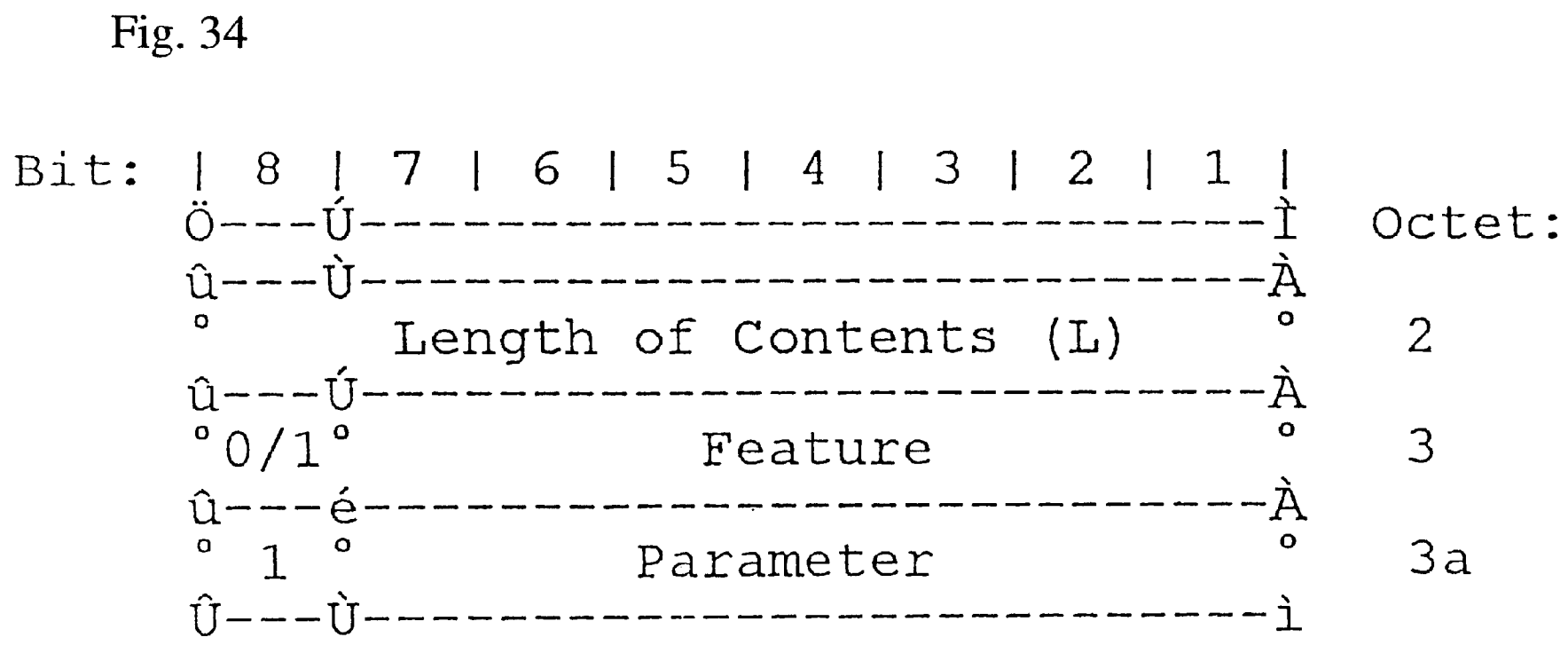

The purpose of the <<FEATURE-ACTIVATE>> information element (see Subclause 7.7.16 in ETS 300 175-5 2nd edition) is to activate a feature as identified in the feature field (see FIG. 34).

Feature Coding (Octet 3)

| Bits | | | | | | | | |
|---|---|---|---|---|---|---|---|---|
| 7 | 6 | 5 | 4 | 3 | 2 | 1 | Meaning | Parameter |
| 0 | 0 | 0 | 0 | 0 | 0 | 1 | register recall | no |
| 0 | 0 | 0 | 1 | 1 | 1 | 1 | external handover switch | no |
| 0 | 1 | 0 | 0 | 0 | 0 | 0 | queue entry request | no |
| 0 | 1 | 1 | 0 | 0 | 0 | 0 | indication of subscriber number | no |
| 1 | 0 | 0 | 0 | 0 | 1 | 0 | feature key | yes |
| 1 | 0 | 0 | 0 | 1 | 0 | 0 | specific line selection | yes |
| 1 | 0 | 0 | 0 | 1 | 1 | 1 | specific trunk carrier selection | yes |
| 1 | 0 | 0 | 1 | 0 | 0 | 0 | control of echo control functions | yes |
| 1 | 1 | 0 | 0 | 0 | 0 | 0 | cost information | yes |
| 1 | 1 | 1 | 0 | 0 | 0 | 0 | MMS messaging | no |

All other values reserved.

The purpose of the <<FEATURE-INDICATE>> information element (see Subclause 7.7.17 in ETS 300 175-5 2nd edition) is to allow the FT to convey feature indications to the user regarding the status of an activated feature (see FIG. 35).

Feature Coding (Octet 3)

| Bits | | | | | | | | |
|---|---|---|---|---|---|---|---|---|
| 7 | 6 | 5 | 4 | 3 | 2 | 1 | Meaning | Parameter |
| 0 | 0 | 0 | 0 | 0 | 0 | 1 | register recall | no |
| 0 | 0 | 0 | 1 | 1 | 1 | 1 | external handover switch | no |
| 0 | 1 | 0 | 0 | 0 | 0 | 0 | queue entry request | no |
| 0 | 1 | 1 | 0 | 0 | 0 | 0 | indication of subscriber number | no |
| 1 | 0 | 0 | 0 | 0 | 1 | 0 | feature key | yes |
| 1 | 0 | 0 | 0 | 1 | 0 | 0 | specific line selection | yes |
| 1 | 0 | 0 | 0 | 1 | 1 | 1 | specific trunk carrier selection | yes |
| 1 | 0 | 0 | 1 | 0 | 0 | 0 | control of echo control functions | yes |
| 1 | 1 | 0 | 0 | 0 | 0 | 0 | cost information | yes |
| 1 | 1 | 1 | 0 | 0 | 0 | 0 | MMS messaging | no |

All other values reserved.

The purpose of the <<IWU-TO-IWU>> element (see Subclause 7.7.23 in ETS 300 175-5 2nd edition) is to encapsulate any message or information element that cannot be interworked into one or more other DECT information element(s).

If the message or element is too large to fit into a single <<IWU-TO-IWU>> element, it shall be segmented into a series of <<IWU-TO-IWU>> elements that are associated using the <<SEGMENTED-INFO>> element (see FIG. 36).

Send/Reject (SIR) Bit

| Bits 7 | Meaning |
|---|---|
| 0 | Rejection of message |
| 1 | Transmission of message |

NOTE 1:
This Send/Reject (S/R) bit is used to distinguish between the sending of a new message (e.g. sent in the direction A = > B) and the rejection of a received message (e.g. message received by B can be rejected by sending "reject" code in direction B = > A).

Protocol Discriminator (PD)

| Bits | | | | | | |
|---|---|---|---|---|---|---|
| 6 | 5 | 4 | 3 | 2 | 1 | Meaning |
| 0 | 0 | 0 | 0 | 0 | 0 | User Specific (NOTE 2) |
| 0 | 0 | 0 | 0 | 0 | 1 | OSI high layer protocols |
| 0 | 0 | 0 | 0 | 1 | 0 | CCITT Recommendation X.244 [37] (NOTE 3) |
| 0 | 0 | 0 | 1 | 0 | 0 | IA5 characters [25] |
| 0 | 0 | 0 | 1 | 1 | 1 | CCITT Recommendation V.120 Rate adaption |
| 0 | 0 | 1 | 0 | 0 | 0 | CCITT Recommendation Q.931 (I.451), message [30] |
| 0 | 0 | 1 | 0 | 0 | 1 | CCITT Recommendation Q.931 (I.451), element(s) [30] (NOTE 4) |
| 0 | 0 | 1 | 0 | 1 | 0 | CCITT Recommendation Q.931 (I.451), partial message. (NOTE 5) |
| 0 | 1 | 0 | 0 | 0 | 0 | GSM Recommendation 04.08, message [22] |
| 0 | 1 | 0 | 0 | 0 | 1 | GSM Recommendation 04.08, element(s) [22] (NOTE 4) |
| 0 | 1 | 0 | 0 | 1 | 0 | GSM Recommendation 03.40, SM-TP messages [xx] |
| 0 | 1 | 0 | 0 | 1 | 1 | CCITT Recommendation X.400 messages [yy] |
| 0 | 1 | 0 | 1 | 0 | 0 | Internet RFC 822 or MIME messages [zz] |
| 1 | 1 | 1 | 1 | 1 | 1 | Unknown |

All other values reserved.

NOTE 2:The IWU information is structured as shown below. NOTE 3:The IWU information is structured according to CCITT RecommendationX.244[37] (CCITT RecommendationX.25[67] call user data). NOTE 4:If more than one element is included, they are interpreted in the order of appearance.NOTE 5: The Q.931(I.451) partial message excludes the protocol discriminator and the call Rest of the subclause 7.7.23 remains the same.

The CC-INFOrmation (see Subclause 6.3.2.2 of ETS 300 175-5 2nd edition) message is used to transfer additional information between FT and PT both during and after call establishment (see FIG. 37). NOTE 1:The message may contain either the <<CALLED-PARTY-NUMBER>> element or the <<"KEYPAD">> element, but not both. NOTE 2: Included if the PT optionally indicates completion of "OVERLAP SENDING" to the FT (or if the FT optionally indicates completion of "OVERLAP RECEIVING" to the PT). NOTE 3: Address elements are only included in messages sent in the "OVERLAP SENDING" state. NOTE 4:Included if requested as part of external handover. NOTE 5:The <<REPEAT-INDICATOR>> information element may optionally be included in front of the <<FACILITY>>, <<IWU-to-IWU>> and <<PROGRESS INDICATOR>> information elements indicating "non-prioritised list". NOTE 6:The <<IWU-ATTRIBUTES>> element is used only in connection paramter negotiation and the element can only be if <<MMS protocol>> element or <<Facility>> element are not present.

The following illustrates the interworking of the MMS to alternate services. Only general interworking is described.

The interworking can take place in two different ways: a complete interworking when the upper protocol layers of the service are conveyed transparently and the user may receive the original service or all layers are mapped to the MMS and the user receives the original service via MMS service. MMS provides capability for both of these. Mapping proposed below give a rough proposal for mappings with no details.

The GSM SMS interworking takes place on the GSM protocol leves of SM-TP and SM-RP. The E-data profile is used. When an MMS call is established the GSM Short message service center number is received in {CC-SETUP} message and it is used in the SM-RP layer messages in the RP-Destination Address field. In the case of Mobile terminated messaging the RP-Originating Address information is mapped into {CC-SETUP} message <<Calling pary number>> element. The contents of the SM-TP layer frame is mapped into MMS messages. A special case of the RP-SMMA message is conveyed in the MMS-COMMAND messages.

Figure 38:
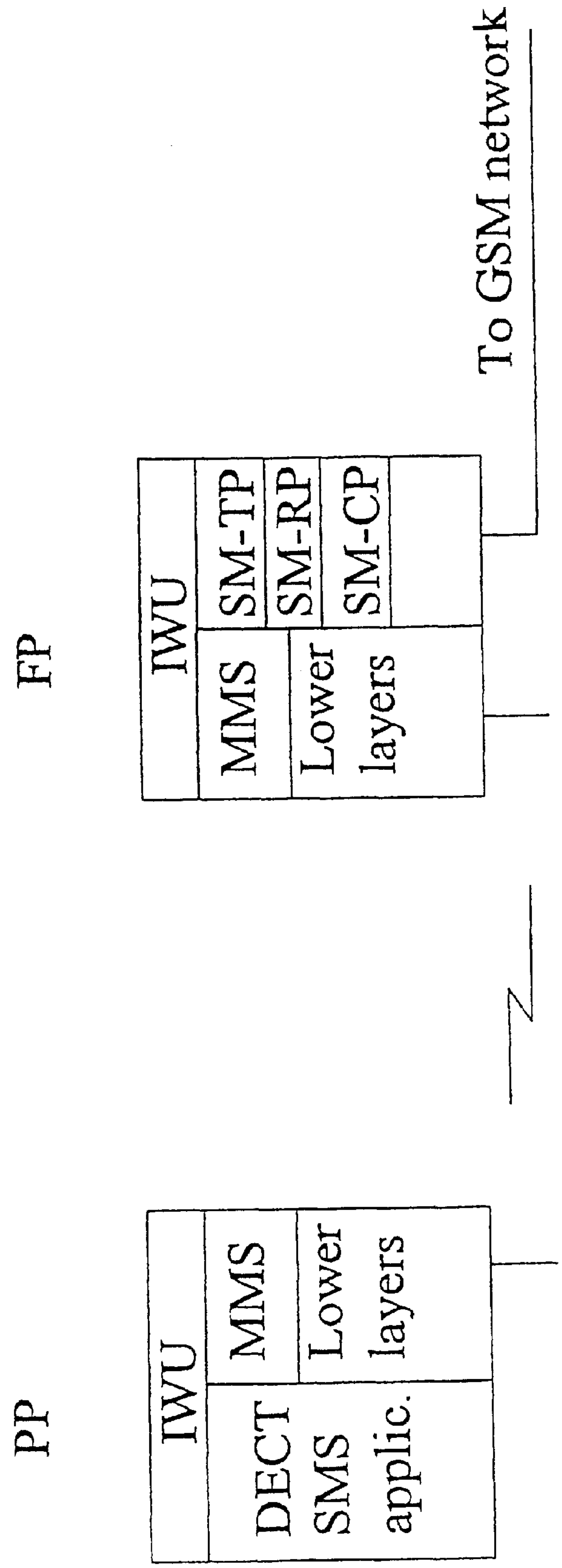
FIG. 38 shows MMS and GSM SMS interworking.

The RP layer ("Successful" in MMS) and TP layer ("End entity received message" in MMS) acknowledgements are done with MMS messaging replies. Thus the interworking in the GSM case is between MMS and SM-TP and SM-RP (see FIG. 38).

Figure 39:
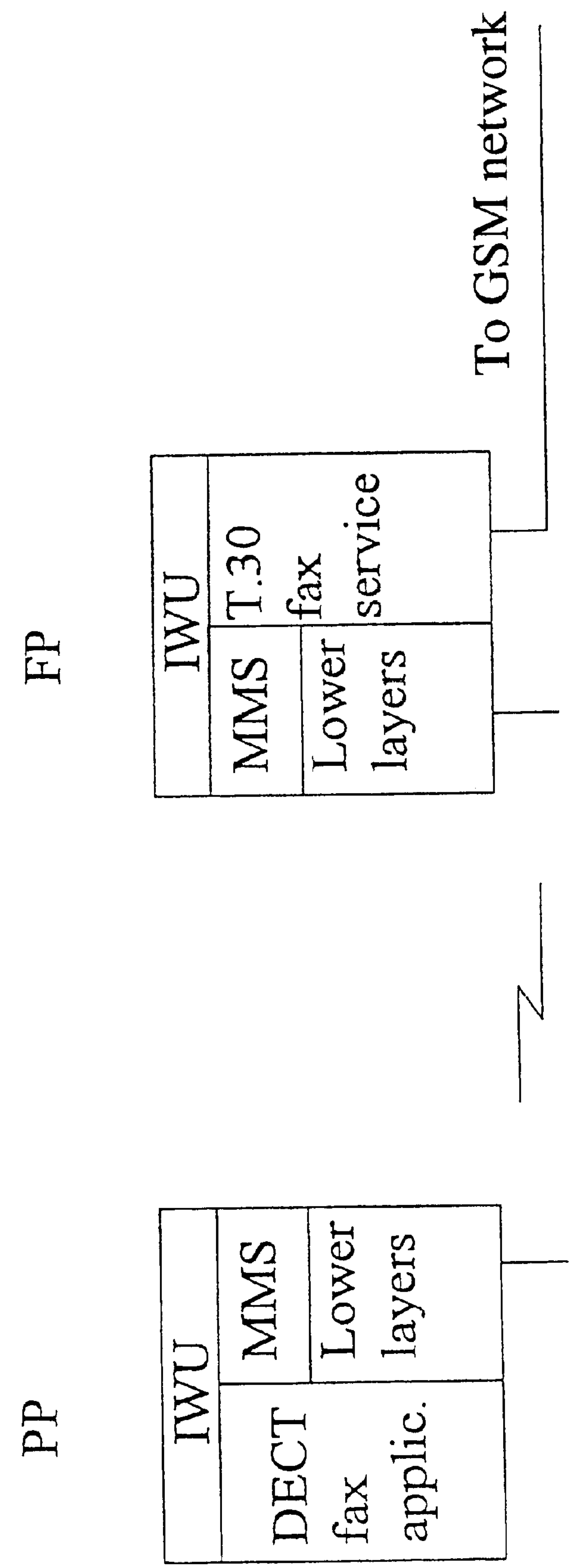
FIG. 39 shows MMS and GSM Facsimile 3 interworking.

The interworking of DECT MMS and GSM facsimile group 3 takes place with the T.30 fax service. The fax received from PP/outside network is first received by the FP, the formed for the other transmission format (T.30 or MMS) and transmited further. The terminal (PP) can disconnect the air interface connection after the FP has received the fax and the FP may inform the PP by sending a short message through E profile about the successful delivery of the fax. Also the FP may inform the PP about incoming fax by short messaging. The terminal can the upgrade the E profile connection into a full F-profile fax connection to receive the fax transmission (see FIG. 39).

Figure 40:
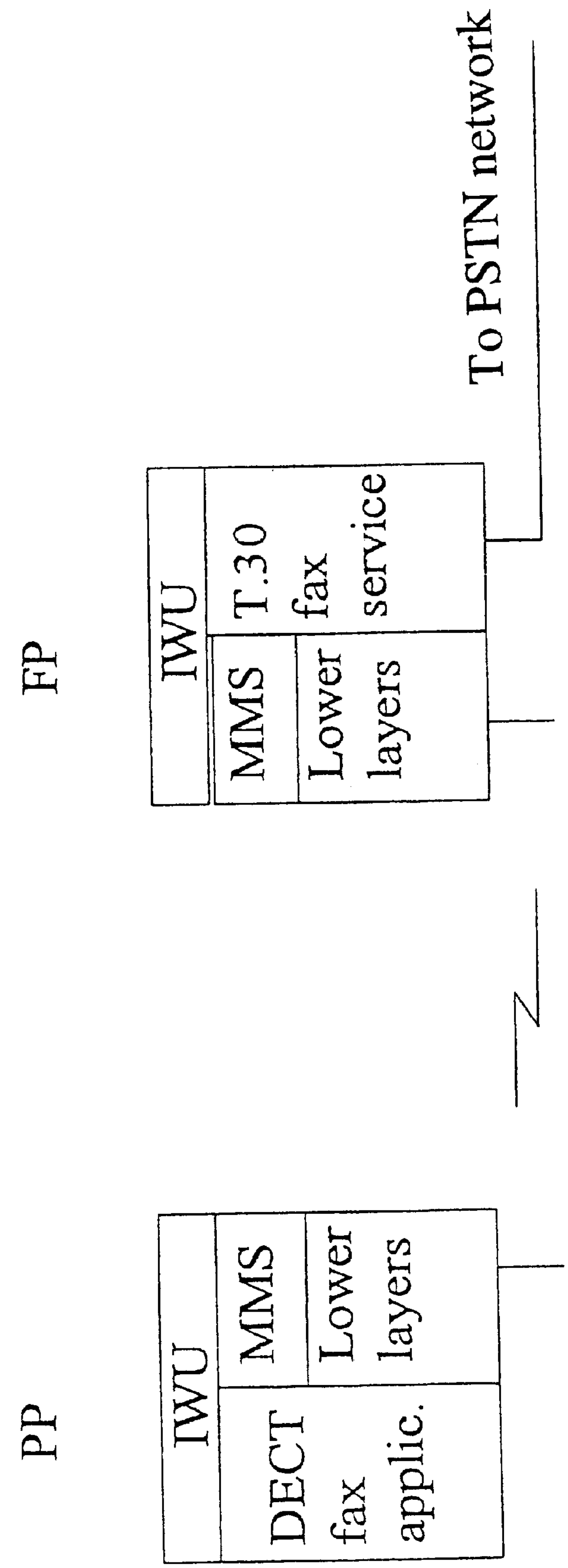
FIG. 40 shows MMS and PSTN Facsimile 3 interworking.

The interworking of DECT MMS and PSTN facsimile group 3 takes place with the T.30 fax service. The services procedures are as in GSM case but the implementation from technical perspective is just like a Local area network fax server case. The FP may contain a computer with a fax server card which takes care of the fax transmission and reception to/from outside world (see FIG. 40).

Figure 41:
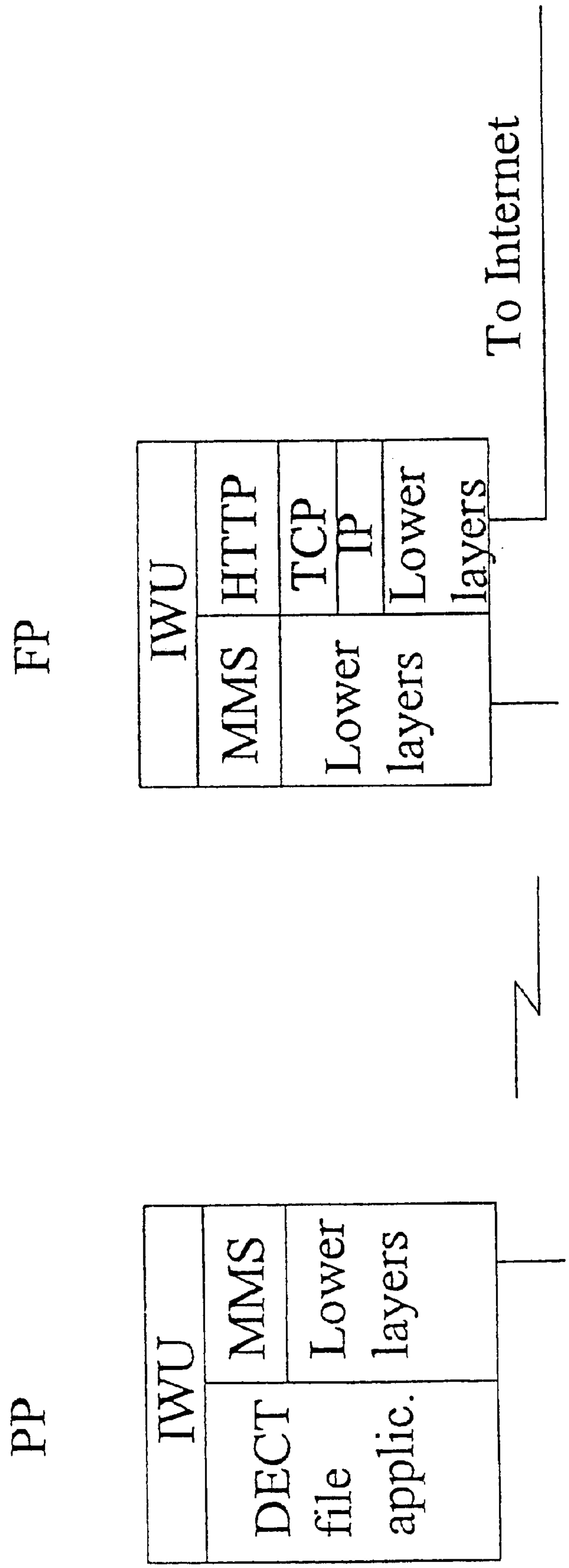
FIG. 41 shows MMS and Internet HTTP interworking.

The interworking of DECT MMS and internet HTTP (WWW) interworking takes place only between HTTP protocol and MMS. During the call establsihment the proxy server address is defiend (if needed) in the {CC-SETUP} message. If login procedures to the server are needed the MMS control procedures are used. The actual MMS commands are mapped into the HTTP commands. The files are trasferred through the U-plane connection (F-profile) and the commands through C plane (see FIG. 41).

Figure 42:
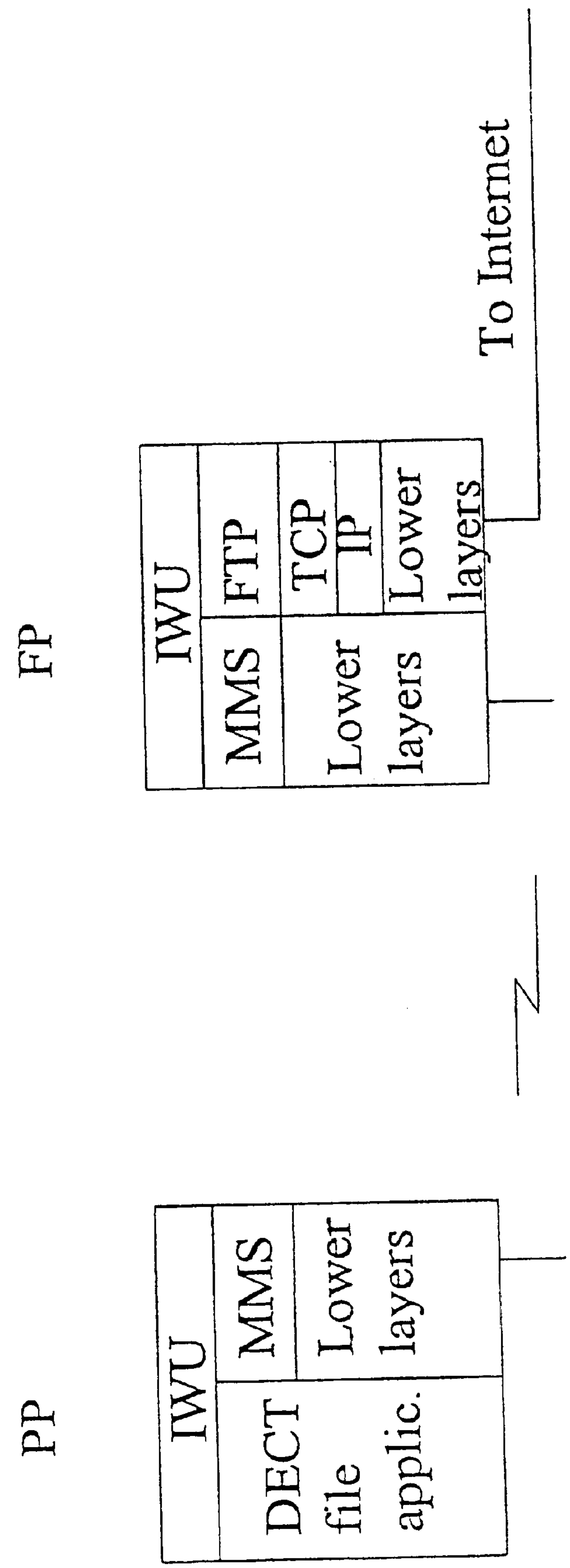
FIG. 42 shows MMS and Internet FTP interworking.

The interworking of DECT MMS and internet FTP takes place only between FTP protocol and MMS. During the call establishment the FTP server address (Internet address) is defined (if needed) in the {CC-SETUP} message. If login procedures to the server are needed the MMS control procedures are used. The actual MMS commands are mapped into the HTTP commands. The files are trasferred through the U-plane connection (F-profile) and the commands through C plane (see FIG. 42).

Figure 43:
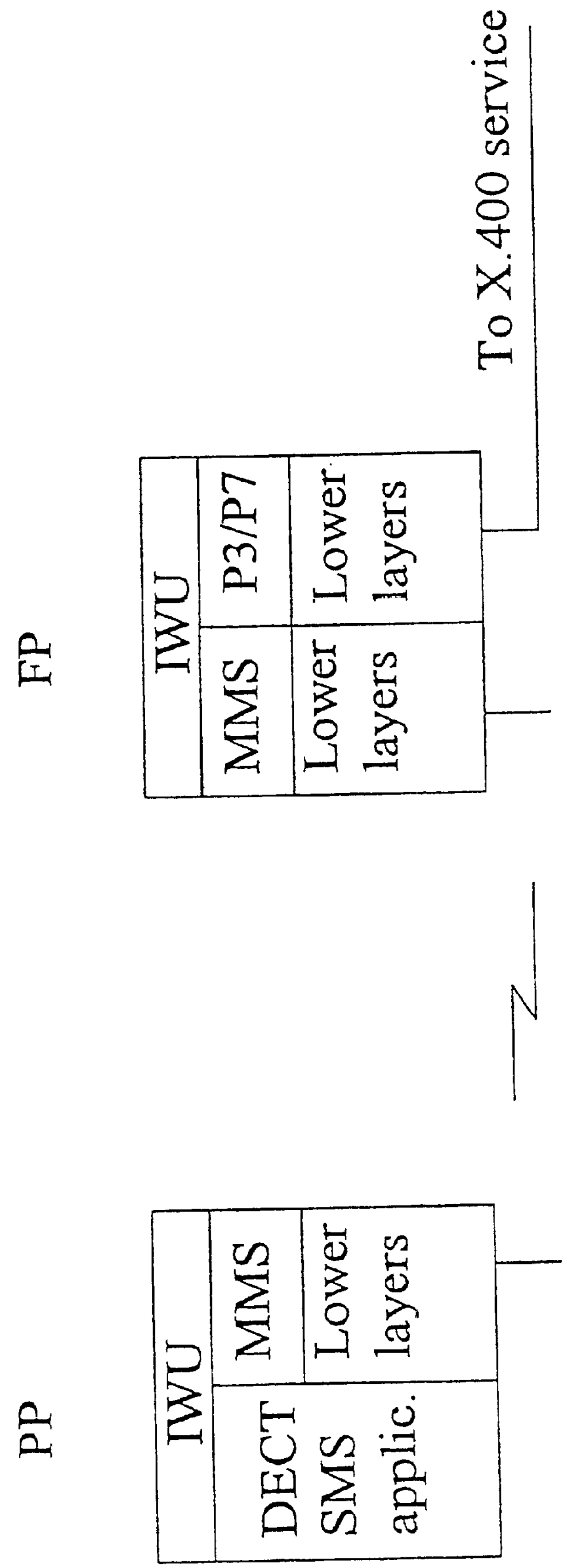
FIG. 43 shows MMS and X.400 interworking.

The interworking of DECT MMS and X.400 takes place between X.400 P3/P.7 protocols and MMS. In this case the User Agent (UA) can be in the PP. Thus the MMS replaces the P3/P7 protocol in the air interaface. The body part of the mail is trasferred through the U-plane connection (F-profile) and the protocol control information through the C-plane (see FIG. 43).

The following table classifies the different actions of the alternate message/file transfer services for interworking of messages and proposes a common MMS action that could be interworked to the all services.

| MMS action | CCITT T.611 | GSM SMS | HTTP | FTP | X.400 (P3) | Comment |
|---|---|---|---|---|---|---|
| MMS-SEND | SEND | RP-DATA (SMS-DELIVER or SMS-SUBMIT) | PUT POST | STOR NOOP and the file | Message-submission Probe-submission Message-delivery | Sending message/ file |
| MMS-SEND-RPY | SEND response | RP-ERROR (SMS-DELIVER-REPORT or SMS-SUBMIT-REPORT) or RP-ACK | HTTP response | FTP reply | Message-submission Result | The acknowledge-ment of the transmission |
| MMS-RETRIEVE | RECEIVE | — | GET HEAD | RETR | X.400 P7 has this feature (FETCH) | Fetching a file or message |
| MMS-RETRIEVE-RPY | RECEIVE response | — | HTTP response | FTP reply and the received file | X.400 P7 has this feature (FETCH) | The response of fetch |
| MMS-COMMAND | TRACE delete, copy, cancel, purge, reschedule, dispatch | RP-DATA (SMS-COMMAND) RP-SMMA | DELETE LINK UNLINK | USER QUIT PORT TYPE MODE STRU | Cancel-deferred-delivery Submission-control Register Change-credentials Report-delivery | Control info to control the remote file/message or to receive/send status/control information |
| MMS-STATUS | | RP-DATA (SMS-STATUS-REPORT) | | | | |
| MMS-COMMAND-RPY or MMS-STATUS-RPY | TRACE response | RP-ERROR (SMS-SUBMIT-REPORT) or RP-ACK | HTTP response | FTP reply | | Acknowledge -ment of the action |

NOTE:
The GSM SMS service requirements are based on the both SM-RP and SM-TP layers since the actual funtionality of the GSM short messaging is a combination of these both, for instance, the acknowldegement of the SM-TP layer messages is done by the SM-RP layer. MMS-SEND action can replace both SMS-DELIVER and SMS-SUBMIT since it may convey information to both directions. The parenthesis in the column indicate that RP layer message is carrying the TP layer message.

The following table lists the fields of each service that should be mapped in the direction of PP to FP for MMS-SEND interworking to T.611 Fax, GSM SMS, FTP, CCITT X.400 and HTTP. (o) indicates an optional field.

| MMS | T.611 | GSM SMS | GSM SMS | HTTP | FTP | X.400 (P3) |
|---|---|---|---|---|---|---|
| MMS-SEND USER CONTROL PART | SEND | SMS-DELIVER | SMS-SUBMIT | PUT | STOR | Message-submission |
| Action type | Function | TP-Message-Type-Indicator | TP-Message-Type-Indicator | Method | Command | Operation |

-continued

| MMS | T.611 | GSM SMS | GSM SMS | HTTP | FTP | X.400 (P3) |
|---|---|---|---|---|---|---|
| Reply request | Sendack variation is used or not | TP-Status-Report-Indicator | TP-Status-Report-Request | Acknowledge should always be used | Acknowledge should always be used | Originator-report-request |
| MMS sequence number | REQ-ID | — | TP-Message-reference | Message ID | — | Message-token (o) |
| Service type | Service ID | TP-Protocol-Identifier | TP-Protocol-Identifier | URL scheme | — | Requested-delivery-method (o) |
| Service subtype | Type ID | TP-Protocol-Identifier | TP-Protocol-Identifier | — | — | — |
| Message transm.type | — | — | — | Content type | — | — |
| Data content type | Convert | TP-Protocol-Identifier | TP-Protocol-Identifier | Content-Type Content-subtype | Type coding Mode coding | Content-Type |
| Time Stamp | Send time | TP-Service-center-time-stamp | TP-Validity-Period | Date (o) | — | Deferred-delivery-time (o) |
| Recipient address | Address | — | TP-Destination-Address | URI | — | Recipient-name |
| Sender address | LA-ID ? | TP-Originating-Address | — | From | — | Originator-name |
| Segmented info | — | — | — | Content type = Multipart this is used | — | — |
| USER DATA PART | | | | | | |
| Character type coding | APPLI/COM header Code Id | TP-Data-Coding-Sceme | TP-Data-Coding-Sceme | Char set | Char set | Encoding info type |
| Character set coding | APPLI/COM header Code Id | TP-Data-Coding-Sceme | TP-Data-Coding-Sceme | Char set | Char set | Encoding info type |
| Language coding | — | — | — | — | — | — |
| User data length | File size | TP-User-Data-Length | TP-User-Data-Length | Content Length | — | — |
| User data | The file referred with Filename | TP-User-Data | TP-User-Data | Entity Body | The file referred with Pathname in stream mode | Content |

The following table lists the fields of each service that should be mapped in the direction of PP to FP for MMS-SEND-RPY interworking to T.611 Fax, GSM SMS, FTP, CCITT X.400 and HTTP. (o) indicates an optional field.

| MMS | T.611 | GSM SMS | GSM SMS | HTTP | FTP | X.400 (P3) |
|---|---|---|---|---|---|---|
| MMS-SEND-RPY | SEND response | RP-ERROR(SMS-DELIVER/SUBMIT-REPORT) | RP-ACK | HTTP response | FTP reply | Message-submission-result |

-continued

| MMS | T.611 | GSM SMS | GSM SMS | HTTP | FTP | X.400 (P3) |
|---|---|---|---|---|---|---|
| Action type | Function | RP-Message-Type-Indicator | RP-Message-Type-Indicator | Method | — | Messge-submission-identifier |
| MMS sequence number | REQ-ID | RP-Message-Reference | RP-Message-Reference | Message ID | — | — |
| Action result | Status Error | RP-Cause or TP-Failure-Cause | — | Status-Code | Status-Code | — |

The following table lists the fields of each service that should be mapped in the direction of PP to FP for MMS-RETRIEVE interworking to T.611 Fax, FTP, CCITT X.400 and HTTP. (o) indicates an optional field.

| Field in MMS-RETRIEVE | T.611 | HTTP | FTP | X.400 (P7) |
|---|---|---|---|---|
| USER CONTROL PART | RECEIVE | GET HEAD | RETR | Fetch |
| Action type | Function | Method | Command | Operation |
| Reply request | Always used | Always used | Always used | Always used |
| MMS sequence number | REQ-ID | — | — | — |
| Service type | Service | | | — |
| Intermediate server address | Address of the Fax service in the network | — | — | — |
| MMS sequence number | Filename | Filename | Filename | Item |
| Data content type | Convert | Content-Type | — | Content-Type |
| Command type | — | — | — | — |

The following table lists the fields of each service that should be mapped in the direction of PP to FP for MMS-RETRIEVE-RPY interworking to T.611 Fax, FTP, CCITT X.400 and HTTP. (o) indicates an optional field.

| Field in MMS-RETRIEVE-RPY | T.611 | HTTP | FTP | X.400 (P7) |
|---|---|---|---|---|
| USER CONTROL PART | RECEIVE response | HTTP response | FTP reply | Fetch result |
| Action type | Function | Method | — | Operation |
| MMS sequence number | REQ-ID | Message ID | — | Sequence-number |
| Service type | Service (o) | — | — | — |
| Network address (address type) | Address (o) | — | — | — |
| Message transmission type | — | Content type | — | — |
| Data content type | Type (o) Convert | Content type Content subtype | Type code Mode code | Content type |
| Action result | Error | Status-Code | Status-Code | Entry status |
| MMS sequence number | — | — | — | — |
| Time Stamp | Send time (o) | Date (o) | — | — |
| Segmented info | — | If Content type = Multipart this is used | | — |
| USER DATA PART | | | | |
| Character type coding | APPLI/COM header Code Id | Char set | — | — |
| Character set coding | APPLI/COM header Code Id | Char set | — | — |
| Language coding | — | — | — | — |
| User data length | Length of the file | Content Length | — | Content-length |
| User data | The file referred with Filename | Entity Body | The Filename data in stream mode | Content |

The following table lists the fields of each service that should be mapped in the direction of PP to FP for MMS-COMMAND interworking to T.611 Fax, GSM SMS, FTP, CCITT X.400 and HTTP. (o) indicates an optional field.

| Field in MMS-COMMAND | T.611 | GSM SMS | GSM SMS | HTTP | FTP | X.400 (P3/P7) |
|---|---|---|---|---|---|---|
| USER CONTROL PART | TRACE | SMS-COMMAND | RP-SMMA | DELETE<br>LINK<br>UNLINK | USER<br>QUIT<br>PORT<br>TYPE<br>MODE<br>STRU | Cancel-deferred-delivery<br>Submission-control<br>Register<br>Change-credentials<br>Report-delivery<br>Delete |
| Action type | Function | TP-Message-Type-Indicator | RP-Message-Type | Method | Command | Operation |
| Reply request | Sendack variation is used or not | Acknow-ledge should always be used | — | Acknow-ledge should always be used | Acknow-ledge should always be used | — |
| MMS sequence number | REQ-ID | TP-Message-Reference | RP-Message-Reference | Message ID | — | — |
| Service type | — | TP-protocol-ID | — | URL scheme | — | — |
| Time Stamp | Sendtime | — | — | Date (o) | — | Deferred-delivery-time (o) |
| Intermediate server address | — | — | | — | Host-port | — |
| User data content | — | TP-protocol-ID | — | Content type<br>Content subtype | Type code<br>Mode code | Content types |
| Command object (MMS seq) | REQREF | TP-Message-Number | — | Request URI | — | Message — submission-identifier |
| Command type | Function | TP-Command-Type | "Memory available coding" is used. | Method | Command | Operation |
| Escape commands/information present | — | TP-User-Data-Length | TP-User-Data-Length | — | — | — |
| Control data length | — | TP-Command-data-length | — | — | — | — |
| Control data | — | TP-Command-data | — | — | User name | User name<br>New and Old credentials |

The following table lists the fields of each service that should be mapped in the direction of PP to FP for MMS-COMMAND-RPY interworking to T.611 Fax, GSM SMS, FTP, CCITT X.400 and HTTP. (o) indicates an optional field.

| MMS | T.611 | GSM SMS | GSM SMS | HTTP | FTP | X.400 (P3) |
|---|---|---|---|---|---|---|
| MMS-COMMAND- | TRACE response | RP-ERROR (SMS- | RP-ACK | HTTP response | FTP reply | Operation results |

-continued

| MMS | T.611 | GSM SMS | GSM SMS | HTTP | FTP | X.400 (P3) |
|---|---|---|---|---|---|---|
| RPY | | SUBMIT-REPORT) | | | | |
| Action type | Function | RP or TP Message-Type-Indicator | RP-Message-Type-Indicator | — | — | Operation |
| MMS sequence number | REQ-ID | RP-Message-Reference | RP-Message-Reference | — | — | — |
| Time Stamp | Send time (o) | — | — | — | — | — |
| Command object | | — | — | — | — | — |
| Command type | | — | — | — | — | — |
| Action result | Error | RP-Cause or TP-Failure-Cause | Value of "Successful" of MMS is used | Status-Code | Status-Code | Values of MMS is used to indicate error or success |
| Control data length | | — | — | — | — | — |
| Control data | | — | — | — | — | — |

The following table lists the fields of each service that should be mapped in the direction of PP to FP for MMS-STATUS interworking to GSM SMS and X.400. (o) indicates an optional field.

| MMS | GSM SMS |
|---|---|
| MMS-STATUS | SMS-STATUS-REPORT |
| Action type | RP-Message-Type-Indicator |
| Reply request | Acknowledge should always be used |
| MMS sequence number | RP-Message-Reference |
| Time Stamp | TP-Service-center-time-stamp |
| Information type | — |
| Action result | TP-Status |
| Command object | — |
| Sender address | TP-Recipient address |
| — | TP-Discharge time |
| Service type | — |
| Service subtype | — |
| Data content type | — |
| Message length | — |

The following table lists the fields of each service that should be mapped in the direction of PP to FP for MMS-STATUS-RPY interworking to GSM SMS. (o) indicated an optional field.

| MMS | GSM SMS | GSM SMS |
|---|---|---|
| MMS-STATUS-RPY | RP-ACK | RP-ERROR(SMS-SUBMIT-REPORT) |
| Action type | RP-Message-Type-Indicator | RP or TP Message-Type-Indicator |
| MMS sequence number | RP-Message-Reference | RP-Message-Reference |
| Action result | Value of "Successful" of MMS is used | RP-Cause or TP -Failure-Cause |

Figure 44:
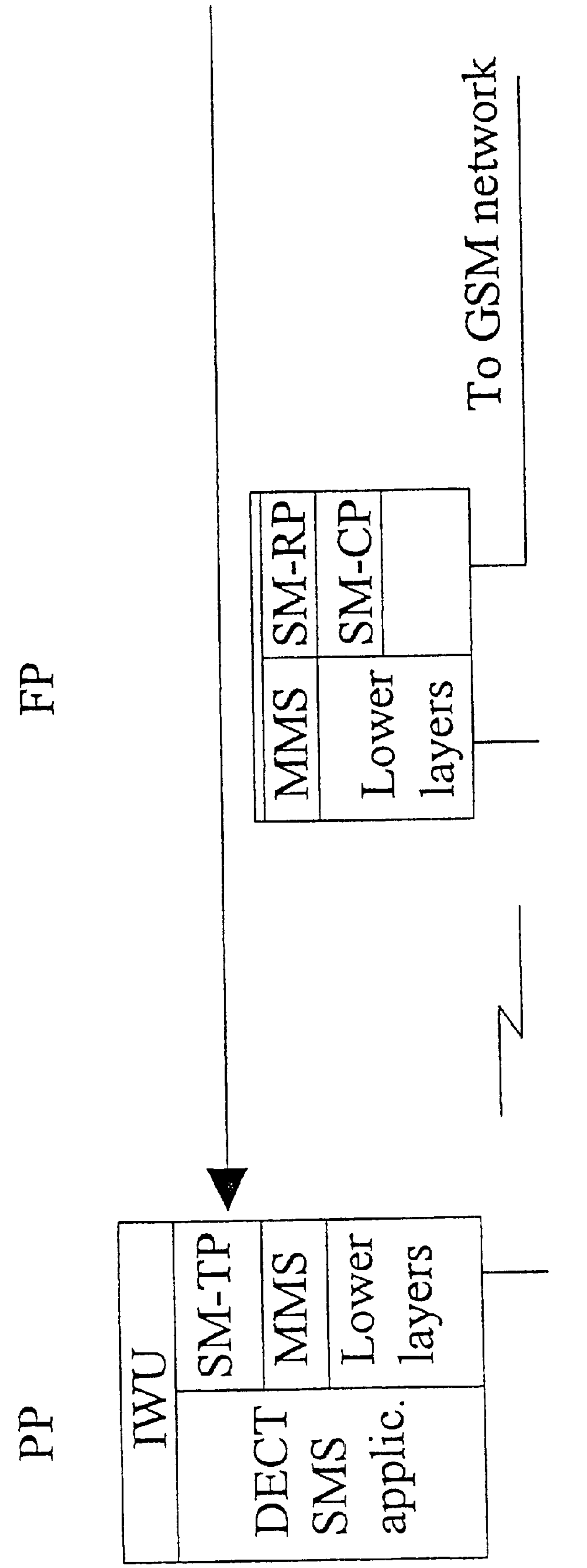
FIG. 44 shows DECT MMS and GSM SMS transparent interworking.

This chapter gives an example when the MMS transparent service is used for GSM SMS interworking i.e. the GSM SM-TP layer messages are conveyd accross the air interface with MMS protocol. In this case the MMS is only interworking with GSM SM-RP layer in the FP IWU as illustrated in FIG. 44.

Message Mappings Between MMS and SM-RP Layer

| Item No | MMS MSG | GSM SM-RP MSG | Ref. | Map Status | Note |
|---|---|---|---|---|---|
| 1 | MMS-SEND | RP-DATA | 9.3.2.1 | M | |
| 2 | MMS-SEND-RPY | RP-ERROR | 9.3.2.2 | M | |
| 3 | MMS-SEND-RPY | RP-ACK | 9.3.2.3 | M | |
| 4 | MMS-COMMAND | RP-SMMA | 9.3.2.4 | M | |
| 5 | MMS-COMMAND-RPY | RP-ERROR | 9.3.2.5 | M | |
| 6 | MMS-COMMAND-RPY | RP-ACK | 9.3.2.6 | M | |

MMS-SEND and RP-DATA

| Item No | GSM SM-RP MSG | MMS MSG | DECT NWK MSG | Coding |
|---|---|---|---|---|
| | RP-DATA | MMS-SEND | CC-INFO | |
| 1 | RP-Message type | Action type | Facility of MMS | |
| | — | — | <Action type> | "MMS-SEND" |
| 2 | RP-Message reference | MMS Sequence number | Facility or MMS | |
| | — | — | <MMS sequence nbr> | mapped from RP-MR |
| 3 | — | Message transmission type | Facility or MMS | |
| | — | — | <Transmission type> | "Encapsulated" |

-continued

| Item No | GSM SM-RP MSG | MMS MSG | DECT NWK MSG | Coding |
|---|---|---|---|---|
| 4 | — | Content type | Facility or MMS | |
| | — | — | <Content type> | “GSM SMS” |
| 5 | RP-Originator address | Sender address | Calling party number | |
| | | <Number type> | <Number type> | Mapped from RP-OA |
| | | <Number plan id> | <Number plan id> | Mapped from RP-OA |
| | | <CPN> | <CPN> | Mapped from RP-OA |
| 6 | RP-Destination address | Receipient address | Called party number | |
| | | <Number type> | <Number type> | Mapped from RP-OA |
| | | <Number plan id> | <Number plan id> | Mapped from RP-OA |
| | | <CPN> | <CPN> | Mapped from RP-OA |
| 7 | RP-User-data | User data | IWU-TO-IWU | |
| | — | — | <User protocol ID> | “GSM SM-TP message” |
| | — | — | <IWU-TO-IWU info> | SM-TP message |

MMS-SEND-RPY and RP-ERROR

| Item No | GSM SM-RP MSG RP-ERROR | MMS MSG MMS-SEND-RPY | DECT NWK MSG CC-INFO | Coding |
|---|---|---|---|---|
| 1 | RP-Message Type | Action type | Faclity of MMS | |
| | — | — | <Action type> | “MMS-SEND-RPY” |
| 2 | RP-Message reference | MMS Sequence number | Facility or MMS | |
| | — | — | <MMS sequence nbr> | mapped from RP-MR |
| 3 | RP-Cause | Action result | Faciliy or MMS | |
| | — | — | <Action result> | mapped from RP-MR |
| 7 | RP-User-data | Control data | IWU-TO-IWU | |
| | — | — | <User protocol ID> | “GSM SM-TP message” |
| | — | — | <IWU-TO-IWU info> | SM-TP message |

MMS-SEND-RPY and RP-ACK

| Item No | GSM SM-RP MSG RP-ACK | MMS MSG MMS-SEND-RPY | DECT NWK MSG CC-INFO | Coding |
|---|---|---|---|---|
| 1 | RP-Message Type | Action type | Faclity of MMS | |
| | — | — | <Action type> | “MMS-SEND-RPY” |

-continued

| Item No | GSM SM-RP MSG RP-ACK | MMS MSG MMS-SEND-RPY | DECT NWK MSG CC-INFO | Coding |
|---|---|---|---|---|
| 2 | RP-Message reference | MMS Sequence number | Facility or MMS | |
| 3 | — | — | <MMS sequence nbr> | mapped from RP-MR |
| | — | Action result | Faciliy or MMS | |
| | — | — | <Action result> | “Successful” |

MMS-COMMAND and RP-SMMA

| Item No | GSM SM-RP MSG RP-SMMA | MMS MSG MMS-COMMAND | DECT NWK MSG CC-INFO | Coding |
|---|---|---|---|---|
| 1 | RP-Message type | Action type | Faclity of MMS | |
| | — | — | <Action type> | “MMS-COMMAND” |
| 2 | RP-Message reference | MMS Sequence number | Facility or MMS | |
| | — | — | <MMS sequence nbr> | mapped from RP-MR |
| 3 | — | Command type | Faciliy or MMS | |
| | — | — | <Command type> | “Memory available” |

MMS-COMMAND-RPY and RP-ERROR

| Item No | GSM SM-RP MSG RP-ERROR | MMS MSG MMS-COMMAND-RPY | DECT NWK MSG CC-INFO | Coding |
|---|---|---|---|---|
| 1 | RP-Message Type | Action type | Faclity of MMS | |
| | — | — | <Action type> | “MMS-COMMAND-RPY” |
| 2 | RP-Message reference | MMS Sequence number | Facility or MMS | |
| | — | — | <MMS sequence nbr> | mapped from RP-MR |
| 3 | RP-Cause | Action result | Faciliy or MMS | |
| | — | — | <Action result> | mapped from RP-MR |
| 4 | RP-User data | Control data | IWU-TO-IWU | |
| | — | — | <User protocol ID> | “GSM SM-TP message” |
| | — | — | <IWU-TO-IWU info> | SM-TP message |

MMS-COMMAND-RPY and RP-ACK

| Item No | GSM SM-RP MSG RP-ACK | MMS MSG MMS-COMMAND-RPY | DECT NWK MSG CC-INFO | Coding |
|---|---|---|---|---|
| 1 | RP-Message Type | Action type | Faclity of MMS | |

-continued

| Item No | GSM SM-RP MSG RP-ACK | MMS MSG MMS-COMMAND-RPY | DECT NWK MSG CC-INFO | Coding |
|---|---|---|---|---|
| | — | — | <Action type> | "MMS-COMMAND-RPY" |
| 2 | RP-Message reference | MMS Sequence number | Facility or MMS | |
| | — | — | <MMS sequence nbr> | mapped from RP-MR |
| 3 | — | Action result | Facilty or MMS | |
| | — | — | <Action result> | "Successful" |

The call establishment of the service may either be linked to the SM-CP layer primitives, to the SM-RP upperlayer primitives or it can be the internal task of DECT system to decide the timing of the call setup and release.

In order to select the correct interworking unit and air interface profile in FP the following coding are used in the CC-SETUP message.

An example of the usage of service negotation by using {CC-INFO} in DECT/GSM interworking will now be described.

Figure 45:
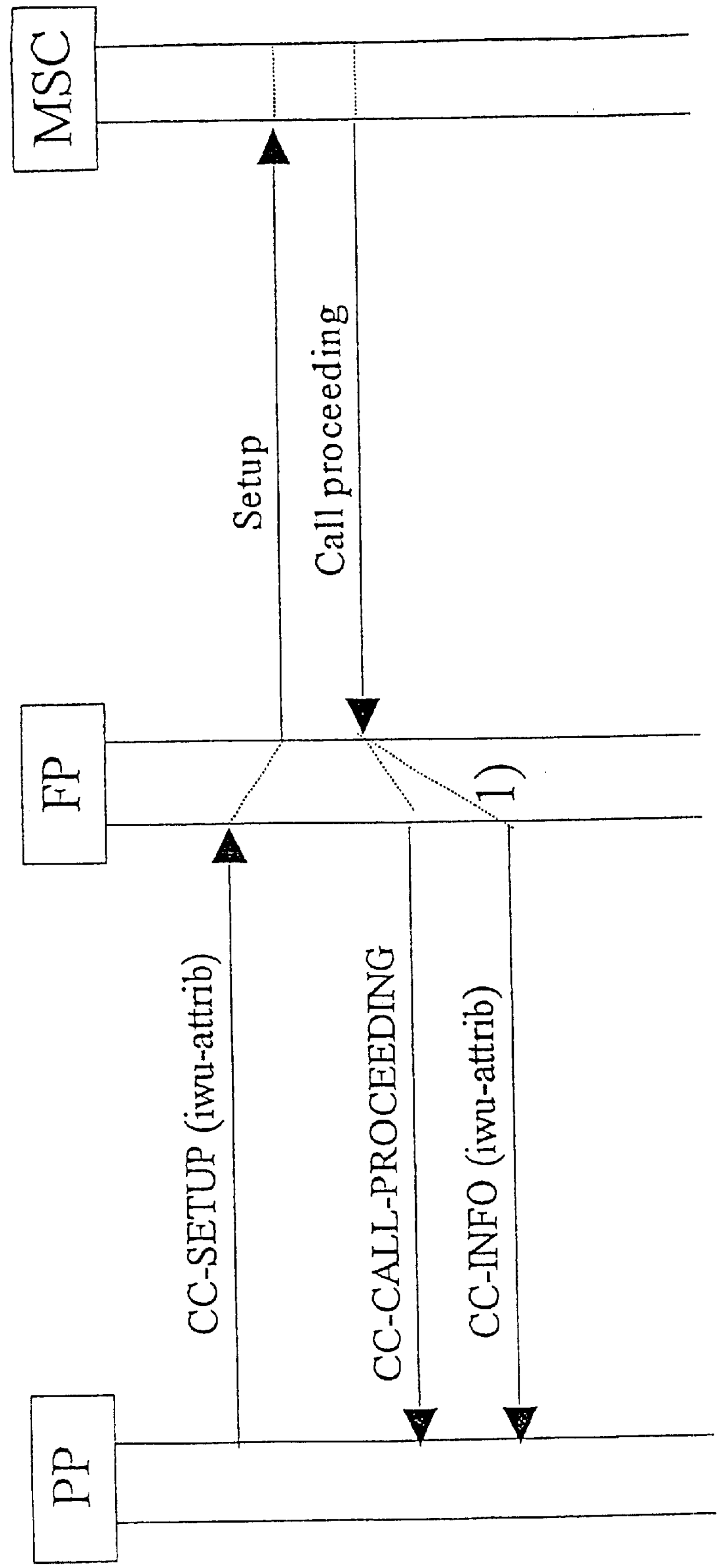
FIG. 45 shows extended exchange attributes negotiation in the case of outgoing call.

1. PP Originated Call (See FIG. 45)

Upon receipt of CC-SETUP-ind with <<IWU-ATTRIBUTES>> containing the value "Connection exchange parameter negotiation" in the <<Negotiation indicator field>> from the CC entity the FP IWU will reject the request immediately issuing MNCC-REJECT-req with <<Release reason>> Hex 07 "Negotiation not supported" if the FP cannot support Extended exchange attributes negotiation.

If the FP can support the Extended exchange parameter negotiation the FP IWU will map the <<IWU-ATTRIBUTES >> information element contained in {CC-SETUP} message to the GSM <<BEARER CAPABILTY>> element of GSM {Setup} message.

1) Upon receipt of the GSM {Call proceeding} message the FP IWU will send DECT {CC-CALL-PROCEEDING} message to PP. If the {Call proceeding message} contained <<Bearer capabiliity>> information element the new values of the <<Bearer capability >> will be mapped into the <<IWU-ATTRIBUTES>> information element of the DECT <<CC-INFO >> message.

| Information element | status in GAP | Field within the information element | Standard values within the field/IE | Normative action/comment |
|---|---|---|---|---|
| <<Portable identity>> | M | | | Coded as in GAP |
| <<Fixed Identity>> | M | | | Coded as in GAP |
| <<Basic service>> | M | | | |
| | | <Call class> | x x x x | "Messaging call setup" |
| | | <Basic service> | 1 1 1 1 | "Other" The coding is defined by <<iwu attributes>> and <<call attributes>> |
| <<Iwu-attributes> | I > | | | |
| | | <Coding standard> | 0 1 | "Profile specific coding" |
| | | <Profile ID> | 0 0 0 1 1 | " E profile " |
| | | <NWK ID> | 0 0 | Ocete identifier |
| | | <Network> | 0 0 1 1 | "GSM" |
| | | <External service type> | 0 0 1 0 0 1 1 | "GSM SMS" |
| | | <HLC ID> | 1 0 | Octet identifier |
| | | <HLC coding indicator> | 0 0 0 0 1 | "User protocol ID present" |
| | | <User protocol ID> | 1 0 0 1 0 | "GSM Recommendation 03.40, SM-TP messages [xx]" |
| <<call attributes >> | I | | | |
| | | <Coding standard> | 0 0 | DECT |
| | | Network layer attributes | 0 1 1 0 0 | "DECT LRMS service profile (E data profile" |
| <<connection attriubtes>> | I | | | |
| | | <<Number of bearer coding>> | 0 0 0 0 0 | "No-U-plane" in E profile case |

If no {Call proceeding} message is received or it does not contain <<BEARER CAPABILITY>> information element the service parameters have been accepted by the MSC IWF and no mapping between the <<BEARER CAPABILITY>> and <<IWU-ATTRIBUTES >> information element is needed.

Figure 46:
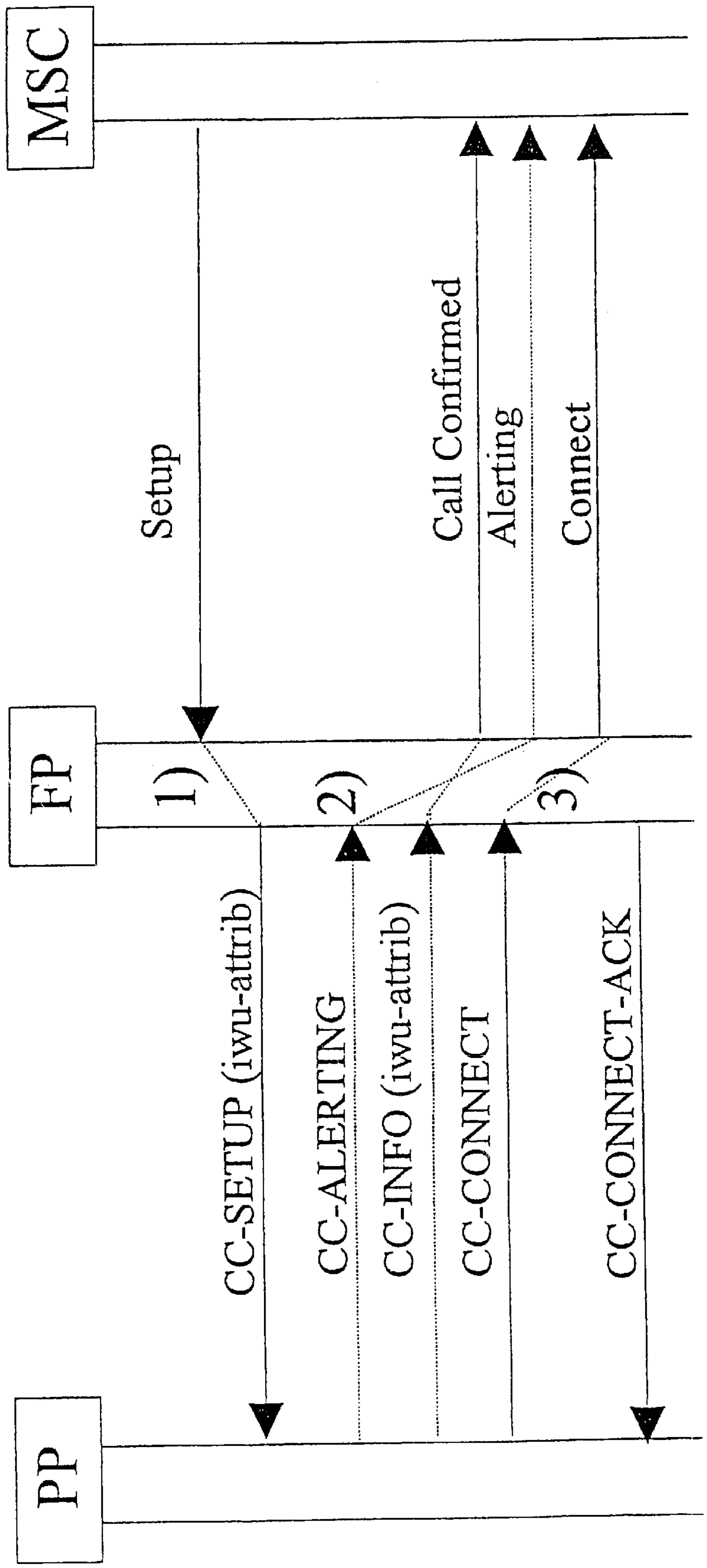
FIG. 46 shows extended exchange attributes negotiation in the case of incoming call.

2. PP Terminated Call (See FIG. 46)

Upon receipt of CC-SETUP-ind with <<IWU-ATTRIBUTES>> containing the value "Extended exchange parameter negotiation" in the <<Negotiation indicator field>> from the CC entity the PP IWU will reject the request immediately issuing MNCC-REJECT-req with <<Release reason>> Hex 07 "Negotiation not supported" if the PP cannot support Extended exchange attributes negotiation.

If the PP can support the Extended exchange parameter negotiation the PP IWU will add the new desired attributes values to the <<IWU-ATTRIBUTES>> information element of the {CC-INFO} message. The {CC-INFO} message can be sent only following by {CC-ALERTING} message.

2) and 3). It is then the responsibility of the FP IWU to suspend the submission of the {Call confirm} and {Alerting} message towards the GSM network until the new desired values have been received in the {CC-INFO} message. The new values in the <<IWU-ATTRIBUTES>> information element of the {CC-INFO} message are mapped into the GSM BEARER CAPABILTY element of {Call Confirmed} message. Other mappings between {CC-CONNECT} and {Connect} message as well as {CC-ALERTING} and {Alerting} messages are done as described in ETS 300 370 FINAL DRAFT prETS 300 370. Radio Equipment and Systems (RES); Digital European Cordless Telecommunications/Global System for Mobile communications (DECT/GSM) inter-working profile. Access and mapping (Protocol/procedure description for 3.1 kHz speech service). European Telecommunications Standards Institute. September 1994. 98 pages.

The PP IWU shall not send the {CC-INFO} message after {CC-ALTERTING} message if it agrees with the service parameters proposed in the {CC-SETUP} message. If {CC-CONNECT} message is received as a response to the {CC-SETUP} message the proposed parameters have been accepted. If the PP IWU accepts the parameters proposed by MSC the call establishment proceeds as defined in ETS 300 370.

The present invention includes any novel feature or combination of features disclosed herein either explicitly or any generalisation thereof irrespective of whether or not it relates to the claimed invention or mitigates any or all of the problems addressed.

In view of the foregoing description it will be evident to a person skilled in the art that various modifications may be made within the scope of the invention in particular the invention is applicable for use under other protocols including Wireless Customer Premises Equipment (WCPE) and Personal Handyphone System (PHS).

What is claimed is:

1. A messaging system for communicating a message between a first communications unit having a first messaging entity and a second communications unit having a second messaging entity, each messaging entity having a messaging call control means for establishing a messaging communications link with the other messaging entity; and a messaging means for, once the messaging communications link has been established, exchanging messaging information with the said other messaging entity wherein the messaging entity receives data from and transmits data to the application layer of the communication protocol such that each messaging entity comprises a virtual layer between an application layer and a network layer of a communication protocol.

2. A messaging system as claimed in claim 1, wherein the messaging call control means operates under the control of the messaging means.

3. A messaging system as claimed in claim 1, wherein the messaging information includes header data and user data associated with the message.

4. A messaging system as claimed in claim 3, wherein the header data and the user data include data defining a message sequence number of the message.

5. A messaging system, as claimed in claim 1, wherein the messaging communications link uses two links.

6. A messaging system, as claimed in claim 5, wherein one of the links carries header data and the other link carries user data.

7. A messaging system, as claimed in claim 6, wherein the said one link operates through a C-plane and the other link operates through a U-plane.

8. A messaging system as claimed in claim 1, in the messaging communications link is made by means of a radio link between the first communications unit and the second communications unit.

9. A messaging system as claimed in claim 8, wherein the first communications unit is a portable part and the second communications unit is a fixed part.

10. A messaging system as claimed in claim 9, wherein the radio link operates according to the DECT WCPE or PHS protocols.

11. A messaging method for communicating a message between a first communications unit and a second communications unit, the first communications unit having an application layer, a messaging entity and a network layer, the method comprising,the steps of:

transmitting a signal from the application layer to the network layer as a means of establishing a call;

exchanging messaging information between the application layer and the network layer by way of the messaging entity to communicate the message; and transmitting a signal from the application layer to the network layer as a means of disconnecting the call, wherein the messaging entity constitutes a virtual layer between the application layer and the network layer of the communication protocol.

12. A messaging method for communicating a message between a first communications unit and a second communications unit, the first communications unit having an application layer, a messaging entity and a network layer, the method comprising the steps of:

transmitting a signal from the messaging entity to the network layer as a means of establishing a call;

exchanging messaging information between the application layer and the network layer by way of the messaging entity to communicate the message; and transmitting a signal from the messaging entity to the network layer as a means of disconnecting the call, wherein the messaging entity constitutes a virtual layer between the application layer and the network layer of the communication protocol.

* * * * *